United States Patent
Mukasa

(10) Patent No.: US 9,128,234 B2
(45) Date of Patent: Sep. 8, 2015

(54) MULTI-CORE OPTICAL FIBER AND OPTICAL TRANSMISSION SYSTEM

(71) Applicant: FURUKAWA ELECTRIC CO., LTD, Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/173,467

(22) Filed: Feb. 5, 2014

(65) Prior Publication Data

US 2014/0153883 A1    Jun. 5, 2014

Related U.S. Application Data

(63) Continuation of application No. PCT/JP2012/061540, filed on May 1, 2012.

(30) Foreign Application Priority Data

Aug. 8, 2011 (JP) .................................. 2011-173249
Mar. 2, 2012 (JP) .................................. 2012-047319

(51) Int. Cl.
  G02B 6/36    (2006.01)
  G02B 6/02    (2006.01)
  H04B 10/2581 (2013.01)
  H04J 14/02   (2006.01)
  H04J 14/04   (2006.01)

(52) U.S. Cl.
  CPC ........ G02B 6/02042 (2013.01); H04B 10/2581 (2013.01); *H04J 14/02* (2013.01); *H04J 14/04* (2013.01)

(58) Field of Classification Search
  USPC .......................................................... 385/126
  See application file for complete search history.

(56) References Cited

U.S. PATENT DOCUMENTS

| 4,877,304 A | 10/1989 | Bhagavatula |
| 4,889,404 A | 12/1989 | Bhagavatula et al. |
| 7,440,662 B2 | 10/2008 | Antona et al. |
| 8,041,172 B2 | 10/2011 | Sillard et al. |

(Continued)

FOREIGN PATENT DOCUMENTS

| JP | 63-049707 A | 3/1988 |
| JP | 1-163707 A | 6/1989 |

(Continued)

OTHER PUBLICATIONS

International Search Report mailed Jul. 17, 2012 for PCT/JP2012/061540 filed on May 1, 2012 with English Translation.

(Continued)

*Primary Examiner* — Eric Wong

(74) *Attorney, Agent, or Firm* — Oblon, McClelland, Maier & Neustadt, L.L.P.

(57) ABSTRACT

A multi-core optical fiber includes a plurality of core portions, and a cladding portion positioned at outer peripheries of the plurality of core portions, the cladding portion having a refractive index lower than a maximum refractive index of each of the core portions, in which each of the core portions propagates light only with predetermined number, which is equal to or greater than 2, of propagation modes, and an effective core area at wavelength of 1550 nm of each of the propagation modes is equal to or greater than 120 μm².

18 Claims, 59 Drawing Sheets

(56) References Cited

U.S. PATENT DOCUMENTS

| | | |
|---|---|---|
| 8,320,724 B2 | 11/2012 | Sasaoka |
| 8,447,156 B2 | 5/2013 | Sasaoka |
| 2009/0201953 A1 | 8/2009 | Peyghambarian et al. |
| 2010/0183272 A1 | 7/2010 | Sasaoka |
| 2011/0182557 A1 | 7/2011 | Hayashi |
| 2011/0206331 A1 | 8/2011 | Imamura |
| 2013/0071114 A1* | 3/2013 | Bickham et al. ............. 398/44 |

FOREIGN PATENT DOCUMENTS

| | | |
|---|---|---|
| JP | 2007-086776 A | 4/2007 |
| JP | 2008-257250 A | 10/2008 |
| WO | WO 2006/119334 A2 | 11/2006 |
| WO | WO 2010/038863 A1 | 4/2010 |
| WO | WO 2010/082656 A1 | 7/2010 |
| WO | WO 2010/119930 A1 | 10/2010 |
| WO | WO 2011/024808 A1 | 3/2011 |

OTHER PUBLICATIONS

International Written Opinion mailed Jul. 17, 2012 for PCT/JP2012/061540 filed on May 1, 2012.

Zhu, B., et al., 70-GB/s Multicore Multimode Fiber Transmissions for Optical Data Links, IEEE Photonics Technology Letters, Nov. 15, 2010, vol. 22, No. 22, pp. 1647-1649.

Shoichiro Matsuo, et al., "[Invited] Multi-core and Multi-mode Technique toward Ultra-high Capacity Optical Transmission", IEICE Technical Report, Jul. 14, 2011, vol. 111, No. 148, pp. 45-50 (OPE2011-32). With English Abstract.

Mukasa, K., et al., Optimizing 3-Mode Fibers for Mode Divisions Multiplexing, The 16$^{th}$ Opto-Electronics and Communications Conference, OECC 2011, Jul. 2011, pp. 244-245.

Ryf, R., et al., Space-division multiplexing over 10km of three-mode fiber using coherent 6x6 MIMO processing, Optical Fiber Communication Conference and Exposition (OFC/NFOEC) and the National Fiber Optic Engineers Conference 2011, Mar. 2011, PDPB10.

Salsi, M., et al., Transmission at 2x100Gb/s, over two Modes of 40km-long Prototype Few-Mode Fiber, using LCOS-based Mode Multiplexer and Demultiplexer, Optical Fiber Communication Conference and Exposition (OFC/NFOEC) and the National Fiber Optic Engineers Conference 2011, Mar. 2011, PDPB9.

Cvijetic, M.M., et al., Design Considerations of Dispersion-Free Dual-Mode Optical Fibers: 1.55μm Wavelength Operation, IEEE Journal of Quantum Electronics, May 1987, vol. QE-23, Nov. 5, pp. 469-472.

Yasuyuki Kato, et al., "2-mode Hikari Fiber no Denso Tokusei", Electrical Communication Laboratories Technical Journal, Nov. 22, 1980, vol. 29, No. 11, pp. 1869-1880.

Kitayama, K., et al., Transmission Characteristic Measurement of Two-Mode Optical Fiber with a Nearly Optimum Index-Profile, IEEE Transactions on Microwave Theory and Techniques, Jun. 1980, vol. MTT-28, No. 6, p. 604-608.

Kato, Y., et al., Design Consideration on Broad-Band W-Type Two-Mode Optical Fibers, IEEE Transactions on Microwave Theory and Techniques, Jan. 1982, vol. MTT, No. 1, pp. 1-5.

Sakai, J., et al., Design Considerations of Broadband Dual-Mode Optical Fibers, IEEE Transactions on Microwave Theory and Techniques, Sep. 1978, vol. MTT-26, No. 9, p. 658-665.

Yasuo Kokubun, et al., "Proposal of Heterogeneous Uncoupled and Homogeneous Coupled Multicore Fibers for Space/Mode-Division Multiplexing", IEICE Technical Report, Jul. 23, 2009, vol. 109, No. 159, pp. 165-170 (OPE2009-60). With English Abstract.

Koshiba, M., et al., Heterogeneous multi-core fibers: proposal and design principle, IEICE Electronics Express, Jan. 25, 2009, vol. 6, No. 2, pp. 98-103 <URL: https://www.jstage.jst.go.jp/article/elex/6/2/6_2_98/_pdf>.

Katsunori Imamura, et al., "Effective Space Division Multiplexing by Multi-Core Fibers," ECOC2010, P1. 09 (2010).

Katsunori Imamura, et al., "Multi-core holey fibers for the long-distance (>100km) ultra large capacity transmission, "OFC/NFOEC 2009, OTuC3(2009).

Nobutomo Hanzawa, et al., "Demonstration of mode-division multiplexing transmission over 10 km 2-mode fiber with mode coupler," OFC/NFOEC 2011, OWA4(2011).

Marianne Bigot-Astruc, et al., "125μm glass diameter single-mode fiber with Aeff of 155 μm2" OFC/NFOEC 2011, OTuJ2(2011).

Yoshinori Yamamoto, et al., "OSNR-Enhancing Pure-Silica-Core Fiber with Large Effective Area and Low Attenuation, "OFC/NFOEC 2010, OTuI2(2010).

Extended European Search Report issued Feb. 27, 2015 in Patent Application No. 12822431.8.

* cited by examiner

FIG.7

| No. | PROFILE PARAMETER | | | | | | LP01 | | | | | |
|---|---|---|---|---|---|---|---|---|---|---|---|---|
| | Ra2 | Δ1 | Δ2 | 2a | 2b | DISPERSION | SLOPE | neff | Aeff | MFD | BENDING LOSS |
| 130-1 | 3 | 0.39 | -0.20 | 15.60 | 46.80 | 21.8 | 0.064 | 1.44861 | 136.0 | 12.7 | 1.4E-09 |
| 130-2 | 3 | 0.39 | -0.15 | 15.20 | 45.60 | 21.6 | 0.064 | 1.44858 | 133.1 | 12.6 | 8.3E-10 |
| 130-3 | 3 | 0.37 | -0.10 | 15.20 | 45.60 | 21.5 | 0.064 | 1.44833 | 137.6 | 12.8 | 2.2E-08 |
| 130-4 | 3 | 0.37 | -0.05 | 14.60 | 43.80 | 21.2 | 0.064 | 1.44828 | 133.5 | 12.7 | 1.1E-07 |
| 150-1 | 3 | 0.35 | -0.20 | 16.60 | 49.80 | 21.8 | 0.064 | 1.44819 | 152.3 | 13.4 | 1.3E-08 |
| 150-2 | 3 | 0.34 | -0.15 | 16.50 | 49.50 | 21.7 | 0.064 | 1.44806 | 154.5 | 13.6 | 1.1E-07 |
| 150-3 | 3 | 0.33 | -0.10 | 16.25 | 48.75 | 21.5 | 0.064 | 1.44792 | 155.5 | 13.6 | 1.4E-06 |
| 150-4 | 3 | 0.33 | -0.05 | 15.60 | 46.80 | 21.3 | 0.064 | 1.44787 | 151.1 | 13.5 | 7.9E-06 |
| 170-1 | 3 | 0.31 | -0.20 | 17.90 | 53.70 | 21.8 | 0.065 | 1.44777 | 174.4 | 14.4 | 2.9E-07 |
| 170-2 | 3 | 0.30 | -0.15 | 17.70 | 53.10 | 21.7 | 0.064 | 1.44763 | 175.8 | 14.4 | 4.8E-06 |
| 170-3 | 3 | 0.32 | -0.05 | 17.10 | 51.30 | 21.4 | 0.064 | 1.44790 | 174.2 | 14.4 | 7.1E-06 |
| 130-5 | 4 | 0.42 | -0.1 | 15.10 | 60.40 | 21.43 | 0.0644 | 1.44900 | 132.9 | 12.3 | 2.65E-09 |
| 150-5 | 2 | 0.26 | -0.1 | 15.30 | 30.60 | 21.42 | 0.0633 | 1.44684 | 149.5 | 13.2 | 3.91E-02 |
| 170-4 | 4 | 0.29 | -0.1 | 17.30 | 69.20 | 21.57 | 0.0643 | 1.44748 | 175.2 | 14.1 | 4.71E-06 |
| 130-6 | 3 | 0.28 | -0.1 | 14.2 | 42.6 | 21.03 | 0.0631 | 1.44701 | 138.0 | 12.8 | 8.4E-03 |
| 130-7 | 3 | 0.42 | -0.1 | 14.7 | 44.1 | 21.24 | 0.0642 | 1.44897 | 130.3 | 12.2 | 3.3E-09 |
| 170-5 | 3 | 0.22 | -0.1 | 16.3 | 48.90 | 21.25 | 0.0635 | 1.44646 | 177.4 | 14.4 | 2.9E-01 |

FIG.8

| No. | LP11 | | | | | | LP21 |
|---|---|---|---|---|---|---|---|
| | DISPER-SION | SLOPE | neff | Aeff | MFD | BENDING LOSS | neff |
| 130-1 | 23.4 | 0.059 | 1.44657 | 195.4 | 16.1 | 4.4E-03 | 1.44399 |
| 130-2 | 22.6 | 0.058 | 1.44649 | 194.2 | 16.0 | 2.7E-02 | 1.44389 |
| 130-3 | 21.6 | 0.056 | 1.44632 | 204.5 | 16.5 | 2.5E-02 | 1.44386 |
| 130-4 | 19.9 | 0.053 | 1.44621 | 205.9 | 16.6 | 2.6E-01 | 1.44380 |
| 150-1 | 23.5 | 0.060 | 1.44636 | 217.7 | 17.0 | 7.6E-03 | 1.44404 |
| 150-2 | 22.8 | 0.059 | 1.44626 | 223.7 | 17.2 | 4.9E-03 | 1.44400 |
| 150-3 | 21.9 | 0.058 | 1.44613 | 229.7 | 17.5 | 4.7E-02 | 1.44394 |
| 150-4 | 20.4 | 0.055 | 1.44604 | 231.3 | 17.6 | 5.3E-01 | 1.44389 |
| 170-1 | 23.6 | 0.061 | 1.44617 | 247.9 | 18.1 | 7.8E-03 | 1.44414 |
| 170-2 | 22.9 | 0.060 | 1.44605 | 253.0 | 18.3 | 6.8E-02 | 1.44405 |
| 170-3 | 21.5 | 0.058 | 1.44631 | 259.0 | 18.6 | 1.5E+00 | 1.44437 |
| 130-5 | 22.3 | 0.058 | 1.446916 | 195.0 | 10.1 | 6.35E-05 | 1.4443315 |
| 150-5 | 18.4 | 0.041 | 1.445001 | 236.7 | 11.2 | 1.14E+02 | |
| 170-4 | 22.1 | 0.059 | 1.445893 | 257.6 | 11.6 | 4.53E-03 | 1.4439364 |
| 130-6 | 16.1 | 0.0425 | 1.44504 | 235.5 | 11.3 | 2.3E+02 | |
| 130-7 | 21.0 | 0.0554 | 1.44686 | 196.5 | 10.1 | 3.6E-03 | 1.4443069 |
| 170-5 | 18.2 | 0.0500 | 1.44493 | 293.5 | 12.6 | 7.3E+01 | |

FIG.9

| No. | PROFILE PARAMETER | | | | | | LP01 | | | | | |
|---|---|---|---|---|---|---|---|---|---|---|---|---|
| | Ra2 | Δ1 | Δ2 | 2a | 2b | DISPERSION | SLOPE | MFD | neff | Aeff | BENDING LOSS |
| 130-1 | 3 | 0.47 | -0.100 | 15.20 | 45.60 | 21.4 | 0.065 | 12.1 | 1.44971 | 131.4 | 1.24E-14 |
| 150-1 | 3 | 0.41 | -0.050 | 16.10 | 48.30 | 21.3 | 0.065 | 13.4 | 1.44903 | 150.8 | 8.60E-11 |
| 150-2 | 2 | 0.43 | -0.450 | 17.20 | 34.40 | 22.0 | 0.065 | 12.6 | 1.44932 | 148.7 | 1.47E-13 |
| 150-3 | 2 | 0.41 | -0.1 | 16.30 | 32.60 | 21.4 | 0.0646 | 13.0 | 1.44905 | 151.4 | 6.1E-08 |
| 150-4 | 4 | 0.38 | -0.1 | 16.55 | 66.20 | 21.5 | 0.0646 | 13.3 | 1.44864 | 155.9 | 4.3E-10 |
| 130-2 | 3 | 0.46 | -0.05 | 14.90 | 44.70 | 21.22 | 0.0644 | 12.1 | 1.44955 | 130.2 | 5.5E-10 |
| 170-1 | 3 | 0.36 | -0.05 | 17.20 | 51.60 | 21.34 | 0.0645 | 13.8 | 1.44846 | 170.7 | 7.5E-08 |
| 150-5 | 2 | 0.43 | -0.50 | 17.30 | 34.60 | 22.09 | 0.06534 | 12.60 | 1.44934 | 150.32 | 7.49E-10 |

FIG.10

| No. | LP11 | | | | | | LP21 | | | | | | LP02 | |
|---|---|---|---|---|---|---|---|---|---|---|---|---|---|---|
| | DISPERSION | SLOPE | MFD | neff | Aeff | BENDING LOSS | DISPERSION | SLOPE | MFD | neff | Aeff | BENDING LOSS | neff |
| 130-1 | 22.8 | 0.059 | 9.8 | 1.44760 | 190.4 | 5.68E-05 | 17.0 | 0.021 | 18.6 | 1.44495 | 223.5 | 1.13E+01 | 1.44424 |
| 150-1 | 22.1 | 0.059 | 17.1 | 1.44719 | 221.1 | 5.89E-03 | 14.2 | 0.010 | 20.5 | 1.44491 | 269.8 | 1.12E+02 | 1.44435 |
| 150-2 | 25.6 | 0.064 | 9.8 | 1.44744 | 206.2 | 2.52E-05 | 28.6 | 0.056 | 18.5 | 1.44501 | 217.6 | 7.63E-01 | 1.44420 |
| 150-3 | 22.8 | 0.060 | 10.4 | 1.44718 | 217.0 | 3.07E-04 | 16.5 | -0.002 | 19.9 | 1.44486 | 254.2 | 1.64E+02 | 1.44424 |
| 150-4 | 22.7 | 0.060 | 10.8 | 1.44686 | 225.9 | 4.18E-05 | 17.7 | 0.028 | 20.3 | 1.44463 | 265.3 | 1.53E+01 | 1.44403 |
| 130-2 | 21.8 | 0.0572 | 9.9 | 1.44743 | 193.0 | 3.6E-05 | 10.232 | -0.0194 | 19.4 | 1.44483 | 242.38 | 1.39E+02 | 1.44424 |
| 170-1 | 22.1 | 0.0596 | 11.3 | 1.44684 | 250.8 | 7.3E-02 | 15.656 | 0.0196 | 21.70 | 1.44483 | 303.64 | 1.54E+02 | 1.44432 |
| 150-5 | 25.80 | 0.06401 | 9.78 | 1.44745 | 206.12 | 1.37E-05 | 29.210 | 0.05767 | 18.448 | 1.44501 | 216.62 | 4.18E-01 | 1.44420 |

FIG.13

| MODE | DISTANCE BETWEEN CORES μm | TRANSMISSION DISTANCE m |
|---|---|---|
| LP01-LP01 | 30 | 4.20E-03 |
| | 40 | 4.40E-01 |
| | 50 | 3.20E+01 |
| | 60 | 2.78E+03 |
| | 70 | 1.03E+05 |
| | 80 | 8.40E+06 |
| | 90 | 6.50E+08 |
| | 100 | 5.30E+10 |
| LP11-LP11 | 30 | 7.80E-04 |
| | 40 | 2.95E-02 |
| | 50 | 6.30E-01 |
| | 60 | 1.55E+01 |
| | 70 | 2.15E+02 |
| | 80 | 5.50E+03 |
| | 90 | 1.40E+05 |
| | 100 | 3.30E+06 |
| LP01-LP11 | 30 | 3.60E+03 |
| | 40 | 2.15E+08 |
| | 50 | 2.40E+12 |
| | 60 | 1.50E+16 |
| | 70 | 8.70E+18 |
| | 80 | 5.80E+22 |
| | 90 | 1.05E+28 |
| | 100 | 3.30E+26 |
| LP11-LP01 | 30 | 5.20E+06 |
| | 40 | 1.50E+09 |
| | 50 | 2.55E+12 |
| | 60 | 1.55E+15 |
| | 70 | 3.40E+17 |
| | 80 | 2.10E+20 |
| | 90 | 2.05E+23 |
| | 100 | 8.90E+25 |

| MODE | DISTANCE BETWEEN CORES | TRANS-MISSION DISTANCE |
|---|---|---|
| | μm | m |
| LP01-LP01 | 30 | 8.70E-03 |
| | 40 | 8.00E-01 |
| | 50 | 7.80E+01 |
| | 60 | 8.60E+03 |
| | 70 | 3.90E+05 |
| | 80 | 4.00E+07 |
| | 90 | 3.80E+09 |
| | 100 | 3.90E+11 |
| LP11-LP11 | 30 | 1.55E-03 |
| | 40 | 4.30E-02 |
| | 50 | 1.06E+00 |
| | 60 | 3.10E+01 |
| | 70 | 4.90E+02 |
| | 80 | 1.50E+04 |
| | 90 | 4.40E+05 |
| | 100 | 1.32E+07 |

| MODE | DISTANCE BETWEEN CORES | TRANS- MISSION DISTANCE |
|---|---|---|
|  | μm | m |
| LP01-LP01 | 30 | 2.50E-03 |
|  | 40 | 2.50E-01 |
|  | 50 | 1.36E+01 |
|  | 60 | 9.20E+02 |
|  | 70 | 2.80E+04 |
|  | 80 | 1.80E+06 |
|  | 90 | 1.10E+08 |
|  | 100 | 7.00E+09 |
| LP11-LP11 | 30 | 5.80E-04 |
|  | 40 | 2.55E-02 |
|  | 50 | 4.30E-01 |
|  | 60 | 9.00E+00 |
|  | 70 | 1.10E+02 |
|  | 80 | 2.40E+03 |
|  | 90 | 5.20E+04 |
|  | 100 | 1.06E+06 |

FIG.19

| MODE | DISTANCE BETWEEN CORES | TRANS-MISSION DISTANCE |
|---|---|---|
| | μm | m |
| LP01-LP01 130-1=>130-2 | 30 | 1.95E+00 |
| | 40 | 1.88E+04 |
| | 50 | 1.70E+08 |
| | 60 | 2.05E+12 |
| | 70 | 3.90E+15 |
| | 80 | 4.10E+19 |
| | 90 | 3.60E+23 |
| | 100 | 3.80E+27 |
| LP11-LP11 130-1=>130-2 | 30 | 9.60E-02 |
| | 40 | 8.40E+01 |
| | 50 | 4.70E+04 |
| | 60 | 3.80E+07 |
| | 70 | 8.80E+09 |
| | 80 | 7.50E+12 |
| 30-2=> | 90 | 5.80E+15 |
| | 100 | 4.20E+18 |
| LP01-LP01 130-2=>130-1 | 30 | 1.70E+00 |
| | 40 | 1.68E+04 |
| | 50 | 1.65E+08 |
| | 60 | 2.00E+12 |
| | 70 | 3.90E+15 |
| | 80 | 4.20E+19 |
| | 90 | 3.70E+23 |
| | 100 | 3.70E+27 |
| LP11-LP11 130-2=>130-1 | 30 | 9.30E-02 |
| | 40 | 7.90E+01 |
| | 50 | 5.40E+04 |
| | 60 | 4.10E+07 |
| | 70 | 9.20E+09 |
| | 80 | 7.70E+12 |
| | 90 | 6.50E+15 |
| | 100 | 5.10E+18 |

FIG.21

| MODE | DISTANCE BETWEEN CORES | TRANS-MISSION DISTANCE |
|---|---|---|
| | μm | m |
| LP01-LP01 150-1=>150-2 | 30 | 1.20E+00 |
| | 40 | 1.15E+04 |
| | 50 | 6.40E+07 |
| | 60 | 4.50E+11 |
| | 70 | 5.50E+14 |
| | 80 | 3.20E+18 |
| | 90 | 1.78E+22 |
| | 100 | 1.02E+26 |
| LP11-LP11 150-1=>150-2 | 30 | 2.90E-02 |
| | 40 | 3.60E+01 |
| | 50 | 1.65E+04 |
| | 60 | 9.30E+06 |
| | 70 | 1.58E+09 |
| | 80 | 9.10E+11 |
| | 90 | 5.10E+14 |
| | 100 | 2.45E+17 |
| LP01-LP01 150-2=>150-1 | 30 | 1.50E+00 |
| | 40 | 1.57E+04 |
| | 50 | 8.10E+07 |
| | 60 | 5.80E+11 |
| | 70 | 7.20E+14 |
| | 80 | 4.60E+18 |
| | 90 | 2.40E+22 |
| | 100 | 1.40E+26 |
| LP11-LP11 150-2=>150-1 | 30 | 3.80E-02 |
| | 40 | 5.10E+01 |
| | 50 | 2.35E+04 |
| | 60 | 1.25E+07 |
| | 70 | 2.10E+09 |
| | 80 | 1.23E+12 |
| | 90 | 7.10E+14 |
| | 100 | 3.60E+17 |

FIG.23

| MODE | DISTANCE BETWEEN CORES | TRANS-MISSION DISTANCE |
|---|---|---|
| | µm | m |
| LP01-LP01 170-1=>170-2 | 30 | 4.20E-01 |
| | 40 | 3.95E+03 |
| | 50 | 1.25E+07 |
| | 60 | 5.00E+10 |
| | 70 | 4.10E+13 |
| | 80 | 1.49E+17 |
| | 90 | 5.00E+20 |
| | 100 | 1.75E+24 |
| LP11-LP11 170-1=>170-2 | 30 | 1.95E-02 |
| | 40 | 3.20E+01 |
| | 50 | 9.00E+03 |
| | 60 | 3.60E+06 |
| | 70 | 4.55E+08 |
| | 80 | 1.85E+11 |
| | 90 | 7.30E+13 |
| | 100 | 2.50E+16 |
| LP01-LP01 170-2=>170-1 | 30 | 4.90E-01 |
| | 40 | 4.30E+03 |
| | 50 | 1.33E+07 |
| | 60 | 5.50E+10 |
| | 70 | 4.50E+13 |
| | 80 | 1.73E+17 |
| | 90 | 5.60E+20 |
| | 100 | 1.95E+24 |
| LP11-LP11 170-2=>170-1 | 30 | 2.20E-02 |
| | 40 | 3.20E+01 |
| | 50 | 1.03E+04 |
| | 60 | 3.70E+06 |
| | 70 | 4.60E+08 |
| | 80 | 1.87E+11 |
| | 90 | 7.50E+13 |
| | 100 | 2.70E+16 |

FIG.25

| MODE | DISTANCE BETWEEN CORES | TRANS-MISSION DISTANCE |
|---|---|---|
| | $\mu m$ | m |
| LP01-LP01 130-1=>150-1 | 30 | 1.85E+01 |
| | 40 | 1.45E+05 |
| | 50 | 1.05E+09 |
| | 60 | 9.40E+12 |
| | 70 | 1.38E+16 |
| | 80 | 1.05E+20 |
| | 90 | 6.40E+23 |
| | 100 | 4.80E+27 |
| LP11-LP11 130-1=>150-1 | 30 | 3.60E-01 |
| | 40 | 3.05E+02 |
| | 50 | 1.70E+05 |
| | 60 | 1.20E+08 |
| | 70 | 2.40E+10 |
| | 80 | 1.82E+13 |
| | 90 | 2.00E+16 |
| | 100 | 7.50E+18 |
| LP01-LP01 150-1=>130-1 | 30 | 2.25E+01 |
| | 40 | 2.20E+05 |
| | 50 | 1.44E+09 |
| | 60 | 1.40E+13 |
| | 70 | 2.20E+16 |
| | 80 | 1.65E+20 |
| | 90 | 1.15E+24 |
| | 100 | 7.70E+27 |
| LP11-LP11 150-1=>130-1 | 30 | 3.00E-01 |
| | 40 | 3.50E+02 |
| | 50 | 1.82E+05 |
| | 60 | 1.33E+08 |
| | 70 | 2.80E+10 |
| | 80 | 2.05E+13 |
| | 90 | 1.52E+16 |
| | 100 | 1.00E+19 |

FIG.27

| MODE | DISTANCE BETWEEN CORES | TRANSMISSION DISTANCE |
|---|---|---|
| | μm | m |
| LP01-LP01 130-1=>170-1 | 30 | 1.23E+01 |
| | 40 | 1.05E+05 |
| | 50 | 5.20E+08 |
| | 60 | 3.00E+12 |
| | 70 | 3.00E+15 |
| | 80 | 1.37E+19 |
| | 90 | 5.30E+22 |
| | 100 | 2.36E+26 |
| LP11-LP11 130-1=>170-1 | 30 | 3.30E-01 |
| | 40 | 3.60E+02 |
| | 50 | 1.65E+05 |
| | 60 | 9.40E+07 |
| | 70 | 1.55E+10 |
| | 80 | 9.20E+12 |
| | 90 | 4.50E+15 |
| | 100 | 2.05E+18 |
| LP01-LP01 170-1=>130-1 | 30 | 4.30E+01 |
| | 40 | 3.30E+05 |
| | 50 | 1.30E+09 |
| | 60 | 7.80E+12 |
| | 70 | 8.00E+15 |
| | 80 | 3.70E+19 |
| | 90 | 1.55E+23 |
| | 100 | 6.00E+26 |
| LP11-LP11 170-1=>130-1 | 30 | 6.00E-01 |
| | 40 | 7.30E+02 |
| | 50 | 2.85E+05 |
| | 60 | 1.60E+08 |
| | 70 | 2.75E+10 |
| | 80 | 1.48E+13 |
| | 90 | 8.30E+15 |
| | 100 | 3.90E+18 |

FIG.29

| MODE | DISTANCE BETWEEN CORES | TRANS- MISSION DISTANCE |
|---|---|---|
| | μm | m |
| LP01-LP01 150-1=>170-1 | 30 | 3.40E+00 |
| | 40 | 3.55E+04 |
| | 50 | 1.53E+08 |
| | 60 | 8.50E+11 |
| | 70 | 8.70E+14 |
| | 80 | 3.90E+18 |
| | 90 | 1.65E+22 |
| | 100 | 7.20E+25 |
| LP11-LP11 150-1=>170-1 | 30 | 7.60E-02 |
| | 40 | 1.26E+02 |
| | 50 | 5.00E+04 |
| | 60 | 2.55E+07 |
| | 70 | 4.10E+09 |
| | 80 | 2.20E+12 |
| | 90 | 1.15E+15 |
| | 100 | 5.10E+17 |
| LP01-LP01 170-1=>150-1 | 30 | 9.30E+00 |
| | 40 | 9.50E+04 |
| | 50 | 3.05E+08 |
| | 60 | 1.70E+12 |
| | 70 | 1.75E+15 |
| | 80 | 8.70E+18 |
| | 90 | 3.50E+22 |
| | 100 | 1.53E+26 |
| LP11-LP11 170-1=>150-1 | 30 | 1.53E-01 |
| | 40 | 2.50E+02 |
| | 50 | 8.50E+04 |
| | 60 | 4.30E+07 |
| | 70 | 6.90E+09 |
| | 80 | 3.80E+12 |
| | 90 | 1.98E+15 |
| | 100 | 9.30E+17 |

FIG.31

| MODE | DISTANCE BETWEEN CORES μm | TRANSMISSION DISTANCE m |
|---|---|---|
| LP01-LP01 | 30 | 8.91E-03 |
| | 40 | 1.46E+00 |
| | 50 | 2.29E+02 |
| | 60 | 4.40E+04 |
| | 70 | 3.09E+06 |
| | 80 | 5.46E+08 |
| | 90 | 8.62E+10 |
| | 100 | 1.53E+13 |
| LP11-LP11 | 30 | 1.37E-03 |
| | 40 | 8.07E-02 |
| | 50 | 3.67E+00 |
| | 60 | 2.19E+02 |
| | 70 | 6.15E+03 |
| | 80 | 3.93E+05 |
| | 90 | 2.34E+07 |
| | 100 | 1.38E+09 |
| LP21-LP21 | 30 | 9.20E-04 |
| | 40 | 2.70E-03 |
| | 50 | 1.31E-02 |
| | 60 | 7.51E-02 |
| | 70 | 3.01E-01 |
| | 80 | 1.81E+00 |
| | 90 | 9.93E+00 |
| | 100 | 7.32E+01 |
| LP01-LP11 | 30 | 1.02E+05 |
| | 40 | 1.13E+08 |
| | 50 | 3.96E+13 |
| | 60 | 4.15E+17 |
| | 70 | 2.08E+19 |
| | 80 | 1.30E+25 |
| | 90 | 1.67E+28 |
| | 100 | 1.56E+39 |
| LP01-LP21 | 30 | 1.48E-02 |
| | 40 | 7.23E-01 |
| | 50 | 2.93E+01 |
| | 60 | 1.11E+03 |
| | 70 | 1.97E+04 |
| | 80 | 6.80E+05 |
| | 90 | 2.26E+07 |
| | 100 | 9.14E+08 |
| LP11-LP01 | 30 | 1.05E+06 |
| | 40 | 2.02E+09 |
| | 50 | 4.20E+14 |
| | 60 | 7.70E+18 |
| | 70 | 7.76E+20 |
| | 80 | 7.82E+23 |
| | 90 | 3.61E+28 |
| | 100 | 4.44E+31 |
| LP11-LP21 | 30 | 1.13E+02 |
| | 40 | 1.53E+04 |
| | 50 | 3.81E+06 |
| | 60 | 1.73E+08 |
| | 70 | 2.73E+10 |
| | 80 | 5.76E+10 |
| | 90 | 4.49E+12 |
| | 100 | 1.37E+14 |
| LP21-LP01 | 30 | 3.28E+01 |
| | 40 | 1.86E+02 |
| | 50 | 7.28E+03 |
| | 60 | 2.78E+05 |
| | 70 | 4.92E+06 |
| | 80 | 1.66E+08 |
| | 90 | 5.64E+09 |
| | 100 | 2.06E+11 |
| LP21-LP11 | 30 | 2.60E+04 |
| | 40 | 2.71E+07 |
| | 50 | 7.25E+07 |
| | 60 | 1.27E+11 |
| | 70 | 3.40E+12 |
| | 80 | 2.84E+16 |
| | 90 | 3.35E+14 |
| | 100 | 3.23E+18 |

FIG.33

| MODE | DISTANCE BETWEEN CORES μm | TRANSMISSION DISTANCE m |
|---|---|---|
| LP01-LP01 | 30 | 3.00E-03 |
|  | 40 | 3.68E-01 |
|  | 50 | 4.35E+01 |
|  | 60 | 5.95E+03 |
|  | 70 | 3.13E+05 |
|  | 80 | 4.10E+07 |
|  | 90 | 4.70E+09 |
|  | 100 | 6.09E+11 |
| LP11-LP11 | 30 | 5.36E-04 |
|  | 40 | 2.53E-02 |
|  | 50 | 8.89E-01 |
|  | 60 | 4.11E+01 |
|  | 70 | 9.27E+02 |
|  | 80 | 4.48E+04 |
|  | 90 | 2.02E+06 |
|  | 100 | 9.14E+07 |
| LP21-LP21 | 30 | 3.34E-04 |
|  | 40 | 1.30E-03 |
|  | 50 | 5.50E-03 |
|  | 60 | 2.98E-02 |
|  | 70 | 1.14E-01 |
|  | 80 | 6.40E-01 |
|  | 90 | 3.30E+00 |
|  | 100 | 2.25E+01 |
| LP01-LP11 | 30 | 8.42E+03 |
|  | 40 | 8.60E+07 |
|  | 50 | 4.59E+12 |
|  | 60 | 1.03E+16 |
|  | 70 | 5.47E+17 |
|  | 80 | 4.56E+22 |
|  | 90 | 8.11E+26 |
|  | 100 | 3.78E+29 |
| LP01-LP21 | 30 | 2.72E-03 |
|  | 40 | 1.21E-01 |
|  | 50 | 4.33E+00 |
|  | 60 | 1.45E+02 |
|  | 70 | 2.32E+03 |
|  | 80 | 7.12E+04 |
|  | 90 | 2.09E+06 |
|  | 100 | 7.73E+07 |
| LP11-LP01 | 30 | 1.72E+05 |
|  | 40 | 1.24E+09 |
|  | 50 | 1.86E+13 |
|  | 60 | 9.92E+16 |
|  | 70 | 7.76E+19 |
|  | 80 | 3.11E+22 |
|  | 90 | 4.44E+26 |
|  | 100 | 1.14E+29 |
| LP11-LP21 | 30 | 4.78E+01 |
|  | 40 | 5.95E+03 |
|  | 50 | 5.32E+05 |
|  | 60 | 1.93E+07 |
|  | 70 | 1.63E+09 |
|  | 80 | 5.92E+09 |
|  | 90 | 3.73E+11 |
|  | 100 | 1.03E+13 |
| LP21-LP01 | 30 | 1.03E+01 |
|  | 40 | 4.89E+01 |
|  | 50 | 1.61E+03 |
|  | 60 | 5.41E+04 |
|  | 70 | 8.66E+05 |
|  | 80 | 2.61E+07 |
|  | 90 | 7.79E+08 |
|  | 100 | 2.56E+10 |
| LP21-LP11 | 30 | 2.37E+05 |
|  | 40 | 6.75E+06 |
|  | 50 | 1.46E+07 |
|  | 60 | 4.25E+09 |
|  | 70 | 1.54E+12 |
|  | 80 | 6.90E+12 |
|  | 90 | 3.15E+13 |
|  | 100 | 2.69E+15 |

FIG.35

| MODE | DISTANCE BETWEEN CORES μm | TRANSMISSION DISTANCE m |
|---|---|---|
| LP01-LP01 | 30 | 8.34E-03 |
|  | 40 | 1.07E+00 |
|  | 50 | 1.59E+02 |
|  | 60 | 2.62E+04 |
|  | 70 | 1.62E+06 |
|  | 80 | 2.33E+08 |
|  | 90 | 3.12E+10 |
|  | 100 | 4.52E+12 |
| LP11-LP11 | 30 | 2.60E-03 |
|  | 40 | 1.15E-01 |
|  | 50 | 5.51E+00 |
|  | 60 | 2.72E+02 |
|  | 70 | 7.27E+03 |
|  | 80 | 4.05E+05 |
|  | 90 | 2.28E+07 |
|  | 100 | 1.19E+09 |
| LP21-LP21 | 30 | 1.07E-03 |
|  | 40 | 6.14E-03 |
|  | 50 | 3.97E-02 |
|  | 60 | 2.57E-01 |
|  | 70 | 1.11E+00 |
|  | 80 | 7.19E+00 |
|  | 90 | 4.41E+01 |
|  | 100 | 3.25E+02 |
| LP01-LP11 | 30 | 1.76E+05 |
|  | 40 | 1.65E+09 |
|  | 50 | 3.91E+12 |
|  | 60 | 6.54E+15 |
|  | 70 | 3.60E+18 |
|  | 80 | 4.25E+22 |
|  | 90 | 1.34E+26 |
|  | 100 | 1.79E+29 |
| LP01-LP21 | 30 | 1.47E-01 |
|  | 40 | 8.30E+00 |
|  | 50 | 3.95E+02 |
|  | 60 | 1.76E+04 |
|  | 70 | 3.55E+05 |
|  | 80 | 1.44E+07 |
|  | 90 | 5.64E+08 |
|  | 100 | 2.57E+10 |
| LP11-LP01 | 30 | 2.81E+05 |
|  | 40 | 4.95E+08 |
|  | 50 | 1.22E+12 |
|  | 60 | 1.92E+18 |
|  | 70 | 1.60E+20 |
|  | 80 | 2.44E+25 |
|  | 90 | 3.66E+26 |
|  | 100 | 1.22E+31 |
| LP11-LP21 | 30 | 9.00E+02 |
|  | 40 | 7.58E+04 |
|  | 50 | 3.64E+07 |
|  | 60 | 3.45E+10 |
|  | 70 | 3.39E+11 |
|  | 80 | 7.89E+11 |
|  | 90 | 1.40E+13 |
|  | 100 | 8.75E+14 |
| LP21-LP01 | 30 | 6.92E+00 |
|  | 40 | 3.18E+02 |
|  | 50 | 1.48E+04 |
|  | 60 | 6.71E+05 |
|  | 70 | 1.36E+07 |
|  | 80 | 5.35E+08 |
|  | 90 | 2.13E+10 |
|  | 100 | 9.46E+11 |
| LP21-LP11 | 30 | 2.32E+03 |
|  | 40 | 1.55E+05 |
|  | 50 | 7.02E+06 |
|  | 60 | 9.20E+08 |
|  | 70 | 2.00E+10 |
|  | 80 | 8.38E+11 |
|  | 90 | 3.96E+13 |
|  | 100 | 1.04E+15 |

FIG.37

| MODE | DISTANCE BETWEEN CORES | TRANS-MISSION DISTANCE |
|---|---|---|
| | μm | m |
| LP01-LP01 150-1=>150-2 | 30 | 2.27E+00 |
| | 40 | 5.57E+04 |
| | 50 | 1.01E+09 |
| | 60 | 2.24E+13 |
| | 70 | 6.89E+16 |
| | 80 | 1.17E+21 |
| | 90 | 1.44E+25 |
| | 100 | 2.28E+29 |
| LP11-LP11 150-1=>150-2 | 30 | 7.42E-02 |
| | 40 | 2.46E+02 |
| | 50 | 5.65E+05 |
| | 60 | 9.94E+08 |
| | 70 | 5.18E+11 |
| | 80 | 1.16E+15 |
| | 90 | 2.78E+18 |
| | 100 | 5.34E+21 |
| LP21-LP21 150-1=>150-2 | 30 | 4.60E-03 |
| | 40 | 3.24E-01 |
| | 50 | 9.59E+00 |
| | 60 | 2.94E+02 |
| | 70 | 4.35E+03 |
| | 80 | 1.32E+05 |
| | 90 | 3.66E+06 |
| | 100 | 1.01E+08 |
| LP01-LP01 150-2=>150-1 | 30 | 1.68E+00 |
| | 40 | 3.86E+04 |
| | 50 | 7.25E+08 |
| | 60 | 1.43E+13 |
| | 70 | 4.14E+16 |
| | 80 | 6.12E+20 |
| | 90 | 9.36E+24 |
| | 100 | 1.51E+29 |
| LP11-LP11 150-2=>150-1 | 30 | 4.04E-02 |
| | 40 | 1.62E+02 |
| | 50 | 2.65E+05 |
| | 60 | 6.01E+08 |
| | 70 | 3.29E+11 |
| | 80 | 7.40E+14 |
| | 90 | 1.64E+18 |
| | 100 | 3.03E+21 |
| LP21-LP21 150-2=>150-1 | 30 | 2.15E-03 |
| | 40 | 1.93E-01 |
| | 50 | 6.81E+00 |
| | 60 | 2.21E+02 |
| | 70 | 3.38E+03 |
| | 80 | 1.11E+05 |
| | 90 | 3.27E+06 |
| | 100 | 2.40E+08 |

FIG.39

| MODE | DISTANCE BETWEEN CORES μm | TRANSMISSION DISTANCE m |
|---|---|---|
| LP01-LP01 130-1=>150-2 | 30 | 1.33E+01 |
| | 40 | 4.96E+05 |
| | 50 | 1.35E+10 |
| | 60 | 4.55E+14 |
| | 70 | 1.98E+18 |
| | 80 | 4.99E+22 |
| | 90 | 9.35E+26 |
| | 100 | 2.42E+31 |
| LP11-LP11 130-1=>150-2 | 30 | 2.09E-01 |
| | 40 | 1.10E+03 |
| | 50 | 3.30E+06 |
| | 60 | 9.22E+09 |
| | 70 | 7.08E+12 |
| | 80 | 2.59E+16 |
| | 90 | 8.93E+19 |
| | 100 | 2.81E+23 |
| LP21-LP21 130-1=>150-2 | 30 | 1.02E-02 |
| | 40 | 7.59E-01 |
| | 50 | 2.48E+01 |
| | 60 | 8.62E+02 |
| | 70 | 1.42E+04 |
| | 80 | 5.04E+05 |
| | 90 | 1.58E+07 |
| | 100 | 5.57E+08 |
| LP01-LP01 150-2=>130-1 | 30 | 1.80E+01 |
| | 40 | 7.29E+05 |
| | 50 | 2.11E+10 |
| | 60 | 7.14E+14 |
| | 70 | 3.28E+18 |
| | 80 | 8.43E+22 |
| | 90 | 2.06E+27 |
| | 100 | 5.06E+31 |
| LP11-LP11 150-2=>130-1 | 30 | 1.57E-01 |
| | 40 | 1.21E+03 |
| | 50 | 2.76E+06 |
| | 60 | 9.59E+09 |
| | 70 | 7.67E+12 |
| | 80 | 2.82E+16 |
| | 90 | 1.04E+20 |
| | 100 | 3.17E+23 |
| LP21-LP21 150-2=>130-1 | 30 | 5.10E-03 |
| | 40 | 5.43E-01 |
| | 50 | 2.14E+01 |
| | 60 | 7.91E+02 |
| | 70 | 1.35E+04 |
| | 80 | 5.02E+05 |
| | 90 | 1.68E+07 |
| | 100 | 1.24E+09 |

FIG.40
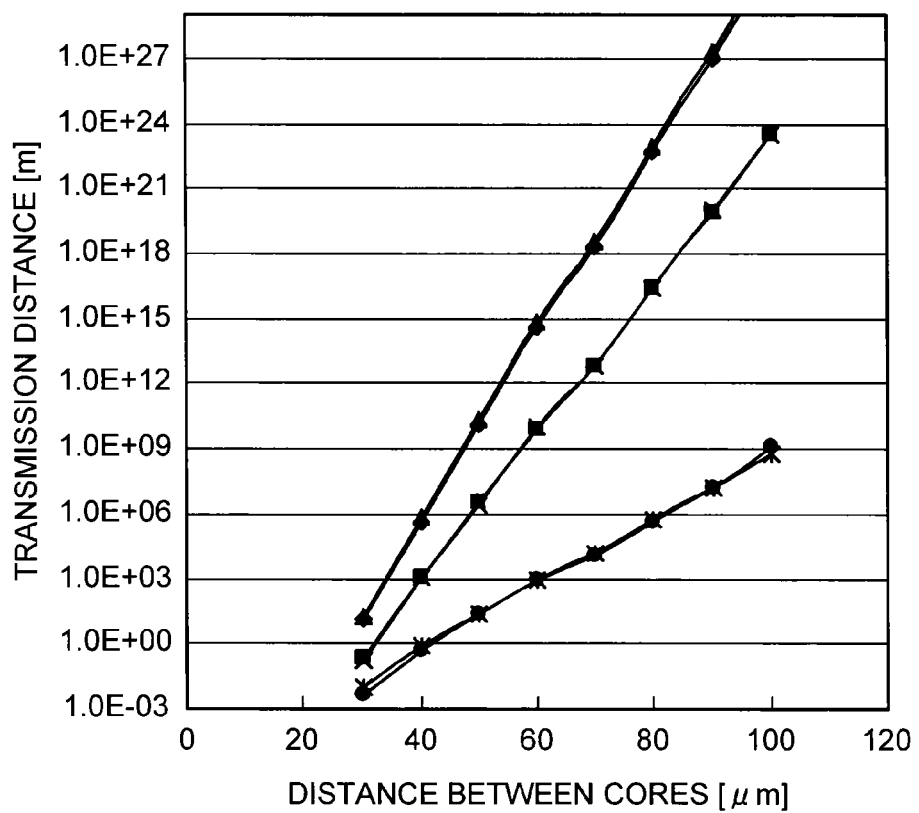
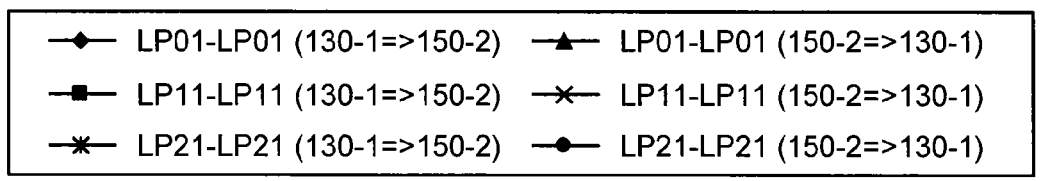

FIG.42

|  | DISPERSION | SLOPE | neff | LEAKAGE LOSS | Aeff | BENDING LOSS |
|---|---|---|---|---|---|---|
|  | ps/nm/km | ps/nm$^2$/km |  | dB/m | $\mu$m$^2$ | dB/m |
| LP01 | 21.5 | 0.064 | 1.44805 | – | 168.7 | 2.9E-06 |
| LP11 | 22.1 | 0.058 | 1.44638 | – | 246.2 | 3.2 |
| LP21 | – | – | 1.44434 | 8.9 | 350.1 | – |

FIG.43

|  | DISPERSION | SLOPE | TRANSMISSION LOSS | Aeff | BENDING LOSS |
|---|---|---|---|---|---|
|  | ps/nm/km | ps/nm$^2$/km | dB/km | $\mu$m$^2$ | dB/m |
| LP01 | 21.6 | 0.065 | 0.200 | 171.5 | 0.12 |
| LP11 | 22.0 | 0.063 | 0.271 | 250.6 | 2.6 |

FIG.49

| R | LP01-LP01 | | LP11-LP11 | |
|---|---|---|---|---|
| | Λ | L | Λ | L |
| mm | μm | km | μm | km |
| 20 | 30 | 4.19E-03 | 30 | 4.75E-04 |
| | 40 | 3.15E+01 | 40 | 2.72E-01 |
| | 50 | 1.96E+05 | 50 | 1.04E+02 |
| | 60 | 1.85E+09 | 60 | 1.09E+05 |
| | 70 | 2.57E+12 | 70 | 2.76E+07 |
| | 80 | 1.41E+16 | 80 | 2.07E+10 |
| | 90 | 9.65E+19 | 90 | 1.45E+13 |
| | 100 | 5.48E+23 | 100 | 7.60E+15 |
| 60 | 30 | 1.40E-03 | 30 | 1.59E-04 |
| | 40 | 1.05E+01 | 40 | 9.05E-02 |
| | 50 | 6.52E+04 | 50 | 3.47E+01 |
| | 60 | 6.17E+08 | 60 | 3.63E+04 |
| | 70 | 8.55E+11 | 70 | 9.18E+06 |
| | 80 | 4.69E+15 | 80 | 6.91E+09 |
| | 90 | 3.22E+19 | 90 | 4.84E+12 |
| | 100 | 1.83E+23 | 100 | 2.54E+15 |
| 100 | 30 | 8.39E-04 | 30 | 9.50E-05 |
| | 40 | 6.30E+00 | 40 | 5.43E-02 |
| | 50 | 3.91E+04 | 50 | 2.08E+01 |
| | 60 | 3.70E+08 | 60 | 2.18E+04 |
| | 70 | 5.13E+11 | 70 | 5.51E+06 |
| | 80 | 2.82E+15 | 80 | 4.15E+09 |
| | 90 | 1.93E+19 | 90 | 2.91E+12 |
| | 100 | 1.10E+23 | 100 | 1.52E+15 |
| 140 | 30 | 5.99E-04 | 30 | 6.78E-05 |
| | 40 | 4.50E+00 | 40 | 3.88E-02 |
| | 50 | 2.79E+04 | 50 | 1.48E+01 |
| | 60 | 2.64E+08 | 60 | 1.55E+04 |
| | 70 | 3.67E+11 | 70 | 3.94E+06 |
| | 80 | 2.01E+15 | 80 | 2.96E+09 |
| | 90 | 1.38E+19 | 90 | 2.07E+12 |
| | 100 | 7.83E+22 | 100 | 1.09E+15 |
| 180 | 30 | 4.66E-04 | 30 | 5.28E-05 |
| | 40 | 3.50E+00 | 40 | 3.01E-02 |
| | 50 | 2.17E+04 | 50 | 1.15E+01 |
| | 60 | 2.06E+08 | 60 | 1.21E+04 |
| | 70 | 2.85E+11 | 70 | 3.06E+06 |
| | 80 | 1.57E+15 | 80 | 2.31E+09 |
| | 90 | 1.07E+19 | 90 | 1.61E+12 |
| | 100 | 6.08E+22 | 100 | 8.45E+14 |

FIG.50

| R | LP01-LP01 | | LP11-LP11 | |
|---|---|---|---|---|
| | Λ | L | Λ | L |
| mm | μm | km | μm | km |
| 20 | 30 | 7.00E-04 | 30 | 7.93E-05 |
| | 40 | 5.26E+00 | 40 | 4.53E-02 |
| | 50 | 3.26E+04 | 50 | 1.74E+01 |
| | 60 | 3.09E+08 | 60 | 1.82E+04 |
| | 70 | 4.29E+11 | 70 | 4.60E+06 |
| | 80 | 2.35E+15 | 80 | 3.46E+09 |
| | 90 | 1.61E+19 | 90 | 2.43E+12 |
| | 100 | 9.15E+22 | 100 | 1.27E+15 |
| 60 | 30 | 2.34E-04 | 30 | 2.65E-05 |
| | 40 | 1.76E+00 | 40 | 1.51E-02 |
| | 50 | 1.09E+04 | 50 | 5.78E+00 |
| | 60 | 1.03E+08 | 60 | 6.05E+03 |
| | 70 | 1.43E+11 | 70 | 1.53E+06 |
| | 80 | 7.83E+14 | 80 | 1.16E+09 |
| | 90 | 5.38E+18 | 90 | 8.09E+11 |
| | 100 | 3.05E+22 | 100 | 4.23E+14 |
| 100 | 30 | 1.40E-04 | 30 | 1.59E-05 |
| | 40 | 1.05E+00 | 40 | 9.07E-03 |
| | 50 | 6.52E+03 | 50 | 3.47E+00 |
| | 60 | 6.19E+07 | 60 | 3.63E+03 |
| | 70 | 8.57E+10 | 70 | 9.20E+05 |
| | 80 | 4.70E+14 | 80 | 6.92E+08 |
| | 90 | 3.22E+18 | 90 | 4.85E+11 |
| | 100 | 1.83E+22 | 100 | 2.54E+14 |
| 140 | 30 | 1.00E-04 | 30 | 1.13E-05 |
| | 40 | 7.52E-01 | 40 | 6.47E-03 |
| | 50 | 4.66E+03 | 50 | 2.48E+00 |
| | 60 | 4.42E+07 | 60 | 2.59E+03 |
| | 70 | 6.12E+10 | 70 | 6.57E+05 |
| | 80 | 3.36E+14 | 80 | 4.95E+08 |
| | 90 | 2.31E+18 | 90 | 3.47E+11 |
| | 100 | 1.31E+22 | 100 | 1.82E+14 |
| 180 | 30 | 7.78E-05 | 30 | 8.82E-06 |
| | 40 | 5.85E-01 | 40 | 5.03E-03 |
| | 50 | 3.63E+03 | 50 | 1.93E+00 |
| | 60 | 3.44E+07 | 60 | 2.02E+03 |
| | 70 | 4.76E+10 | 70 | 5.11E+05 |
| | 80 | 2.61E+14 | 80 | 3.85E+08 |
| | 90 | 1.79E+18 | 90 | 2.70E+11 |
| | 100 | 1.02E+22 | 100 | 1.41E+14 |

| Core No. | | | 1 | 2 | 3 | 4 | 5 | 6 | 7 |
|---|---|---|---|---|---|---|---|---|---|
| LP01 | TRANSMISSION LOSS | dB/km | 1.22 | 1.72 | 1.50 | 2.01 | 1.97 | 1.49 | 2.15 |
| | Aeff | $\mu m^2$ | 170 | 183 | 190 | 182 | 187 | 181 | 185 |
| | BENDING LOSS | dB/m | 0.05 | 0.10 | 0.19 | 0.07 | 0.28 | 0.38 | 0.02 |
| LP11 | TRANSMISSION LOSS | dB/km | 0.96 | 1.30 | 1.21 | 1.73 | 1.83 | 1.39 | 1.62 |
| | Aeff | $\mu m^2$ | 273 | 281 | 272 | 274 | 270 | 277 | 277 |
| | BENDING LOSS | dB/m | 1.52 | 1.55 | 1.48 | 1.93 | 1.45 | 1.15 | 1.87 |

FIG.56

| Core 1 | Core 2 | XT[dB] |
|---|---|---|
| LP01 | LP01 | -64.6 |
|  | LP11 | -64.5 |
| LP11 | LP11 | -57.3 |

FIG.57

| Equivalent tension=30gf | | | Equivalent tension=60gf | | |
|---|---|---|---|---|---|
| Core 1 | Core 2 | XT[dB] | Core 1 | Core 2 | XT[dB] |
| LP01 | LP01 | -63.3 | LP01 | LP01 | -62.1 |
|  | LP11 | -62.8 |  | LP11 | -62.1 |
| LP11 | LP11 | -53.3 | LP11 | LP11 | -50.4 |
| Within Core 1 | | XT[dB] | Within Core 1 | | XT[dB] |
| LP01 | LP11 | -9.3 | LP01 | LP11 | -2.0 |
|  |  |  | Within Core 2 | | XT[dB] |
|  |  |  | LP01 | LP11 | -4.4 |

FIG.60

| Core No. | | | 1 | 2 | 8 | 9 | 19 |
|---|---|---|---|---|---|---|---|
| LP01 | Aeff | $\mu m^2$ | 204 | 227 | 224 | 223 | 211 |
| | BENDING LOSS | dB/m | 1.56 | 1.17 | 1.65 | 1.74 | 1.69 |
| LP11 | Aeff | $\mu m^2$ | 288 | 299 | 319 | 304 | 312 |
| | BENDING LOSS | dB/m | 1.84 | 1.74 | 1.66 | 1.47 | 0.73 |

FIG.61

| XT[dB] of Core | | 1-2 | 2-8 | 1-19 |
|---|---|---|---|---|
| LP01 | LP01 | -65.1 | 45.1 | -63.5 |
| | LP11 | -64.8 | -59.0 | -63.7 |
| LP11 | LP11 | -44.4 | -43.9 | -60.2 |
| Intra-core XT[dB] | | Core 1 | Core 2 | Core 8 |
| LP01 | LP11 | -4.5 | -7.0 | -6.2 |

FIG.64

| No | Ra2 | Ra3 | Δ1 % | Δ2 % | Δ3 % | 2a μm | 2b μm | 2c μm | FUNDAMENTAL (LP01 MODE) | | | | HIGHER-ODER (LP11 MODE) | | | | HIGHER-ODER (LP21 MODE) | | | |
|---|---|---|---|---|---|---|---|---|---|---|---|---|---|---|---|---|---|---|---|---|
| | | | | | | | | | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m |
| 130-1 | 2 | 3 | 0.30 | 0 | -0.5 | 13.2 | 26.4 | 39.6 | 1.447177 | 4.45E-21 | 130.0 | 12.7 | 4.60E-05 | 1.445091 | 5.21E-10 | 229.1 | 17.4 | 3.06E-01 | 1.442883 | 1.02E+01 | 385.2 | 24.4 | 3.98E+01 |
| 130-2 | 2 | 3 | 0.30 | 0 | -0.4 | 13.2 | 26.4 | 39.6 | 1.447178 | 8.91E-21 | 130.1 | 12.7 | 9.89E-05 | 1.445091 | 1.15E-09 | 230.6 | 17.5 | 8.33E-01 | 1.442910 | 2.77E+01 | 404.4 | 27.4 | 1.35E+02 |
| 130-3 | 2 | 3 | 0.30 | 0 | -0.3 | 13.2 | 26.4 | 39.6 | 1.447178 | 9.89E-23 | 130.2 | 12.7 | 2.43E-04 | 1.445099 | 2.07E-10 | 232.7 | 17.6 | 2.78E+00 | 1.442949 | 8.76E+01 | 449.5 | 38.5 | 2.02E+02 |
| 130-4 | 2 | 3 | 0.30 | 0 | -0.2 | 13.2 | 26.4 | 39.6 | 1.447178 | 1.67E-22 | 130.4 | 12.7 | 6.40E-04 | 1.445106 | 5.52E-10 | 235.9 | 17.8 | 1.48E+01 | 1.443013 | 3.40E+02 | 610.5 | 64.5 | 5.86E+02 |
| 130-5 | 2 | 3 | 0.30 | 0 | -0.1 | 13.2 | 26.4 | 39.6 | 1.447179 | 4.99E-22 | 130.6 | 12.7 | 1.96E-03 | 1.445116 | 1.72E-09 | 241.9 | 18.1 | 1.31E+02 | 1.443140 | 1.74E+03 | 2425.9 | 134.6 | 3.12E+03 |
| 130-6 | 2 | 4 | 0.30 | 0 | -0.5 | 13.1 | 26.2 | 52.4 | 1.447161 | 4.70E-22 | 128.8 | 12.6 | 2.60E-07 | 1.445055 | 3.16E-12 | 227.9 | 17.4 | 3.67E-04 | 1.442837 | 1.43E-02 | 381.4 | 22.8 | 1.67E-01 |
| 130-7 | 2 | 4 | 0.30 | 0 | -0.4 | 13.1 | 26.2 | 52.4 | 1.447161 | 1.38E-21 | 128.9 | 12.6 | 1.13E-06 | 1.445059 | 1.57E-11 | 229.5 | 17.4 | 2.37E-03 | 1.442865 | 9.21E-02 | 395.9 | 23.2 | 1.57E+00 |
| 130-8 | 2 | 4 | 0.30 | 0 | -0.3 | 13.1 | 26.2 | 52.4 | 1.447162 | 1.72E-23 | 129.0 | 12.6 | 6.62E-06 | 1.445064 | 7.29E-12 | 231.7 | 17.5 | 2.30E-02 | 1.442906 | 9.17E-01 | 405.8 | 24.2 | 5.74E+00 |
| 130-9 | 2 | 4 | 0.30 | 0 | -0.2 | 13.1 | 26.2 | 52.4 | 1.447162 | 8.03E-23 | 129.2 | 12.7 | 4.63E-05 | 1.445072 | 5.26E-11 | 235.1 | 17.7 | 4.62E-01 | 1.442973 | 1.09E+01 | 473.9 | 27.3 | 5.35E+01 |
| 130-10 | 2 | 4 | 0.30 | 0 | -0.1 | 13.0 | 26.0 | 52.0 | 1.447163 | 3.59E-22 | 129.4 | 12.7 | 4.58E-04 | 1.445083 | 5.50E-10 | 241.2 | 18.1 | 2.15E+01 | 1.443125 | 3.33E+02 | 856.7 | 66.1 | 2.15E+03 |
| 130-11 | 2 | 5 | 0.30 | 0 | -0.5 | 13.1 | 26.2 | 65.5 | 1.447161 | 1.30E-23 | 128.8 | 12.6 | 5.86E-09 | 1.445056 | 1.11E-14 | 228.0 | 17.4 | 4.54E-07 | 1.442837 | 1.71E-05 | 381.5 | 22.8 | 8.57E-04 |
| 130-12 | 2 | 5 | 0.30 | 0 | -0.4 | 13.0 | 26.0 | 65.0 | 1.447144 | 6.58E-23 | 127.7 | 12.6 | 7.62E-09 | 1.445025 | 2.22E-13 | 228.6 | 17.4 | 9.83E-06 | 1.442820 | 3.53E-04 | 395.2 | 23.1 | 3.03E-02 |
| 130-13 | 2 | 5 | 0.30 | 0 | -0.3 | 13.0 | 26.0 | 65.0 | 1.447145 | 2.29E-24 | 127.8 | 12.6 | 1.07E-07 | 1.445030 | 2.57E-13 | 230.9 | 17.5 | 2.63E-04 | 1.442863 | 8.84E-03 | 418.1 | 23.8 | 3.42E-01 |
| 130-14 | 2 | 5 | 0.30 | 0 | -0.2 | 13.0 | 26.0 | 65.0 | 1.447145 | 2.60E-23 | 128.0 | 12.6 | 2.07E-06 | 1.445038 | 4.97E-12 | 234.5 | 17.7 | 2.01E-02 | 1.442933 | 4.40E-01 | 472.1 | 25.3 | 3.61E+01 |
| 130-15 | 2 | 5 | 0.30 | 0 | -0.1 | 13.0 | 26.0 | 65.0 | 1.447146 | 2.70E-22 | 128.2 | 12.6 | 7.38E-05 | 1.445049 | 1.73E-10 | 240.9 | 18.1 | 7.11E+00 | 1.443101 | 8.88E+01 | 762.2 | 43.9 | 3.70E+03 |
| 130-16 | 2 | 3 | 0.30 | 0 | -0.5 | 13.0 | 39.0 | 52.0 | 1.447147 | 7.91E-21 | 128.6 | 12.7 | 3.32E-05 | 1.445070 | 6.39E-10 | 254.7 | 18.8 | 1.33E-01 | 1.443377 | 4.37E+00 | 935.7 | 34.6 | 1.42E+01 |
| 130-17 | 2 | 3 | 0.30 | 0 | -0.4 | 13.0 | 39.0 | 52.0 | 1.447147 | 1.50E-20 | 128.6 | 12.7 | 7.56E-05 | 1.445070 | 1.49E-09 | 255.0 | 18.8 | 3.60E-01 | 1.443392 | 1.20E+01 | 969.0 | 36.0 | 4.03E+01 |
| 130-18 | 2 | 3 | 0.30 | 0 | -0.3 | 13.0 | 39.0 | 52.0 | 1.447147 | 1.58E-22 | 128.6 | 12.7 | 1.96E-04 | 1.445071 | 3.03E-10 | 255.5 | 18.8 | 1.13E+00 | 1.443413 | 3.99E+01 | 1038.9 | 41.7 | 1.35E+02 |
| 130-19 | 2 | 3 | 0.30 | 0 | -0.2 | 13.0 | 39.0 | 52.0 | 1.447147 | 3.31E-22 | 128.6 | 12.7 | 5.58E-04 | 1.445071 | 9.07E-10 | 256.2 | 18.9 | 4.67E+00 | 1.443450 | 1.65E+02 | 1254.0 | 58.4 | 5.69E+02 |
| 130-20 | 2 | 3 | 0.30 | 0 | -0.1 | 13.0 | 39.0 | 52.0 | 1.447147 | 7.41E-22 | 128.6 | 12.7 | 1.94E-03 | 1.445072 | 3.44E-09 | 257.4 | 19.1 | 3.21E+01 | 1.443531 | 9.86E+02 | 2270.9 | 107.7 | 3.22E+03 |
| 130-21 | 3 | 5 | 0.30 | 0 | -0.5 | 13.0 | 39.0 | 65.0 | 1.447147 | 6.28E-22 | 128.6 | 12.7 | 7.71E-08 | 1.445070 | 2.23E-12 | 254.7 | 18.8 | 1.68E-04 | 1.443377 | 4.38E-03 | 932.3 | 34.0 | 3.16E-02 |
| 130-22 | 3 | 5 | 0.30 | 0 | -0.4 | 13.0 | 39.0 | 65.0 | 1.447147 | 1.84E-21 | 128.6 | 12.7 | 4.01E-07 | 1.445070 | 1.18E-11 | 255.0 | 18.8 | 1.04E-03 | 1.443391 | 2.77E-02 | 959.7 | 34.5 | 2.40E-01 |
| 130-23 | 3 | 5 | 0.30 | 0 | -0.3 | 13.0 | 39.0 | 65.0 | 1.447147 | 3.76E-23 | 128.6 | 12.7 | 2.60E-06 | 1.445071 | 5.81E-12 | 255.5 | 18.9 | 8.88E-03 | 1.443412 | 2.28E-01 | 1002.5 | 35.3 | 2.50E+00 |
| 130-24 | 3 | 5 | 0.30 | 0 | -0.2 | 13.0 | 39.0 | 65.0 | 1.447147 | 1.30E-22 | 128.6 | 12.7 | 2.11E-05 | 1.445071 | 4.73E-11 | 256.2 | 18.9 | 1.25E-01 | 1.443448 | 3.05E+00 | 1085.4 | 37.2 | 5.34E+01 |
| 130-25 | 4 | 5 | 0.30 | 0 | -0.5 | 13.0 | 52.0 | 65.0 | 1.447147 | 1.57E-20 | 128.6 | 12.7 | 1.32E-05 | 1.445074 | 5.74E-10 | 259.9 | 19.3 | 3.26E-01 | 1.443720 | 2.06E+00 | 1698.1 | 47.7 | 1.73E+01 |

FIG.65

| No. | Ra2 | Ra3 | Δ1 % | Δ2 % | Δ3 % | 2a μm | 2b μm | 2c μm | FUNDAMENTAL (LP01 MODE) neff | LEAKAGE LOSS dB/m | Aeff μm² | MFD μm | BENDING LOSS dB/m | HIGHER-ODER (LP11 MODE) neff | LEAKAGE LOSS dB/m | Aeff μm² | MFD μm | BENDING LOSS dB/m | HIGHER-ODER (LP21 MODE) neff | LEAKAGE LOSS dB/m | Aeff μm² | MFD μm | BENDING LOSS dB/m |
|---|---|---|---|---|---|---|---|---|---|---|---|---|---|---|---|---|---|---|---|---|---|---|---|
| 150-1 | 2 | 3 | 0.30 | 0 | -0.5 | 14.8 | 29.6 | 44.4 | 1.447409 | 1.46E-21 | 150.6 | 13.6 | 5.01E-06 | 1.445591 | 3.16E-13 | 247.7 | 18.1 | 2.05E-02 | 1.443557 | 1.06E+00 | 388.2 | 23.6 | 5.77E+00 |
| 150-2 | 2 | 3 | 0.30 | 0 | -0.4 | 14.8 | 29.6 | 44.4 | 1.447409 | 2.87E-21 | 150.7 | 13.6 | 1.19E-05 | 1.445592 | 7.66E-13 | 248.4 | 18.2 | 5.67E-02 | 1.443569 | 3.15E+00 | 397.5 | 24.3 | 2.22E+01 |
| 150-3 | 2 | 3 | 0.30 | 0 | -0.3 | 14.8 | 29.6 | 44.4 | 1.447409 | 2.72E-23 | 150.7 | 13.6 | 3.04E-05 | 1.445594 | 7.42E-14 | 249.3 | 18.2 | 1.86E-01 | 1.443585 | 1.08E-02 | 414.2 | 27.1 | 7.28E+01 |
| 150-4 | 2 | 3 | 0.30 | 0 | -0.2 | 14.8 | 29.6 | 44.4 | 1.447409 | 6.14E-23 | 150.8 | 13.6 | 8.85E-05 | 1.445596 | 2.26E-13 | 250.6 | 18.3 | 7.34E-01 | 1.443611 | 4.81E+01 | 457.1 | 36.3 | 2.02E+02 |
| 150-5 | 2 | 3 | 0.30 | 0 | -0.1 | 14.8 | 29.6 | 44.4 | 1.447409 | 1.88E-22 | 150.9 | 13.6 | 3.06E-04 | 1.445599 | 8.03E-13 | 252.8 | 18.4 | 4.47E+00 | 1.443664 | 3.30E+02 | 727.3 | 74.9 | 1.02E+03 |
| 150-6 | 2 | 4 | 0.30 | 0 | -0.5 | 14.6 | 29.2 | 58.4 | 1.447383 | 7.07E-23 | 147.9 | 13.4 | 1.38E-08 | 1.445533 | 1.74E-15 | 245.1 | 18.0 | 1.50E-05 | 1.443478 | 5.80E-04 | 388.0 | 23.3 | 9.78E-03 |
| 150-7 | 2 | 4 | 0.30 | 0 | -0.4 | 14.6 | 29.2 | 58.4 | 1.447383 | 3.31E-22 | 148.0 | 13.4 | 8.30E-08 | 1.445535 | 1.09E-14 | 245.8 | 18.1 | 9.91E-05 | 1.443491 | 4.23E-03 | 397.2 | 23.6 | 1.23E-01 |
| 150-8 | 2 | 5 | 0.30 | 0 | -0.5 | 14.6 | 29.2 | 73.0 | 1.447383 | 1.95E-24 | 147.9 | 13.4 | 1.58E-11 | 1.445533 | 5.08E-18 | 245.2 | 18.1 | 7.46E-09 | 1.443478 | 3.02E-07 | 388.1 | 23.3 | 2.21E-05 |
| 150-9 | 2 | 5 | 0.30 | 0 | -0.4 | 14.6 | 29.2 | 73.0 | 1.447383 | 1.57E-23 | 148.0 | 13.4 | 2.30E-10 | 1.445535 | 7.50E-17 | 245.9 | 18.1 | 1.30E-07 | 1.443491 | 3.83E-06 | 397.2 | 23.6 | 9.56E-04 |

FIG.66

| No. | Ra2 | Ra3 | Δ1 % | Δ2 % | Δ3 % | 2a μm | 2b μm | 2c μm | FUNDAMENTAL (LP01 MODE) | | | | HIGHER-ORDER (LP11 MODE) | | | | HIGHER-ORDER (LP21 MODE) | | | |
|---|---|---|---|---|---|---|---|---|---|---|---|---|---|---|---|---|---|---|---|---|
| | | | | | | | | | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m |
| 170-1 | 2 | 3 | 0.25 | 0 | -0.5 | 15.5 | 31.0 | 46.5 | 1.446832 | 4.16E-20 | 170.32 | 14.45 | 2.27E-04 | 1.445229 | 3.37E-11 | 286.7 | 19.5 | 4.51E-02 | 1.443467 | 8.77E-01 | 456.7 | 25.3 | 4.90E+00 |
| 170-2 | 2 | 3 | 0.25 | 0 | -0.4 | 15.5 | 31.0 | 46.5 | 1.446832 | 8.46E-20 | 170.40 | 14.45 | 5.95E-04 | 1.445230 | 8.74E-11 | 287.8 | 19.6 | 1.35E-01 | 1.443480 | 2.74E+00 | 468.7 | 26.0 | 1.31E+01 |
| 170-3 | 2 | 3 | 0.25 | 0 | -0.3 | 15.5 | 31.0 | 46.5 | 1.446833 | 2.00E-19 | 170.49 | 14.46 | 1.74E-03 | 1.445233 | 2.52E-10 | 289.3 | 19.6 | 4.74E-01 | 1.443498 | 1.02E+01 | 489.7 | 27.8 | 3.91E+01 |
| 170-4 | 2 | 3 | 0.25 | 0 | -0.2 | 15.5 | 31.0 | 46.5 | 1.446833 | 5.21E-19 | 170.61 | 14.47 | 5.93E-03 | 1.445236 | 8.39E-10 | 291.5 | 19.7 | 2.17E+00 | 1.443527 | 5.02E+01 | 542.3 | 35.1 | 1.60E+02 |
| 170-5 | 2 | 3 | 0.25 | 0 | -0.1 | 15.5 | 31.0 | 46.5 | 1.446833 | 1.64E-18 | 170.78 | 14.49 | 2.57E-02 | 1.445240 | 3.52E-09 | 295.4 | 19.9 | 2.07E+01 | 1.443589 | 4.01E+02 | 851.4 | 69.7 | 1.25E+03 |
| 170-6 | 2 | 4 | 0.25 | 0 | -0.5 | 15.3 | 30.6 | 61.2 | 1.446810 | 3.35E-21 | 167.48 | 14.33 | 1.68E-07 | 1.445181 | 8.63E-14 | 283.9 | 19.4 | 2.14E-05 | 1.443402 | 3.47E-04 | 455.2 | 25.1 | 4.94E-03 |
| 170-7 | 2 | 4 | 0.25 | 0 | -0.4 | 15.3 | 30.6 | 61.2 | 1.446811 | 1.06E-20 | 167.56 | 14.34 | 1.22E-06 | 1.445183 | 6.33E-13 | 285.1 | 19.5 | 1.61E-04 | 1.443416 | 2.79E-03 | 467.2 | 25.4 | 3.60E-02 |
| 170-8 | 2 | 4 | 0.25 | 0 | -0.3 | 15.3 | 30.6 | 61.2 | 1.446811 | 3.78E-20 | 167.66 | 14.35 | 1.07E-05 | 1.445186 | 5.35E-12 | 286.8 | 19.5 | 1.70E-03 | 1.443436 | 3.17E-02 | 486.0 | 25.9 | 3.34E-01 |
| 170-9 | 2 | 4 | 0.25 | 0 | -0.2 | 15.3 | 30.6 | 61.2 | 1.446811 | 1.54E-19 | 167.80 | 14.36 | 1.28E-04 | 1.445189 | 5.81E-11 | 289.2 | 19.7 | 3.12E-02 | 1.443468 | 6.14E-01 | 522.2 | 26.9 | 6.69E+00 |
| 170-10 | 2 | 4 | 0.25 | 0 | -0.1 | 15.3 | 30.6 | 61.2 | 1.446811 | 8.21E-19 | 167.98 | 14.38 | 2.63E-03 | 1.445191 | 1.03E-09 | 294.2 | 19.9 | 7.04E+00 | 1.443537 | 3.28E+01 | 653.9 | 34.9 | 9.21E+02 |
| 170-11 | 2 | 5 | 0.25 | 0 | -0.5 | 15.3 | 30.6 | 76.5 | 1.446810 | 2.30E-23 | 167.48 | 14.33 | 6.69E-11 | 1.445181 | 1.27E-16 | 284.0 | 19.4 | 8.61E-09 | 1.443402 | 8.79E-08 | 455.3 | 25.1 | 7.64E-06 |
| 170-12 | 2 | 5 | 0.25 | 0 | -0.4 | 15.3 | 30.6 | 76.5 | 1.446811 | 1.74E-22 | 167.56 | 14.34 | 1.24E-09 | 1.445183 | 2.39E-15 | 285.2 | 19.5 | 1.86E-07 | 1.443416 | 1.94E-06 | 467.2 | 25.4 | 1.86E-04 |
| 170-13 | 2 | 5 | 0.25 | 0 | -0.3 | 15.3 | 30.6 | 76.5 | 1.446811 | 1.57E-21 | 167.66 | 14.35 | 3.25E-08 | 1.445186 | 5.69E-14 | 286.9 | 19.5 | 6.84E-06 | 1.443436 | 7.03E-05 | 486.0 | 25.9 | 6.82E-03 |
| 170-14 | 2 | 5 | 0.25 | 0 | -0.2 | 15.3 | 30.6 | 76.5 | 1.446811 | 1.89E-20 | 167.80 | 14.36 | 1.41E-06 | 1.445189 | 1.99E-12 | 289.3 | 19.7 | 6.31E-04 | 1.443468 | 5.63E-03 | 521.9 | 26.8 | 1.01E+00 |
| 170-15 | 2 | 5 | 0.25 | 0 | -0.1 | 15.3 | 30.6 | 76.5 | 1.446811 | 3.49E-19 | 167.98 | 14.38 | 1.57E-04 | 1.445194 | 1.37E-10 | 293.6 | 19.9 | 3.38E+00 | 1.443576 | 6.87E+00 | 741.9 | 35.9 | 1.16E+03 |
| 170-16 | 2 | 3 | 0.30 | 0 | -0.5 | 16.2 | 32.4 | 48.6 | 1.447571 | 5.20E-22 | 170.39 | 14.36 | 1.09E-06 | 1.445955 | 2.50E-15 | 267.8 | 18.9 | 2.33E-03 | 1.444073 | 1.07E-01 | 384.6 | 23.7 | 1.06E+00 |
| 170-17 | 2 | 3 | 0.30 | 0 | -0.4 | 16.2 | 32.4 | 48.6 | 1.447571 | 5.20E-22 | 170.42 | 14.36 | 2.81E-06 | 1.445956 | 6.44E-15 | 268.2 | 18.9 | 6.80E-03 | 1.444078 | 3.38E-01 | 389.3 | 24.0 | 2.54E+00 |
| 170-18 | 2 | 3 | 0.30 | 0 | -0.3 | 16.2 | 32.4 | 48.6 | 1.447571 | 1.37E-21 | 170.45 | 14.36 | 7.91E-06 | 1.445956 | 1.82E-14 | 268.6 | 18.9 | 2.28E-02 | 1.444080 | 1.27E+00 | 396.8 | 24.6 | 1.08E+01 |
| 170-19 | 2 | 3 | 0.30 | 0 | -0.2 | 16.2 | 32.4 | 48.6 | 1.447571 | 8.91E-21 | 170.48 | 14.36 | 2.53E-05 | 1.445957 | 5.81E-14 | 269.2 | 18.9 | 9.47E-02 | 1.444095 | 5.93E+00 | 411.4 | 26.7 | 6.52E+01 |
| 170-20 | 2 | 3 | 0.30 | 0 | -0.1 | 16.2 | 32.4 | 48.6 | 1.447572 | 2.61E-20 | 170.53 | 14.37 | 9.72E-05 | 1.445958 | 2.24E-13 | 270.1 | 19.0 | 5.65E-01 | 1.444115 | 4.45E+01 | 473.7 | 41.2 | 7.38E+02 |

FIG.67

| No. | Ra2 | Ra3 | Δ1 % | Δ2 % | Δ3 % | 2a μm | 2b μm | 2c μm | FUNDAMENTAL (LP01 MODE) | | | | HIGHER-ODER (LP11 MODE) | | | | HIGHER-ODER (LP21 MODE) | | | |
|---|---|---|---|---|---|---|---|---|---|---|---|---|---|---|---|---|---|---|---|---|
| | | | | | | | | | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m |
| 170-21 | 2 | 4 | 0.30 | 0 | -0.5 | 16.0 | 32.0 | 64.0 | 1.447550 | 3.36E-23 | 167.47 | 14.24 | 1.30E-09 | 1.445906 | 6.76E-18 | 264.7 | 18.8 | 1.04E-06 | 1.444003 | 2.27E-05 | 385.0 | 23.6 | 6.89E-04 |
| 170-22 | 2 | 4 | 0.30 | 0 | -0.4 | 16.0 | 32.0 | 64.0 | 1.447550 | 1.45E-22 | 167.49 | 14.24 | 1.00E-08 | 1.445907 | 5.55E-17 | 265.1 | 18.8 | 7.27E-06 | 1.444008 | 1.77E-04 | 389.9 | 23.8 | 4.98E-03 |
| 170-23 | 2 | 4 | 0.30 | 0 | -0.3 | 16.0 | 32.0 | 64.0 | 1.447550 | 5.21E-22 | 167.53 | 14.25 | 8.76E-08 | 1.445908 | 4.89E-16 | 265.6 | 18.8 | 7.03E-05 | 1.444016 | 1.96E-03 | 397.2 | 24.0 | 7.91E-02 |
| 170-24 | 2 | 4 | 0.30 | 0 | -0.2 | 16.0 | 32.0 | 64.0 | 1.447550 | 3.27E-21 | 167.57 | 14.25 | 9.67E-07 | 1.445909 | 5.15E-15 | 266.2 | 18.8 | 1.08E-03 | 1.444023 | 3.63E-02 | 410.2 | 24.5 | 2.86E+00 |
| 170-25 | 2 | 4 | 0.30 | 0 | -0.1 | 16.0 | 32.0 | 64.0 | 1.447550 | 2.05E-20 | 167.62 | 14.26 | 1.59E-05 | 1.445907 | 7.84E-14 | 267.7 | 18.9 | 3.75E-02 | 1.444050 | 1.73E+00 | 441.1 | 26.1 | 2.19E+02 |
| 170-26 | 2 | 5 | 0.30 | 0 | -0.5 | 16.0 | 32.0 | 80.0 | 1.447550 | 1.25E-24 | 167.47 | 14.24 | 7.18E-13 | 1.445907 | 1.63E-20 | 264.7 | 18.8 | 2.38E-10 | 1.444003 | 2.43E-09 | 385.0 | 23.6 | 7.32E-07 |
| 170-27 | 2 | 5 | 0.30 | 0 | -0.4 | 16.0 | 32.0 | 80.0 | 1.447550 | 7.42E-24 | 167.49 | 14.24 | 1.44E-11 | 1.445907 | 1.14E-19 | 265.1 | 18.8 | 4.71E-09 | 1.444008 | 5.26E-08 | 389.9 | 23.8 | 1.31E-05 |
| 170-28 | 2 | 5 | 0.30 | 0 | -0.3 | 16.0 | 32.0 | 80.0 | 1.447550 | 5.27E-23 | 170.43 | 14.30 | 3.76E-10 | 1.445908 | 7.64E-18 | 265.6 | 18.8 | 1.53E-07 | 1.444016 | 1.84E-06 | 397.2 | 24.0 | 9.94E-04 |
| 170-29 | 2 | 5 | 0.30 | 0 | -0.2 | 16.0 | 32.0 | 80.0 | 1.447550 | 1.54E-22 | 167.57 | 14.25 | 1.50E-08 | 1.445909 | 2.55E-16 | 266.2 | 18.8 | 1.04E-05 | 1.444028 | 1.32E-04 | 409.7 | 24.4 | 3.73E-01 |
| 170-30 | 2 | 5 | 0.30 | 0 | -0.1 | 16.0 | 32.0 | 80.0 | 1.447550 | 3.37E-21 | 167.62 | 14.26 | 1.25E-06 | 1.445910 | 1.42E-14 | 267.3 | 18.9 | 2.91E-03 | 1.444050 | 3.78E-02 | 439.9 | 25.5 | 3.07E+02 |
| 170-31 | 2 | 3 | 0.35 | 0 | -0.5 | 16.7 | 33.4 | 50.1 | 1.448302 | 9.23E-24 | 170.42 | 14.30 | 1.88E-09 | 1.446678 | 1.34E-18 | 256.8 | 18.5 | 4.79E-05 | 1.444713 | 4.14E-10 | 332.6 | 22.4 | 1.32E-01 |
| 170-32 | 2 | 3 | 0.35 | 0 | -0.4 | 16.7 | 33.4 | 50.1 | 1.448302 | 2.51E-23 | 170.42 | 14.30 | 4.73E-09 | 1.446678 | 3.39E-18 | 256.9 | 18.5 | 1.33E-04 | 1.444715 | 3.24E-10 | 334.1 | 22.4 | 4.72E-01 |
| 170-33 | 2 | 3 | 0.35 | 0 | -0.3 | 16.7 | 33.4 | 50.1 | 1.448302 | 5.27E-23 | 170.43 | 14.30 | 1.29E-08 | 1.446678 | 9.29E-18 | 257.1 | 18.5 | 4.19E-04 | 1.444717 | 7.51E-10 | 336.1 | 22.5 | 2.13E+00 |
| 170-34 | 2 | 3 | 0.35 | 0 | -0.2 | 16.7 | 33.4 | 50.1 | 1.448302 | 7.14E-23 | 170.45 | 14.30 | 3.90E-08 | 1.446679 | 2.83E-17 | 257.2 | 18.5 | 1.55E-03 | 1.444721 | 6.63E-09 | 339.3 | 22.7 | 1.46E+01 |
| 170-35 | 2 | 3 | 0.35 | 0 | -0.1 | 16.7 | 33.4 | 50.1 | 1.448302 | 2.64E-22 | 170.46 | 14.30 | 1.37E-07 | 1.446679 | 1.00E-16 | 257.5 | 18.5 | 7.46E-03 | 1.444726 | 4.12E-08 | 345.4 | 22.9 | 1.05E+02 |
| 170-36 | 2 | 3 | 0.25 | 0 | -0.5 | 15.3 | 45.9 | 61.2 | 1.446812 | 3.59E-20 | 168.28 | 14.42 | 8.00E-05 | 1.445204 | 4.55E-11 | 303.3 | 20.4 | 3.07E-02 | 1.443724 | 4.11E-01 | 1078.2 | 36.7 | 3.60E+00 |
| 170-37 | 2 | 4 | 0.25 | 0 | -0.4 | 15.3 | 45.9 | 61.2 | 1.446812 | 7.33E-20 | 168.28 | 14.42 | 2.24E-04 | 1.445204 | 1.21E-10 | 303.4 | 20.4 | 9.90E-02 | 1.443731 | 1.31E+00 | 1107.6 | 37.2 | 1.22E+01 |
| 170-38 | 2 | 4 | 0.25 | 0 | -0.3 | 15.3 | 45.9 | 61.2 | 1.446812 | 1.65E-19 | 168.28 | 14.42 | 7.16E-04 | 1.445204 | 3.58E-10 | 303.6 | 20.4 | 3.89E-01 | 1.443740 | 5.03E+00 | 1155.8 | 38.5 | 5.09E+01 |
| 170-39 | 2 | 4 | 0.25 | 0 | -0.2 | 15.3 | 45.9 | 61.2 | 1.446812 | 4.13E-19 | 168.28 | 14.42 | 2.80E-03 | 1.445204 | 1.25E-09 | 303.8 | 20.5 | 2.13E+00 | 1.443756 | 2.61E+01 | 1262.2 | 42.7 | 2.83E+02 |
| 170-40 | 2 | 4 | 0.25 | 0 | -0.1 | 15.3 | 45.9 | 61.2 | 1.446812 | 1.22E-18 | 168.28 | 14.42 | 1.55E-02 | 1.445204 | 5.68E-09 | 304.2 | 20.5 | 2.31E+01 | 1.443794 | 2.41E+02 | 1705.2 | 67.1 | 2.23E+03 |

FIG. 68

| No. | Ra2 | Ra3 | Δ1 % | Δ2 % | Δ3 % | 2a μm | 2b μm | 2c μm | FUNDAMENTAL (LP01 MODE) neff | LEAKAGE LOSS dB/m | Aeff μm² | MFD μm | BENDING LOSS dB/m | HIGHER-ODER (LP11 MODE) neff | LEAKAGE LOSS dB/m | Aeff μm² | MFD μm | BENDING LOSS dB/m | HIGHER-ODER (LP21 MODE) neff | LEAKAGE LOSS dB/m | Aeff μm² | MFD μm | BENDING LOSS dB/m |
|---|---|---|---|---|---|---|---|---|---|---|---|---|---|---|---|---|---|---|---|---|---|---|---|
| 170-41 | 3 | 5 | 0.25 | 0 | -0.5 | 15.2 | 45.6 | 76.0 | 1.446801 | 3.89E-21 | 166.91 | 14.37 | 3.03E-08 | 1.445181 | 7.97E-14 | 303.0 | 20.4 | 1.78E-05 | 1.443706 | 1.21E-04 | 1086.2 | 36.7 | 3.06E-03 |
| 170-42 | 3 | 5 | 0.25 | 0 | -0.4 | 15.2 | 45.6 | 76.0 | 1.446801 | 1.29E-20 | 166.91 | 14.37 | 2.37E-07 | 1.445181 | 5.99E-13 | 303.1 | 20.4 | 1.49E-04 | 1.443713 | 9.75E-04 | 1115.4 | 37.1 | 3.31E-02 |
| 170-43 | 3 | 5 | 0.25 | 0 | -0.3 | 15.2 | 45.6 | 76.0 | 1.446801 | 4.73E-20 | 166.92 | 14.37 | 2.34E-06 | 1.445182 | 5.25E-12 | 303.3 | 20.4 | 1.88E-03 | 1.443723 | 1.11E-02 | 1160.1 | 37.8 | 5.70E-01 |
| 170-44 | 3 | 5 | 0.25 | 0 | -0.2 | 15.2 | 45.6 | 76.0 | 1.446801 | 2.15E-19 | 166.92 | 14.37 | 3.39E-05 | 1.445182 | 6.02E-11 | 303.6 | 20.5 | 4.68E-02 | 1.443740 | 2.16E-01 | 1242.1 | 39.1 | 2.36E+01 |
| 170-45 | 3 | 5 | 0.25 | 0 | -0.1 | 15.2 | 45.6 | 76.0 | 1.446801 | 1.29E-18 | 166.92 | 14.37 | 1.01E-03 | 1.445182 | 1.12E-09 | 304.1 | 20.5 | 5.54E+00 | 1.443779 | 1.21E+01 | 1490.2 | 44.1 | 2.23E+03 |
| 170-46 | 3 | 4 | 0.30 | 0 | -0.5 | 16.0 | 48.0 | 64.0 | 1.447550 | 1.19E-21 | 167.70 | 14.27 | 5.90E-07 | 1.445913 | 4.18E-15 | 269.2 | 19.0 | 8.19E-04 | 1.444109 | 2.64E-02 | 565.5 | 29.1 | 1.29E+00 |
| 170-47 | 3 | 4 | 0.30 | 0 | -0.4 | 16.0 | 48.0 | 64.0 | 1.447550 | 2.79E-21 | 167.70 | 14.27 | 1.60E-06 | 1.445909 | 1.12E-14 | 269.7 | 19.1 | 2.58E-03 | 1.444110 | 8.55E-02 | 570.9 | 29.3 | 4.88E+00 |
| 170-48 | 3 | 4 | 0.30 | 0 | -0.3 | 16.0 | 48.0 | 64.0 | 1.447550 | 6.25E-21 | 167.70 | 14.27 | 4.8453E-06 | 1.445913 | 3.07E-14 | 269.2 | 19.0 | 9.70E-03 | 1.444112 | 3.32E-01 | 579.1 | 29.7 | 2.36E+01 |
| 170-49 | 3 | 4 | 0.30 | 0 | -0.2 | 16.0 | 48.0 | 64.0 | 1.447550 | 1.67E-20 | 167.70 | 14.27 | 1.72E-05 | 1.445913 | 9.93E-14 | 269.2 | 19.0 | 4.81E-02 | 1.444115 | 1.73E+00 | 594.7 | 30.7 | 1.67E+02 |
| 170-50 | 3 | 4 | 0.30 | 0 | -0.1 | 16.0 | 48.0 | 64.0 | 1.447550 | 1.37E-20 | 167.61 | 14.25 | 1.58E-05 | 1.445910 | 7.61E-14 | 267.1 | 18.9 | 3.64E-02 | 1.444047 | 1.72E+00 | 431.1 | 26.1 | 6.07E+02 |
| 170-51 | 3 | 5 | 0.30 | 0 | -0.5 | 16.0 | 48.0 | 80.0 | 1.447550 | 2.89E-23 | 167.70 | 14.27 | 2.23E-10 | 1.445913 | 5.75E-18 | 269.0 | 19.0 | 2.24E-07 | 1.444109 | 3.38E-06 | 565.5 | 29.1 | 6.84E-04 |
| 170-52 | 3 | 5 | 0.30 | 0 | -0.4 | 16.0 | 48.0 | 80.0 | 1.447550 | 1.14E-22 | 167.70 | 14.27 | 1.85E-09 | 1.445913 | 4.83E-17 | 269.0 | 19.0 | 1.89E-06 | 1.444110 | 2.79E-05 | 570.8 | 29.3 | 8.96E-03 |
| 170-53 | 3 | 5 | 0.30 | 0 | -0.3 | 16.0 | 48.0 | 80.0 | 1.447550 | 5.25E-22 | 166.92 | 14.37 | 1.86E-08 | 1.445913 | 4.37E-16 | 269.0 | 19.0 | 2.31E-05 | 1.444112 | 3.29E-04 | 578.7 | 29.5 | 2.01E-01 |
| 170-54 | 3 | 5 | 0.30 | 0 | -0.2 | 16.0 | 48.0 | 80.0 | 1.447550 | 2.18E-21 | 167.70 | 14.27 | 2.54E-07 | 1.445913 | 4.72E-15 | 269.0 | 19.0 | 5.01E-04 | 1.444115 | 6.60E-03 | 592.6 | 30.0 | 1.30E+01 |
| 170-55 | 3 | 5 | 0.30 | 0 | -0.1 | 16.0 | 48.0 | 80.0 | 1.447550 | 1.76E-20 | 167.70 | 14.27 | 6.07E-06 | 1.445913 | 7.22E-14 | 269.1 | 19.0 | 3.62E-02 | 1.444121 | 3.92E-01 | 627.2 | 31.3 | 1.85E+03 |
| 170-56 | 3 | 5 | 0.25 | 0 | -0.5 | 15.2 | 45.6 | 76.0 | 1.446801 | 7.23E-20 | 166.92 | 14.37 | 2.66E-05 | 1.445182 | 6.14E-11 | 305.1 | 20.6 | 1.01E+00 | 1.443912 | 2.55E-01 | 2265.2 | 52.9 | 5.63E+00 |
| 170-57 | 4 | 4 | 0.25 | 0 | -0.4 | 15.2 | 45.6 | 76.0 | 1.446801 | 1.53E-19 | 166.92 | 14.37 | 7.96E-05 | 1.445182 | 1.63E-10 | 305.2 | 20.6 | 3.25E+00 | 1.443917 | 8.06E+00 | 2302.7 | 53.4 | 1.89E+01 |
| 170-58 | 4 | 5 | 0.30 | 0 | -0.3 | 15.2 | 45.6 | 76.0 | 1.446801 | 3.57E-19 | 167.70 | 14.27 | 2.79E-04 | 1.445182 | 4.85E-10 | 305.2 | 20.6 | 1.26E+01 | 1.443924 | 3.07E+00 | 2362.5 | 54.4 | 7.70E+01 |
| 170-59 | 4 | 5 | 0.25 | 0 | -0.2 | 15.2 | 45.6 | 76.0 | 1.446801 | 9.29E-19 | 166.92 | 14.37 | 1.26E-03 | 1.445182 | 1.70E-09 | 305.2 | 20.6 | 6.52E+01 | 1.443936 | 1.58E+01 | 2486.2 | 57.2 | 4.03E+02 |
| 170-60 | 4 | 5 | 0.25 | 0 | -0.1 | 15.2 | 45.6 | 80.0 | 1.446801 | 2.81E-18 | 166.92 | 14.37 | 9.20E-03 | 1.445182 | 7.78E-09 | 305.2 | 20.6 | 1.93E+02 | 1.443964 | 1.48E+02 | 2652.9 | 76.7 | 4.36E+03 |
| 170-61 | 4 | 5 | 0.30 | 0 | -0.5 | 16.0 | 64.0 | 80.0 | 1.447550 | 5.43E-22 | 167.70 | 14.27 | 1.59E-07 | 1.445182 | 4.11E-15 | 268.8 | 19.1 | 2.86E-03 | 1.444146 | 1.64E-02 | 824.3 | 36.8 | 2.83E+00 |
| 170-62 | 4 | 5 | 0.30 | 0 | -0.4 | 16.0 | 64.0 | 80.0 | 1.447550 | 1.06E-21 | 167.70 | 14.27 | 4.66E-07 | 1.445913 | 1.05E-14 | 268.9 | 19.1 | 1.27E-02 | 1.444147 | 5.43E-02 | 833.9 | 37.1 | 9.93E+00 |
| 170-63 | 4 | 5 | 0.30 | 0 | -0.3 | 16.0 | 64.0 | 80.0 | 1.447550 | 2.27E-21 | 167.70 | 14.27 | 1.57E-06 | 1.445909 | 3.18E-14 | 269.3 | 19.1 | 8.98E-02 | 1.444148 | 2.18E-01 | 848.6 | 37.5 | 4.25E+01 |
| 170-64 | 4 | 5 | 0.30 | 0 | -0.2 | 16.0 | 64.0 | 80.0 | 1.447550 | 6.36E-21 | 167.70 | 14.27 | 6.53E-06 | 1.445913 | 9.91E-14 | 268.8 | 19.1 | 2.72E+00 | 1.444150 | 1.20E+00 | 876.1 | 38.5 | 2.44E+02 |
| 170-65 | 4 | 5 | 0.30 | 0 | -0.1 | 16.0 | 64.0 | 80.0 | 1.447550 | 1.81E-20 | 167.70 | 14.27 | 3.9243E-05 | 1.445913 | 3.91E-13 | 268.8 | 19.1 | 3.73E+00 | 1.444154 | 1.30E+01 | 964.1 | 43.8 | 1.99E+03 |

FIG.69

| R mm | MODE | DISTANCE BETWEEN CORES μm | TRANSMISSION DISTANCE km |
|---|---|---|---|
| 20 | LP01-LP01 | 30 | 6.60E-04 |
| | | 40 | 4.05E+02 |
| | | 50 | 1.06E+06 |
| | | 60 | 2.94E+09 |
| | | 70 | 1.24E+12 |
| | LP11-LP11 | 30 | 1.02E-05 |
| | | 40 | 7.77E-01 |
| | | 50 | 9.95E+04 |
| | | 60 | 8.52E+07 |
| | | 70 | 5.48E+06 |
| 60 | LP01-LP01 | 30 | 2.20E-04 |
| | | 40 | 1.35E+02 |
| | | 50 | 3.51E+05 |
| | | 60 | 9.80E+08 |
| | | 70 | 4.13E+11 |
| | LP11-LP11 | 30 | 3.39E-06 |
| | | 40 | 2.59E-01 |
| | | 50 | 3.31E+04 |
| | | 60 | 2.84E+07 |
| | | 70 | 1.83E+06 |
| 100 | LP01-LP01 | 30 | 1.32E-04 |
| | | 40 | 8.10E+01 |
| | | 50 | 2.11E+05 |
| | | 60 | 5.88E+08 |
| | | 70 | 2.48E+11 |
| | LP11-LP11 | 30 | 2.04E-06 |
| | | 40 | 1.56E-01 |
| | | 50 | 1.99E+04 |
| | | 60 | 1.71E+07 |
| | | 70 | 1.10E+06 |
| 140 | LP01-LP01 | 30 | 9.42E-05 |
| | | 40 | 5.78E+01 |
| | | 50 | 1.51E+05 |
| | | 60 | 4.20E+08 |
| | | 70 | 1.77E+11 |
| | LP11-LP11 | 30 | 1.46E-06 |
| | | 40 | 1.11E-01 |
| | | 50 | 1.42E+04 |
| | | 60 | 1.22E+07 |
| | | 70 | 7.82E+05 |
| 180 | LP01-LP01 | 30 | 7.33E-05 |
| | | 40 | 4.50E+01 |
| | | 50 | 1.17E+05 |
| | | 60 | 3.27E+08 |
| | | 70 | 1.38E+11 |
| | LP11-LP11 | 30 | 1.13E-06 |
| | | 40 | 8.63E-02 |
| | | 50 | 1.11E+04 |
| | | 60 | 9.48E+06 |
| | | 70 | 6.08E+05 |

MULTI-CORE OPTICAL FIBER AND OPTICAL TRANSMISSION SYSTEM

CROSS-REFERENCE TO RELATED APPLICATION

This application is a continuation of PCT International Application No. PCT/JP2012/061540 filed on May 1, 2012 which claims the benefit of priority from Japanese Patent Application No. 2011-173249 filed on Aug. 8, 2011 and No. 2012-047319 filed on Mar. 2, 2012, the entire contents of which are incorporated herein by reference.

BACKGROUND OF THE INVENTION

1. Field of the Invention

The present invention relates to a multi-core optical fiber and an optical transmission system.

2. Description of the Related Art

It is foreseeable that the time will come that, along with drastic increase in Internet traffic in recent years, the transmission capacity is short only by a transmission method using only a fundamental mode of an optical fiber for transmission. As a method for solving this, spatial multiplexing technology using a multi-core optical fiber or mode-multiplexing technology using a multi-mode optical fiber is regarded as promising. For example, in Katsunori Imamura, et al., "Effective Space Division Multiplexing by Multi-Core Fibers," ECOC2010, P1. 09 (2010), optimal designing regarding an SMF-type solid-type multi-core optical fiber is reported. In addition, in Katsunori Imamura, et al., "Multi-core holey fibers for the long-distance (>100 km) ultra large capacity transmission," OFC/NFOEC 2009, OTuC3(2009), optimal designing regarding a holey-type multi-core optical fiber is reported. Furthermore, in Nobutomo Hanzawa, el al., "Demonstration of mode-division multiplexing transmission over 10 km 2-mode fiber with mode coupler," OFC/NFOEC2011, OWA4(2011), the result of evaluation for transmission characteristics using a 2-mode optical fiber is reported. On the other hand, it is also considered to be a future important object, along with increase in transmission capacity, to restrain non-linear phenomenon in an optical fiber by enlarging effective core area $A_{eff}$ of the optical fiber. For example, in Marianne Bigot-Astruc, et al., "125 μm glass diameter single-mode fiber with Aeff of 155 μm$^2$," OFC/NFOEC2011, OTuJ2 (2011), an optical fiber of which $A_{eff}$ is enlarged to 155 μm$^2$ by optimizing refractive index profile by using trench structure is proposed. In addition, In Yoshinori Yamamoto, et al., "OSNR-Enhancing Pure-Silica-Core Fiber with Large Effective Area and Low Attenuation," OFC/NFOEC2010, OTuI2(2010), an optical fiber of which $A_{eff}$ is enlarged to 134 μm$^2$ by optimizing refractive index profile by using a W-shaped structure is also proposed.

SUMMARY OF THE INVENTION

It is an object of the present invention to at least partially solve the problems in the conventional technology.

In accordance with one aspect of the present invention, a multi-core optical fiber includes a plurality of core portions, and a cladding portion positioned at outer peripheries of the plurality of core portions, the cladding portion having a refractive index lower than a maximum refractive index of each of the core portions, in which each of the core portions propagates light only with predetermined number, which is equal to or greater than 2, of propagation modes, and an effective core area at wavelength of 1550 nm of each of the propagation modes is equal to or greater than 120 μm$^2$.

In accordance with another aspect of the present invention, an optical transmission system includes a multi-core optical fiber of the above-described invention as an optical transmission line. The multi-core optical fiber includes a plurality of core portions, and a cladding portion positioned at outer peripheries of the plurality of core portions, the cladding portion having a refractive index lower than a maximum refractive index of each of the core portions, in which each of the core portions propagates light only with predetermined number, which is equal to or greater than 2, of propagation modes, and an effective core area at wavelength of 1550 nm of each of the propagation modes is equal to or greater than 120 μm$^2$.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a drawing showing profile parameters of an optical fiber in case of propagating 2 modes and optical characteristics of LP01 mode;

FIG. 8 is a drawing showing optical characteristics of LP11 mode and LP21 mode of the optical fiber shown in FIG. 7;

FIG. 9 is a drawing showing profile parameters of an optical fiber in case of propagating 3 modes and optical characteristics of LP01 mode;

FIG. 10 is a drawing showing optical characteristics of LP11 mode, LP21 mode, and LP02 mode of the optical fiber shown in FIG. 9;

FIG. 13 is a drawing showing inter-core distance between core portions of a same kind in case of propagating 2 modes, and transmission distance at which cross-talk of light between propagation modes is −30 dB;

FIG. 19 is a drawing showing inter-core distance between core portions of different kinds in case of propagating 2 modes, and transmission distance at which cross-talk of light between propagation modes is −30 dB;

FIG. 21 is a drawing showing inter-core distance between core portions of different kinds in case of propagating 2 modes, and transmission distance at which cross-talk of light between propagation modes is −30 dB;

FIG. 23 is a drawing showing inter-core distance between core portions of different kinds in case of propagating 2 modes, and transmission distance at which cross-talk of light between propagation modes is −30 dB;

FIG. 25 is a drawing showing inter-core distance between core portions of different kinds in case of propagating 2 modes, and transmission distance at which cross-talk of light between propagation modes is −30 dB;

FIG. 27 is a drawing showing inter-core distance between core portions of different kinds in case of propagating 2 modes, and transmission distance at which cross-talk of light between propagation modes is −30 dB;

FIG. 29 is a drawing showing inter-core distance between core portions of different kinds in case of propagating 2 modes, and transmission distance at which cross-talk of light between propagation modes is −30 dB;

FIG. 31 is a drawing showing inter-core distance between core portions of a same kind in case of propagating 3 modes, and transmission distance at which cross-talk of light between propagation modes is −30 dB;

FIG. 33 is a drawing showing inter-core distance between core portions of a same kind in case of propagating 3 modes, and transmission distance at which cross-talk of light between propagation modes is −30 dB;

FIG. 35 is a drawing showing inter-core distance between core portions of a same kind in case of propagating 3 modes, and transmission distance at which cross-talk of light between propagation modes is −30 dB;

FIG. 37 is a drawing showing inter-core distance between core portions of different kinds in case of propagating 3 modes, and transmission distance at which cross-talk of light between propagation modes is −30 dB;

FIG. 39 is a drawing showing inter-core distance between core portions of different kinds in case of propagating 3 modes, and transmission distance at which cross-talk of light between propagation modes is −30 dB;

FIG. 40 is a drawing showing relationship between the inter-core distance and the transmission distance shown in FIG. 39;

FIG. 42 is a drawing showing result of simulation calculation;

FIG. 43 is a drawing showing optical characteristics of LP01 mode and LP11 mode of a produced single-core optical fiber;

FIG. 49 is a drawing showing relationship between inter-core distance Λ and transmission distance L;

FIG. 50 is a drawing showing relationship between inter-core distance Λ and transmission distance L;

FIG. 56 is a drawing showing the result of measuring cross-talk;

FIG. 57 is a drawing showing the result of measuring cross-talk;

FIG. 60 is a drawing showing the result of evaluating characteristics of Cores 1, 2, 8, 9, and 19;

FIG. 61 is a drawing showing the result of measuring cross-talk;

FIG. 64 is a drawing showing structural parameters and optical characteristics in case where the effective core area of LP01 mode is set in the vicinity of 130 µm$^2$;

FIG. 65 is a drawing showing structural parameters and optical characteristics in case where the effective core area of LP01 mode is set in the vicinity of 150 µm$^2$;

FIG. 66 is a drawing showing structural parameters and optical characteristics in case where the effective core area of LP01 mode is set in the vicinity of 170 µm$^2$;

FIG. 67 is a drawing showing structural parameters and optical characteristics in case where the effective core area of LP01 mode is set in the vicinity of 170 µm$^2$;

FIG. 68 is a drawing showing structural parameters and optical characteristics in case where the effective core area of LP01 mode is set in the vicinity of 170 µm$^2$;

FIG. 69 is a drawing showing relationship between inter-core distance and transmission distance at which cross-talk between 2 adjacent cores is −30 dB when changing bending radius R within a range of 20 mm to 180 mm;

DETAILED DESCRIPTION OF THE PREFERRED EMBODIMENTS

Hereinafter, embodiments of a multi-core optical fiber and an optical transmission system according to the present invention will be explained in detail with reference to the drawings. It should be noted that this invention is not limited to these embodiments. In addition, in this specification, unless mentioned otherwise, bending loss means macrobending loss when bending by 20 mm of diameter (bending diameter). In addition, terms not defined in this specification is subject to definition and measurement method in International Telecommunication Union (ITU-T) G.650. 1.

There is a case where it is difficult to support further increase in transmission capacity by merely realizing the above-described spatial multiplexing technology, mode-multiplexing technology, and effective-core-area-enlarging technology separately.

In contrast, the embodiments obtain an effect of realizing spatial multiplexing, mode multiplexing, and an enlarged effective core area simultaneously, and increasing transmission capacity of an optical fiber from conventional technology.

Figure 1:
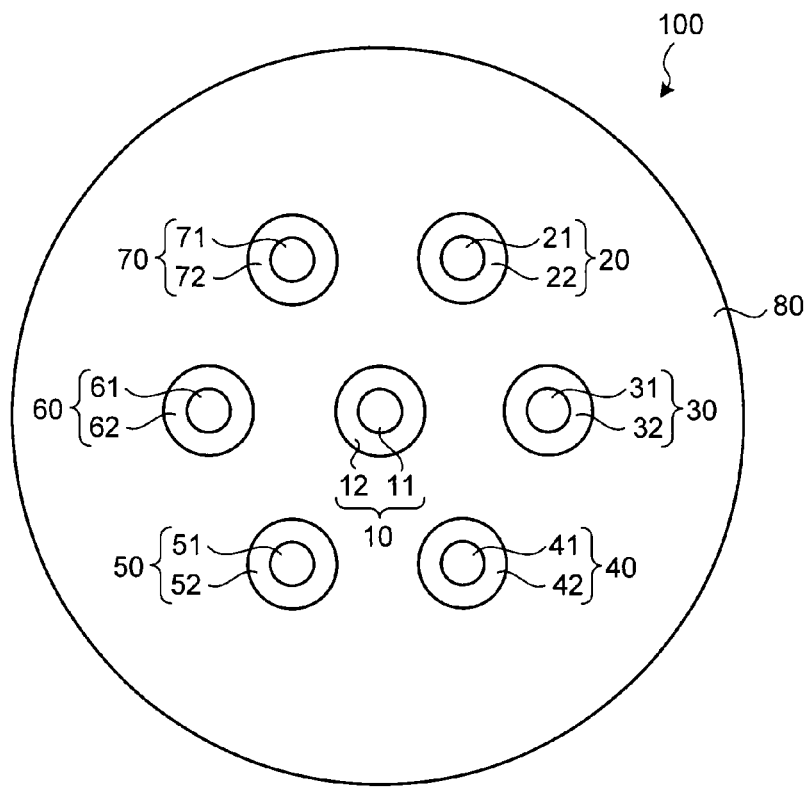
FIG. 1 is a cross section schematically showing an optical fiber according to an embodiment 1.

FIG. 1 is a cross section schematically showing a multi-core optical fiber according to the embodiment 1. As shown in FIG. 1, A multi-core optical fiber 100 is a 7-core-type multi-core optical fiber including 7 core portions 10 to 70 and a cladding portion 80 positioned at each outer periphery of the core portions 10 to 70.

The core portion 10 is positioned in the vicinity of the center axis of the multi-core optical fiber 100, and the other core portions 20 to 70 are disposed to be positioned approximately at apices of a hexagon in the center core portion 10 is as a center. In addition, the core portions 10 to 70 include center core portions 11 to 71 and outer periphery core portions 12 to 72 formed at outer peripheries of the center core portions respectively.

The center core portions 11 to 71 are made from silica glass containing dopant, such as germanium (Ge) etc., which increases refractive index. The outer periphery core portions 12 to 72 are made from silica glass containing dopant, such as fluorine (F) etc., which decreases refractive index. The cladding portion 80 is made from pure silica glass not containing dopant which adjusts refractive index. As a result, the center core portions 11 to 71 have the maximum refractive indices in the respective core portions 10 to 70, and their refractive indices are higher than that of the cladding portion 80. In addition, the refractive indices of the outer periphery core portions 12 to 72 are lower than that of the cladding portion 80.

The refractive index profiles of the respective core portions 10 to 70 are set so that light is transmitted only with predetermined number, i.e., equal to or greater than 2, of propagation modes and effective core areas in each propagation mode at the wavelength of 1550 nm is equal to or greater than 120 µm$^2$.

Figure 2:
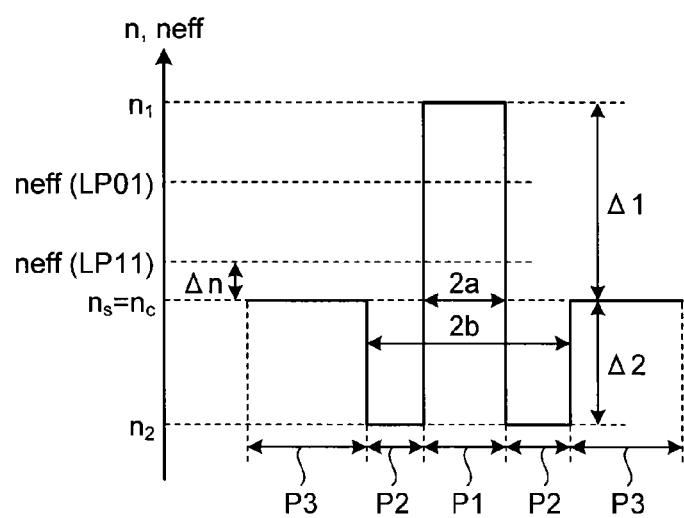
FIG. 2 is a drawing showing refractive index profile in case of the optical fiber shown in FIG. 1 propagating 2 modes.

FIG. 2 is a drawing showing refractive index profile in case of the multi-core optical fiber 100 shown in FIG. 1 propagating 2 modes. It should be noted that, although FIG. 2 shows the refractive index profile of the core portion 10, the other core portions 20 to 70 also have similar refractive index profiles. In FIG. 2, an area P1 indicates the refractive index profile of the center core portion 11. An area P2 indicates the refractive index profile of the outer periphery core portion 12. An area P3 indicates the refractive index profile of the cladding portion 80. As described above, this multi-core optical fiber 100 has so-called W-shaped refractive index profile in which the refractive index of the outer periphery core portion 12 is lower than the refractive index of the cladding portion 80.

Herein, as shown in FIG. 2, the relative refractive index difference of the center core portion 11 with respect to the cladding portion 80 is Δ1 and the relative refractive index difference of the outer periphery core portion 12 with respect to the cladding portion 80 is Δ2. The relative refractive index differences Δ1 and Δ2 are defined by the following formulae (1) and (2):

$$\Delta 1 = \{(n_1 - n_c)/n_c\} \times 100 [\%] \quad (1)$$

$$\Delta 2 = \{(n_2 - n_c)/n_c\} \times 100 [\%] \quad (2)$$

where $n_1$ indicates the maximum refractive index of the center core portion 11, $n_2$ indicates the minimum refractive index of the outer periphery core portion 12, and $n_c$ indicates the refractive index of the cladding portion 80. It should be noted that, in the embodiment, since the cladding portion 80 is made from pure silica glass, $n_c$ is equal to the refractive index $n_s$ (1.44439 at the wavelength of 1550 nm) of the silica glass.

In addition, as shown in FIG. 2, the diameter of the center core portion 11 is indicated as 2a and the outer diameter of the outer periphery core portion 12 is indicated as 2b. In addition, the ratio b/a of the outer diameter 2b of the outer periphery core portion relative to the diameter 2a of the center core portion is indicated as Ra. It should be noted that the diameter 2a of the center core portion is diameter at a position where relative refractive index difference Δ1 is 0% at a border of the center core portion 11 and the outer periphery core portion 12. In addition, the outer diameter 2b of the outer periphery core portion is diameter at a position where relative refractive index difference is a value which is ½ of relative refractive index difference Δ2 at a border of the outer periphery core portion 12 and the cladding portion 80.

In FIG. 2, the effective refractive index of LP01 mode, which is fundamental propagation mode of the multi-core optical fiber 100 is indicated as $n_{eff}$(LP01), and the effective refractive index of LP11 mode which is first higher-order propagation mode is indicated as $n_{eff}$(LP11). In case of FIG. 2, Δn is set to be equal to or greater than 0.0002 where Δn indicates difference between $n_{eff}$(LP11) and refractive index $n_c$ of the cladding portion 80.

As described above, if the effective refractive index $n_{eff}$(LP11) of LP11 mode is made greater than refractive index $n_c$ of the cladding portion 80 by equal to or greater than 0.0002, the multi-core optical fiber 100 can transmit light in 2 modes of LP01 mode and LP11 mode while restraining bending loss and micro-bending loss. In addition, as characteristics at wavelength of 1550 nm, the effective core area for LP01 mode can be enlarged to equal to or greater than 120 μm$^2$, and bending losses of LP01 mode and LP11 mode decrease. It should be noted that, if the value of the effective refractive index $n_{eff}$(LP21) of LP21 mode, which is second higher-order propagation mode, is made to be smaller than refractive index $n_c$ of the cladding portion 80, since LP21 mode becomes leaky mode, it is preferable that only 2 modes, i.e., LP01 mode and LP11 mode become propagation modes.

Figure 3:
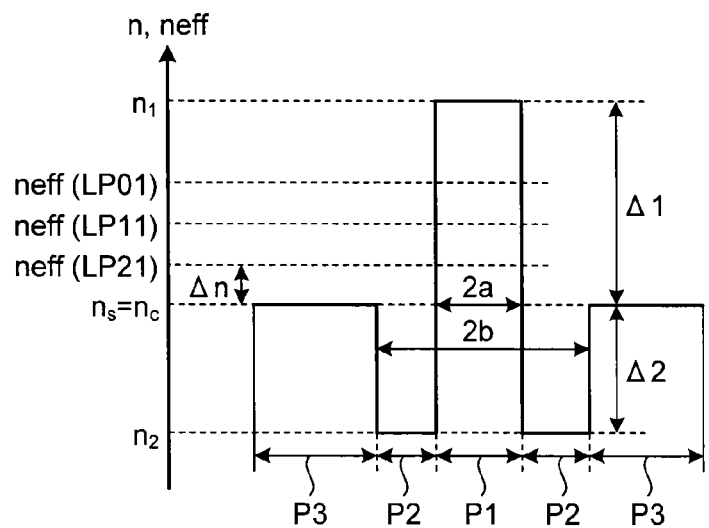
FIG. 3 is a drawing showing refractive index profile in case of the optical fiber shown in FIG. 1 propagating 3 modes.

On the other hand, FIG. 3 is a drawing showing refractive index profile in case of the multi-core optical fiber 100 shown in FIG. 1 propagating 3 modes. In case of FIG. 3, Δn is set to be equal to or greater than 0.0002 where Δn indicates difference between $n_{eff}$(LP21) of LP21 mode, which is second higher-order propagation mode, and refractive index $n_c$ of the cladding portion 80.

As described above, if the effective refractive index $n_{eff}$(LP21) of LP21 mode is made greater than refractive index $n_c$ of the cladding portion 80 by equal to or greater than 0.0002, the multi-core optical fiber 100 can transmit light in 3 modes of LP01 mode, LP11 mode, and LP21 mode while restraining bending loss and micro-bending loss. In addition, as characteristics at wavelength of 1550 nm, the effective core area for LP01 mode can be enlarged to equal to or greater than 120 μm$^2$, and bending loss of LP01 mode, LP11 mode, and LP21 mode decreases. It should be noted that, if the value of the effective refractive index $n_{eff}$(LP02) of LP02 mode, which is third higher-order propagation mode, is made to be smaller than refractive index $n_c$ of the cladding portion 80, since LP02 mode becomes leaky mode, it is preferable that only 3 modes, i.e., LP01 mode, LP11 mode, and LP21 mode become propagation modes.

It should be noted that, regarding profile parameters determining refractive index profile, if the relative refractive index difference Δ1 is 0.2% to 0.5%, the relative refractive index difference Δ2 is equal to or greater than −0.5% and lower than 0%, the diameter 2a of the center core portion is 14 μm to 19 μm, and Ra is greater than 1 and equal to or smaller than 4, the above-described transmission with 2 modes or 3 modes can be realized. Furthermore, it is preferable that the outer diameter 2b of the outer periphery core portion is 30 μm to 70 μm.

Hereinafter, profile parameters preferable for a case where transmission is performed with desirable number of modes will be explained with reference to the result of calculation using simulation by finite element method.

Figure 4:
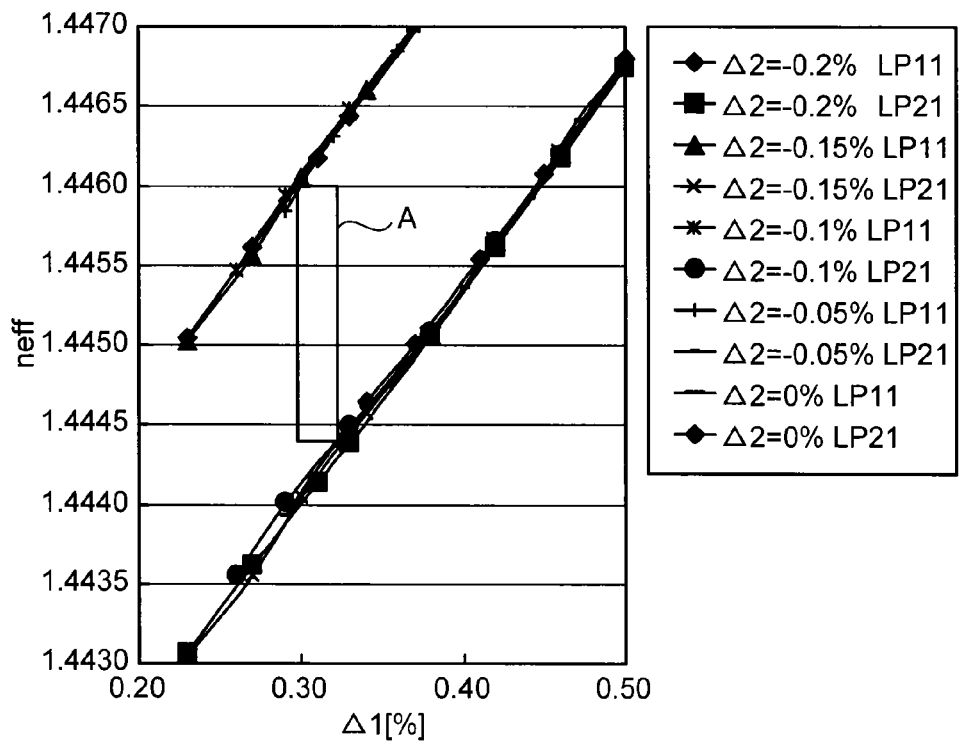
FIG. 4 is a drawing showing relationship between relative refractive index difference Δ1 and effective refractive index $n_{eff}$.

FIG. 4 is a drawing showing relationship between the relative refractive index difference Δ1 and effective refractive index $n_{eff}$ at the wavelength of 1550 nm in the multi-core optical fiber 100 configured as shown in FIG. 1 in case of changing the relative refractive index difference Δ2. It should be noted that the effective refractive indices $n_{eff}$ are shown for LP11 mode and LP21 mode.

In addition, the value of Ra was fixed to 3. In addition, the diameter 2a of the center core portion was adjusted so that the effective core area $A_{eff}$ of LP01 mode is 170 μm$^2$.

Like an area A shown in FIG. 4, the range of Δ1 exists in which $n_{eff}$ of LP21 mode is equal to or smaller than 1.44439 (refractive index of silica glass) and $n_{eff}$ of LP11 mode is equal to or greater than 1.4460. In this range, since LP21 mode becomes leaky mode, transmission with 2 modes is possible. In addition, the range of this area A is found to be dependent on Δ2 not so much. In FIG. 4, it is found that preferable $n_{eff}$ is obtained in case where Δ1 is a value in the vicinity of 0.3%. In addition, it was confirmed that, according to calculation conducted to any combination of profile parameters, a combination of the profile parameters exists in which transmission at 2 modes is possible in case where Δ1 is 0.2% to 0.5%.

Figure 5:
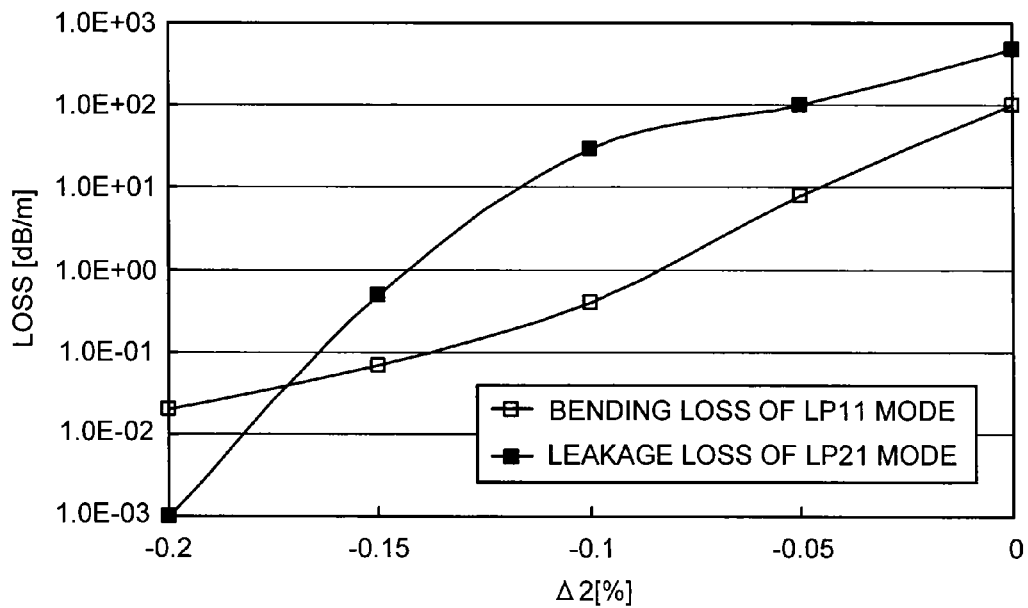
FIG. 5 is a drawing showing relationship between relative refractive index difference Δ2 and bending loss or leakage loss.

FIG. 5 is a drawing showing relationship between relative refractive index difference Δ2 and bending loss or leakage loss. It should be noted that, in FIG. 5, Δ1 was fixed to 0.3% and Ra was fixed to 3. In addition, the diameter 2a of the center core portion was adjusted so that the effective core area $A_{eff}$ of LP01 mode is 170 μm$^2$.

As shown in FIG. 5, the more Δ2 increases, the more bending loss of LP11 mode increases. In case of FIG. 5, it is preferable because the bending loss of LP11 mode is equal to or smaller than 50 dB/m in case where Δ2 is smaller than −0.02%. In addition, it is more preferable since, in case where Δ2 is smaller than −0.05%, the bending loss of LP11 mode is equal to or smaller than 10 dB/m. In addition, it was confirmed that, according to calculation conducted to any combination of profile parameters, a combination of the profile parameters exists in which the bending loss of LP11 mode is equal to or smaller than 50 dB/m in case where Δ2 is smaller than 0%.

On the other hand, there is a case where LP21 mode is propagated since leakage loss of LP21 mode decreases if Δ2 decreases. In case of FIG. 5, it is preferable because the leakage loss of LP21 mode is equal to or greater than 1 dB/m in case where Δ2 is equal to or greater than −0.14%. In addition, it is more preferable since, in case where Δ2 is equal to or greater than −0.12%, the leakage loss is equal to or greater than 10 dB/m. In addition, it was confirmed that, according to calculation conducted to any combination of profile parameters, a combination of the profile parameters exists in which the leakage loss of LP21 mode is preferably equal to or greater than 1 dB/m in case where Δ2 is equal to or greater than −0.5%.

Figure 6:
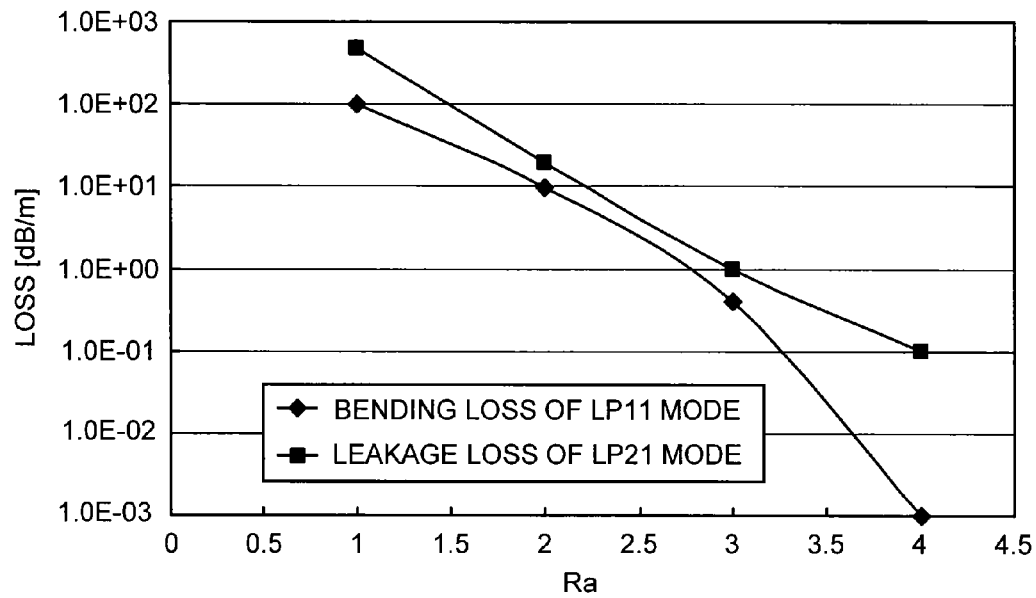
FIG. 6 is a drawing showing relationship between Ra and bending loss or leakage loss.

FIG. 6 is a drawing showing relationship between Ra and bending loss or leakage loss. It should be noted that, in FIG. 6, Δ1 was fixed to 0.3% and Δ2 was fixed to −0.1%. In addition, the diameter 2a of the center core portion was adjusted so that the effective core area $A_{eff}$ of LP01 mode was 170 μm².

As shown in FIG. 6, the more Ra decreases, the more the bending loss of LP11 mode increases. In case of FIG. 6, it is preferable because the bending loss of LP11 mode is equal to or smaller than 50 dB/m in case where Ra is greater than 1.2. In addition, it is more preferable since, in case where Ra is equal to or greater than 2, the bending loss of LP11 mode is equal to or smaller than 10 dB/m. In addition, it was confirmed that, according to calculation conducted to any combination of profile parameters, a combination of the profile parameters exists in which the bending loss of LP11 mode is preferable and equal to or smaller than 50 dB/m in case where Ra is equal to or greater than 1.

On the other hand, there is a case where LP21 mode is propagated since leakage loss of LP21 mode decreases if Ra increases. In case of FIG. 6, it is preferable because the leakage loss of LP21 mode is equal to or greater than 1 dB/m in case where Ra is equal to or smaller than 3. In addition, it is more preferable since, in case where Ra is equal to or smaller than 2.2, the leakage loss is equal to or greater than 10 dB/m. In addition, it was confirmed that, according to calculation conducted to any combination of profile parameters, a combination of the profile parameters exists in which the leakage loss of LP21 mode is equal to or greater than 1 dB/m in case where Ra is equal to or smaller than 4.

It should be noted that, in FIGS. 4 to 6, the diameter 2a of the center core portion was adjusted so that the effective core area $A_{eff}$ of LP01 mode is 170 μm². In this state, in case where the diameter 2a of the center core portion is 15 μm to 19 μm, 170 μm² of $A_{eff}$ was able to be obtained. In addition, it is preferable because the bending loss of LP11 mode can be equal to or smaller than 50 dB/m if the outer diameter 2b of the outer periphery core portion is greater than 15 μm and because the leakage loss of LP21 mode can be equal to or smaller than 1 dB/m if the outer diameter 2b of the outer periphery core portion is equal to or smaller than 76 μm. In addition, it is preferable since non-linearity is low if $A_{eff}$ is equal to or greater than 130 μm². In addition, it is preferable that $A_{eff}$ is equal to or smaller than 170 μm² since microbending loss is low and connectivity to other optical fibers is good.

As described above, it was confirmed that, if Δ1 is 0.2% to 0.5%, Δ2 is equal to or greater than −0.5% and smaller than 0%, the diameter 2a of the center core portion is 14 μm to 19 μm, and Ra is greater than 1 and equal to or smaller than 4, an optical fiber with good characteristics from a view point of $A_{eff}$, bending loss, and leakage loss, can be realized.

FIG. 7 is a drawing showing profile parameters of an optical fiber in case of propagating 2 modes and optical characteristics of LP01 mode. FIG. 8 is a drawing showing optical characteristics of LP11 mode and LP21 mode of the optical fiber shown in FIG. 7.

Among items in FIGS. 7 and 8, for example, "No. 130-1" and "No. 130-2" etc. are calculation examples in which profile parameters are selected so that the effective core area $A_{eff}$ of LP01 mode is between 130 μm² and 139 μm². In addition, "dispersion" indicates chromatic dispersion [unit: ps/nm/km], "slope" indicates dispersion slope [unit: ps/nm²/km], and "MFD" indicates mode field diameter [unit: μm]. The unit for Δ1 and Δ2 is [%], the unit for 2a and 2b is [μm], the unit for $A_{eff}$ is [μm²], and the unit for bending loss is [dB/m]. In addition, among values of bending loss etc., "E" is a sign indicating powers of 10. For example, "1.4E-09" means "1.4×10⁻⁹". In addition, all the values for optical characteristics are obtained at 1550 nm of wavelength.

In the profile parameters shown in FIGS. 7 and 8, Δ1 is 0.2% to 0.5%, Δ2 is equal to or greater than −0.5% and smaller than 0%, the diameter 2a of the center core portion is 14 μm to 19 μm, and Ra is greater than 1 and equal to or smaller than 4. By doing this, $n_{eff}$ of LP11 mode is greater than $n_c$ (=1.44439), which is the refractive index of the cladding portion, by equal to or greater than 0.0002, transmission with 2 modes is realized, the good characteristics from a view point of $A_{eff}$, bending loss, and leakage loss is realized.

FIG. 9 is a drawing showing profile parameter of an optical fiber in case of propagating 3 modes and optical characteristics of LP01 mode. FIG. 10 is a drawing showing optical characteristics of LP11 mode, LP21 mode, and LP02 mode of the optical fiber shown in FIG. 9.

In the profile parameters shown in FIGS. 9 and 10, Δ1 is 0.2% to 0.5%, Δ2 is equal to or greater than −0.5% and smaller than 0%, the diameter 2a of the center core portion is 14 μm to 19 μm, and Ra is greater than 1 and equal to or smaller than 4. The range particularly suitable for 3-mode propagation is that, for example, Δ1 is 0.36% to 0.50%, Δ2 is equal to or greater than −0.5% and smaller than −0.05%, Ra is greater than 1 and equal to or smaller than 4, and 2a is 14.9 μm to 17.3 μm. On the other hand, the range suitable for 2-mode is that, for example, Δ1 is 0.2% to 0.45%, Δ2 is equal to or greater than −0.2% and smaller than 0%, Ra is greater than 1 and equal to or smaller than 4, and 2a is 14 μm to 19 μm.

By doing this, $n_{eff}$ of LP21 mode is greater than $n_c$ (=1.44439), which is the refractive index of the cladding portion, by equal to or greater than 0.0002, transmission with 3 modes is realized, good characteristics from a view point of $A_{eff}$, bending loss, and leakage loss are realized.

Figure 11:
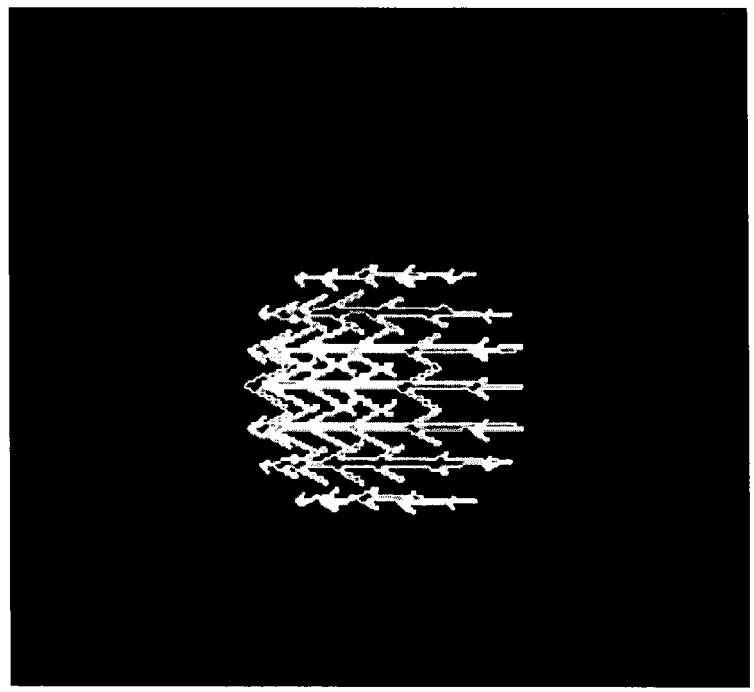
FIG. 11 is a drawing showing field distribution of light of LP01 mode.
Figure 12:
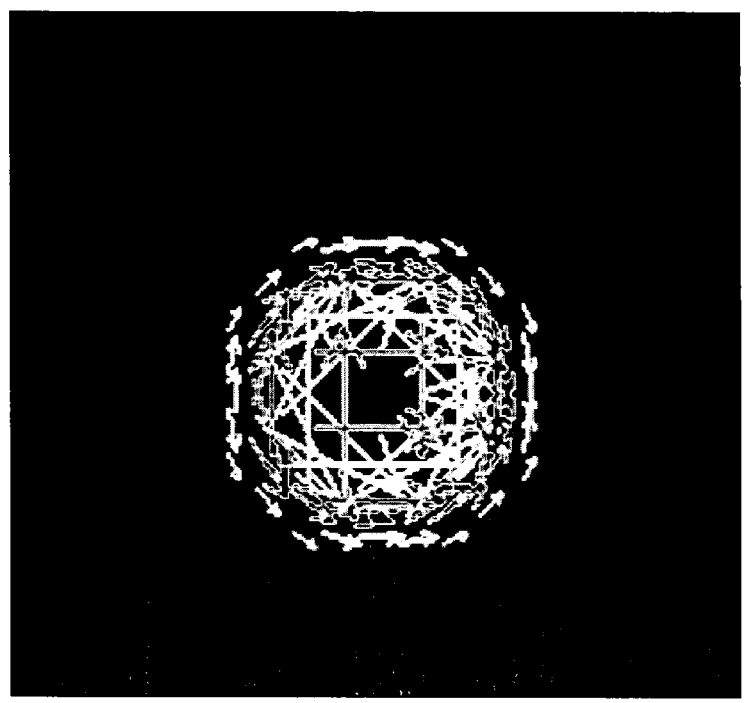
FIG. 12 is a drawing showing field distribution of light of LP11 mode.

FIGS. 11 and 12 are drawings showing field distributions of LP01 mode and LP11 mode respectively. Direction and size of an arrow indicate direction and size of field respectively. It should be noted that both FIGS. 11 and 12 show a case where profile parameters were set so that $A_{eff}$ is 150 μm².

As shown in FIG. 11, LP01 mode is in a Gaussian shape having a field in the center. On the other hand, LP11 mode is in a doughnut shape not having field distribution in the center. For this reason, field of each propagation mode is restrained from interfering with each other. Therefore, when making 2 signal lights incident into the multi-core optical fiber 100, if 2 signals are made incident and propagate to be propagated in 2 propagation modes respectively, 2-mode optical transmission with less mutual interference is possible. In addition, similarly to LP11 mode, LP21 mode does not have field distribution in the center and has high intensity field distribution therearound. However, LP11 mode and LP21 mode differ from each other in the shape of field distribution. Therefore, LP01 mode, LP11 mode, and LP21 mode are restrained from interfering with one another. On the other hand, since the intensity of field of LP02 mode is high in both the center and therearound, there is a possibility of interfering with all of the other LP01 mode, LP11 mode, and LP21 mode. Therefore, in case where the above-described four modes have been propagated in a multi-core optical fiber, unlike the other propagation modes, it is difficult to extract LP02 mode selectively.

Next, cross-talk of light in this multi-core optical fiber 100 will be explained specifically. The magnitude of interference of light in a waveguide structure in which the 2 core portions (for example, core portions 10 and 20) of the multi-core optical fiber 100 exist in parallel is accounted for by mode coupling theory. That is, among light incident into one of the core portions, i.e., core portion 10, power Pw of light transmitted to the other one of core portions, i.e. the core portion 20 by mode coupling while being transmitted through the core portion 10 can be calculated by a formula (3) as follows by using transmission distance z and mode-coupling constant $\chi$ between the 2 core portions.

$$Pw = f \times \sin^2(\chi z) \quad (3)$$

Herein if profile parameters are identical between the core portion 10 and the core portion 20, it is f=1. Therefore, it is Pw=1 when it is $z=\pi/(2\chi)$, resulting that 100% of the power of the light transmits from one of the core portions to the other one of the core portions. As described above, the transmission distance in which 100% of the power of the light is transmitted is called coupling length L. That is, it is $L=\pi/(2\chi)$. It should be noted that this mode-coupling constant $\chi$ is determined based on the profile parameters of each of the core portions 10 and 20 and the separation distances of the core portions 10 and 20. Herein the separation distance between 2 core portions means separation distance between the centers of the respective core portions.

Herein if the separation distance between the core portion 10 and the core portion 20 is set so that the mode-coupling constant $\chi$ is $3.16 \times 10^{-7}$/m related to the profile parameters of the respective core portions 10 and 20 and desirable overall length, the cross-talk between the core portions is equal to or smaller than −30 dB in the above-described desirable overall length, the cross-talk of light propagating in the 2 core portions 10 and 20 is sufficiently small.

It should be noted that adjacent core portions for the core portion 10 in the multi-core optical fiber 100 are core portions 20 to 70, the number of which is 6. On the other hand, the number of the adjacent core portions for the respective core portions 20 to 70 is 3, and the rest of 3 core portions are separated farther than the adjacent 3 core portions. Herein, since the cross-talk between the core portions decreases drastically with the increasing separation distance, only the cross-talk with the adjacent core portions may have to be considered.

In addition, since light is propagated with equal to or greater than 2 propagation modes in the multi-core optical fiber 100, the cross-talk of light between the respective propagation modes must be considered.

Next, in the multi-core optical fiber 100, the result of calculating cross-talk of light between adjacent core portions in a case where profile parameters of the adjacent core portions are identical (in case of a same kind of core portions) will be explained.

Figures 14, 15:
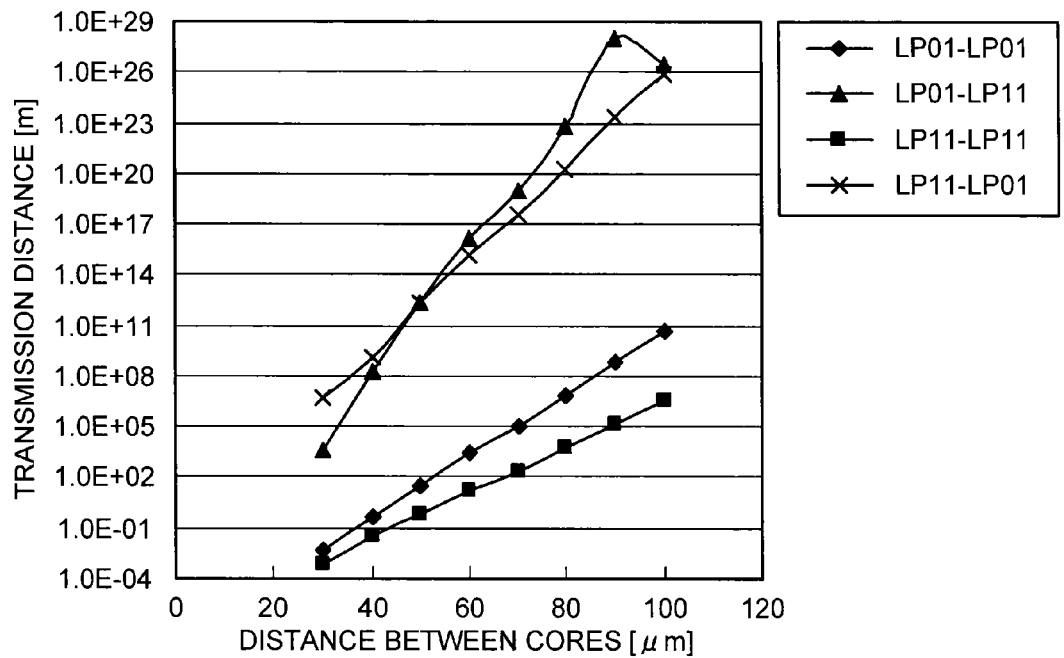
FIG. 14 is a drawing showing relationship between the inter-core distance and the transmission distance shown in FIG. 13.
FIG. 15 is a drawing showing inter-core distance between core portions of a same kind in case of propagating 2 modes, and transmission distance at which cross-talk of light between propagation modes is −30 dB.

FIG. 13 is a drawing showing separation distance between core portions (inter-core distance) of a same kind in case of propagating 2 modes and transmission distance at which cross-talk of light between propagation modes is −30 dB. FIG. 14 is a drawing showing relationship between the inter-core distance and the transmission distance shown in FIG. 13. It should be noted that the profile parameters shown in No. 150-1 of FIG. 7 were used for profile parameters of the core portion. In FIGS. 13 and 14, for example, "LP01-LP01" means cross-talk of light between LP01 modes of the adjacent core portions of a same kind.

Herein the inter-core distance must be determined so that desirable cross-talk is realized to 2 propagation modes at which optical coupling is the maximum and the cross-talk is the maximum. By doing that way, the cross-talk between other propagation modes is supposed to satisfy desirable value. In cases shown in FIGS. 13 and 14, since coupling of light between LP11 modes is great, in order to obtain −30 dB of cross-talk between LP11 modes at 100 km of transmission distance (1.0E+05 m), the inter-core distance may have to be, for example, approximately 90 μm which is equal to or greater than 89.3 μm. In this case, the inter-core distance can be equal to or smaller than 100 μm.

Figures 16, 17:
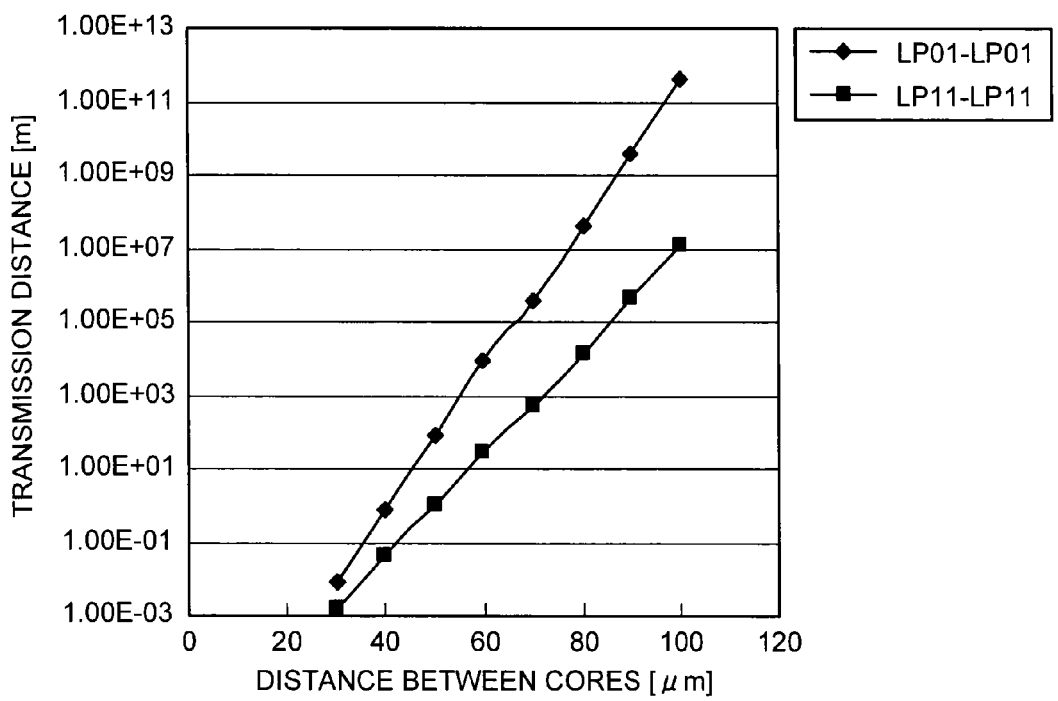
FIG. 16 is a drawing showing relationship between the inter-core distance and the transmission distance shown in FIG. 15.
FIG. 17 is a drawing showing inter-core distance between core portions of a same kind in case of propagating 2 modes, and transmission distance at which cross-talk of light between propagation modes is −30 dB.

Next, a case was examined in which profile parameters of the core portions of which effective core areas are different from those of FIGS. 13 and 14. FIG. 15 is a drawing showing inter-core distance between core portions of a same kind in case of propagating 2 modes, and transmission distance at which cross-talk of light between propagation modes is −30 dB. FIG. 16 is a drawing showing relationship between the inter-core distance and the transmission distance shown in FIG. 15. The profile parameters shown in No. 130-1 of FIG. 7 were used for profile parameters of the core portions.

In cases shown in FIGS. 15 and 16, similarly to the cases of FIGS. 13 and 14, cross-talk between LP11 modes was great. In addition, in order to obtain −30 dB of cross-talk between LP11 modes at 100 km of transmission distance, it was confirmed that the inter-core distance may be approximately 87 μm which is equal to or smaller than 100 μm.

Figure 18:
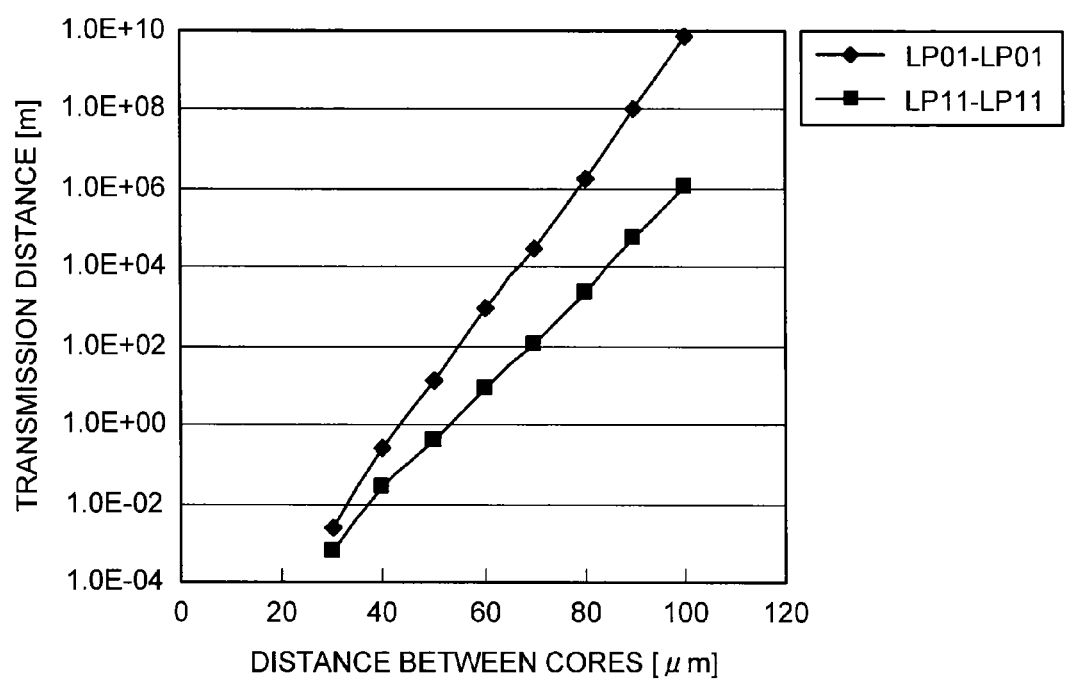
FIG. 18 is a drawing showing relationship between the inter-core distance and the transmission distance shown in FIG. 17.

FIG. 17 is a drawing showing inter-core distance between core portions of a same kind in case of propagating 2 modes, and transmission distance at which cross-talk of light between propagation modes is −30 dB. FIG. 18 is a drawing showing relationship between the inter-core distance and the transmission distance shown in FIG. 17. The profile parameters shown in No. 170-1 of FIG. 7 were used for profile parameters of the core portions.

In cases shown in FIGS. 17 and 18, similarly to the cases of FIGS. 13 to 16, cross-talk between LP11 modes was great. In addition, in order to obtain −30 dB of cross-talk between LP11 modes at 100 km of transmission distance, it was confirmed that the inter-core distance may be approximately 90 μm which is equal to or shorter than 100 μm.

From the results shown in FIGS. 13 to 18, in any case, cross-talk between LP11 modes was great. In addition, even though the effective core area $A_{eff}$ of LP01 mode was changed within the range of approximately 130 μm² to 170 μm², necessary inter-core distance did not change to a great extent.

By the way, in case of the multi-core optical fiber 100, the outer diameter of the cladding portion 80 must be equal to or greater than 300 μm in case of making the inter-core distance be 90 μm, and in case of making the distances of the outer peripheries of the core portions 20 to 70 and the outer periphery of the cladding portion 80 be 60 μm. It should be noted that the distance between the outer peripheries of the core portions 20 to 70 and the outer periphery of the cladding portion 80 was made 60 μm because, if this distance is too short, bending loss increases, and the bending loss does not increase if it is 60 μm. Non-Patent Literature 1 argues reliability of an optical fiber having such a greater outer diameter, and by arguing such reliability, the optical fiber having a greater outer diameter can be used. However, in order to ensure reliability more surely, it is preferable to realize a multi-core optical fiber of which an outer diameter is smaller by decreasing the inter-core distance.

Then, in order to decrease the inter-core distance, the core portions included in the multi-core optical fiber 100 were made be core portions of different kinds in which profile parameters differ from each other, and similarly to the above-description, the inter-core distance and the transmission distance at which cross-talk of light between propagation modes is −30 dB were calculated.

Figure 20:
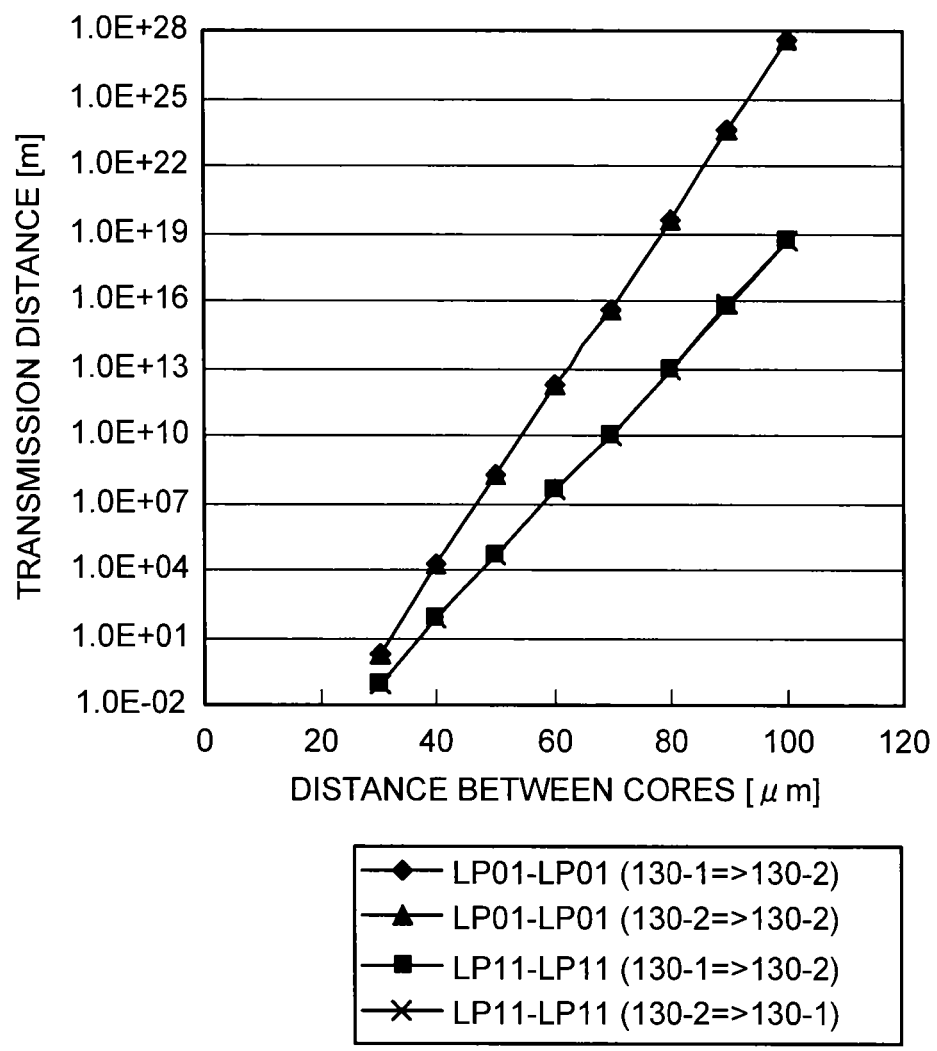
FIG. 20 is a drawing showing relationship between the inter-core distance and the transmission distance shown in FIG. 19.

FIG. 19 is a drawing showing inter-core distance between core portions of different kinds in case of propagating 2 modes, and transmission distance at which cross-talk of light between propagation modes is −30 dB. FIG. 20 is a drawing showing relationship between the inter-core distance and the transmission distance shown in FIG. 19. In FIGS. 19 and 20, the profile parameters shown in No. 130-1 and 130-2 of FIG. 7 were used for profile parameters of the adjacent core portions.

Figure 22:
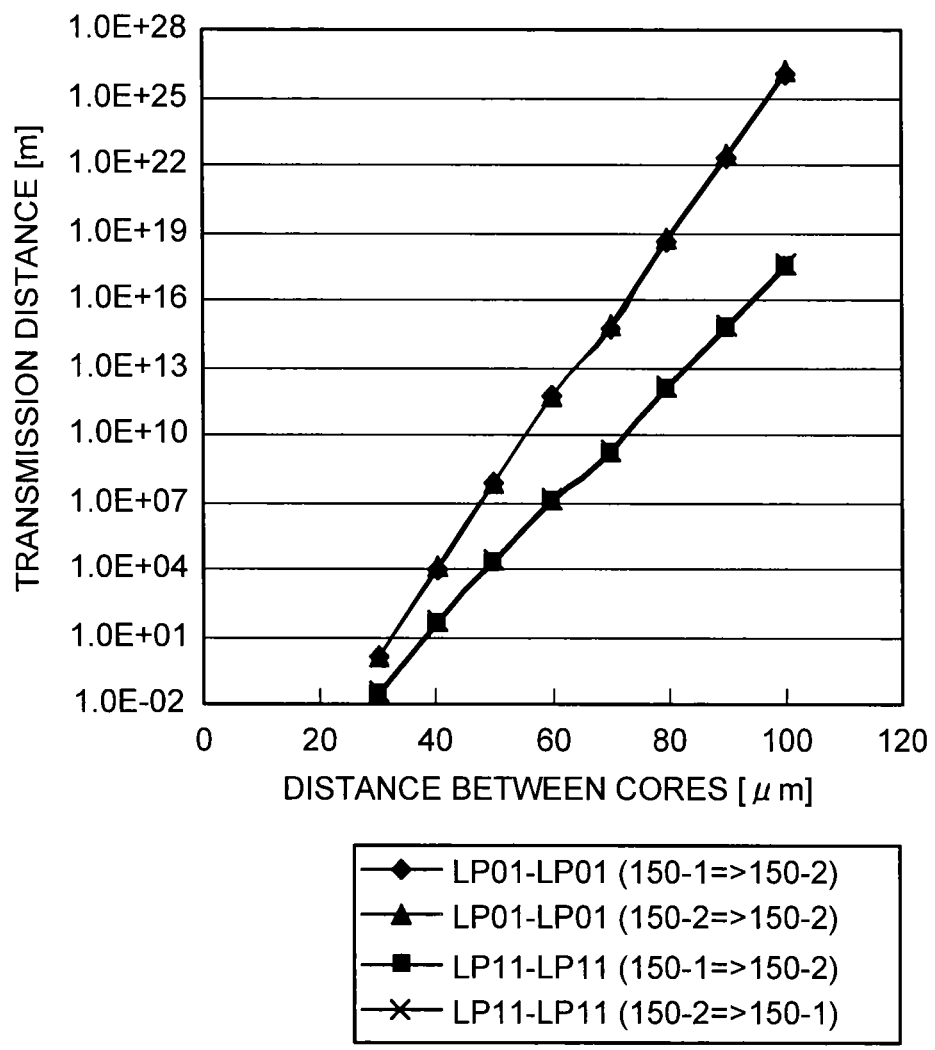
FIG. 22 is a drawing showing relationship between the inter-core distance and the transmission distance shown in FIG. 21.

Similarly, FIG. 21 is a drawing showing inter-core distance between core portions of different kinds in case of propagating 2 modes, and transmission distance at which cross-talk of light between propagation modes is −30 dB. FIG. 22 is a drawing showing relationship between the inter-core distance and the transmission distance shown in FIG. 21. In FIGS. 21 and 22, the profile parameters shown in No. 150-1 and 150-2 of FIG. 7 were used for profile parameters of the adjacent core portions.

Figure 24:
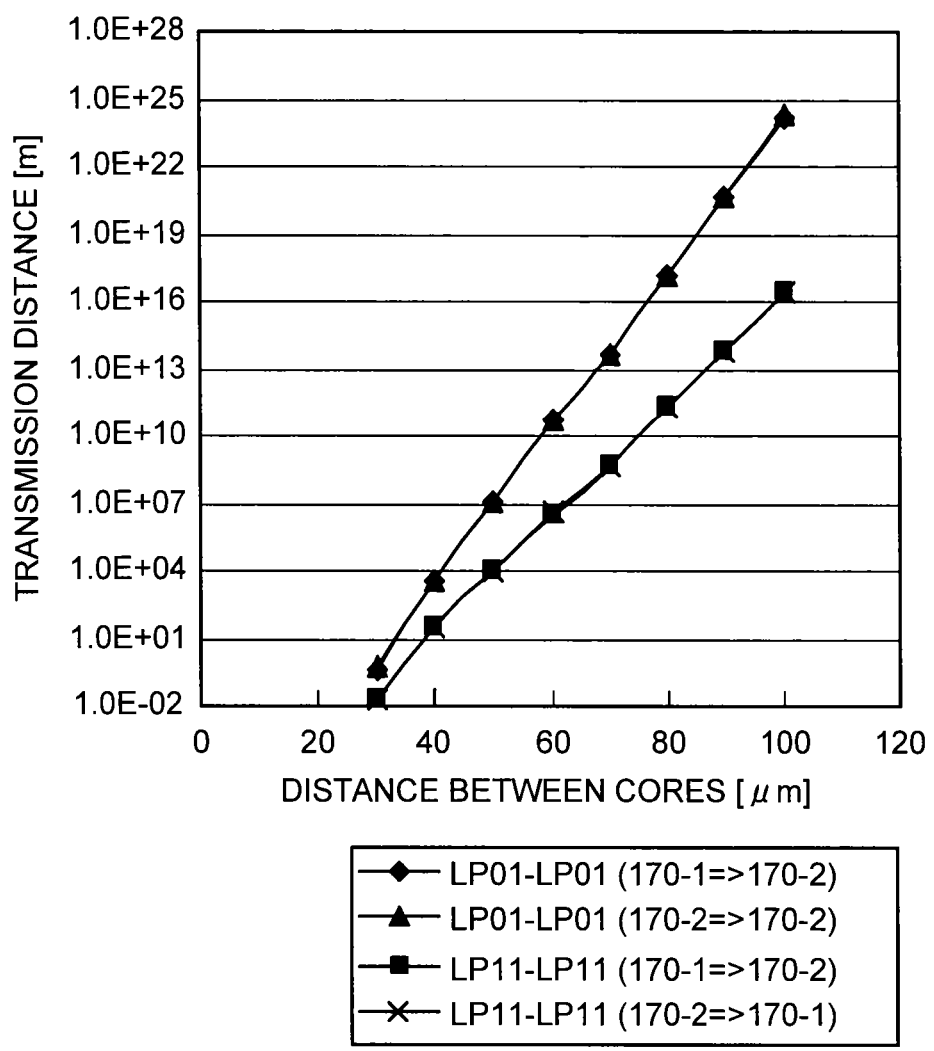
FIG. 24 is a drawing showing relationship between the inter-core distance and the transmission distance shown in FIG. 23.

Furthermore, FIG. 23 is a drawing showing inter-core distance between core portions of different kinds in case of propagating 2 modes, and transmission distance at which cross-talk of light between propagation modes is −30 dB. FIG. 24 is a drawing showing relationship between the inter-core distance and the transmission distance shown in FIG. 23. In FIGS. 23 and 24, the profile parameters shown in No. 170-1 and 170-2 of FIG. 7 were used for profile parameters of the adjacent core portions.

It should be noted that, in FIGS. 19 to 24, for example, "130-1=>130-2" of FIGS. 19 and 20 indicates that cross-talk of light of a core portion having the profile parameters of No. 130-2 in case of inputting light into a core portion having the profile parameters of No. 130-1 was considered.

As shown in FIGS. 19 to 24, in case where core portions of different kinds were adopted as the adjacent core portions, cross-talk between LP11 modes was the maximum. In addition, it was confirmed that, in order to make cross-talk between LP11 modes at 100 km of transmission distance be −30 dB, the inter-core distance may be approximately 50 μm to 55 μm, thus it will be equal to or smaller than 60 dB. This result indicates that, by comparing the inter-core distances of approximately 90 μm in case of the core portions of a same kind shown in FIGS. 13 to 18, by adopting core portions of different kinds, the inter-core distance can be decreased by approximately 35 μm to 40 μm. In addition, the outer diameter of the multi-core optical fiber 100 can be decreased by approximately 70 μm to 80 μm, it is very preferable for practical use.

In FIGS. 19 to 24, although the adjacent core portions are core portions of different kinds, mutual effective core areas were within 3 μm$^2$. Then, next, a case of core portions of different kinds, in which mutual effective core areas differ by equal to or greater than 10 μm$^2$ was calculated.

Figure 26:
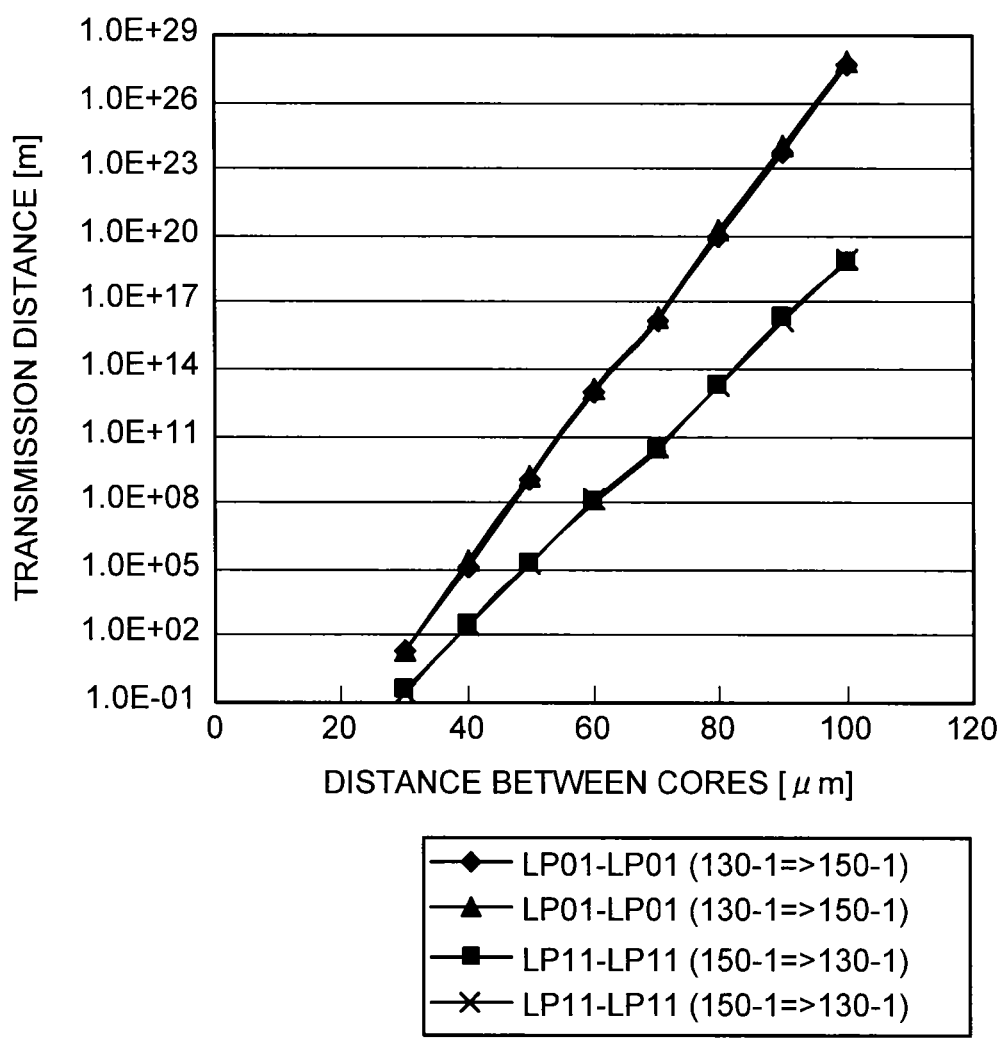
FIG. 26 is a drawing showing relationship between the inter-core distance and the transmission distance shown in FIG. 25.

FIG. 25 is a drawing showing inter-core distance between core portions of different kinds in case of propagating 2 modes, and transmission distance at which cross-talk of light between propagation modes is −30 dB. FIG. 26 is a drawing showing relationship between the inter-core distance and the transmission distance shown in FIG. 25. In FIGS. 25 and 26, the profile parameters shown in No. 130-1 and 150-1 of FIG. 7 were used for profile parameters of the adjacent core portions.

Figure 28:
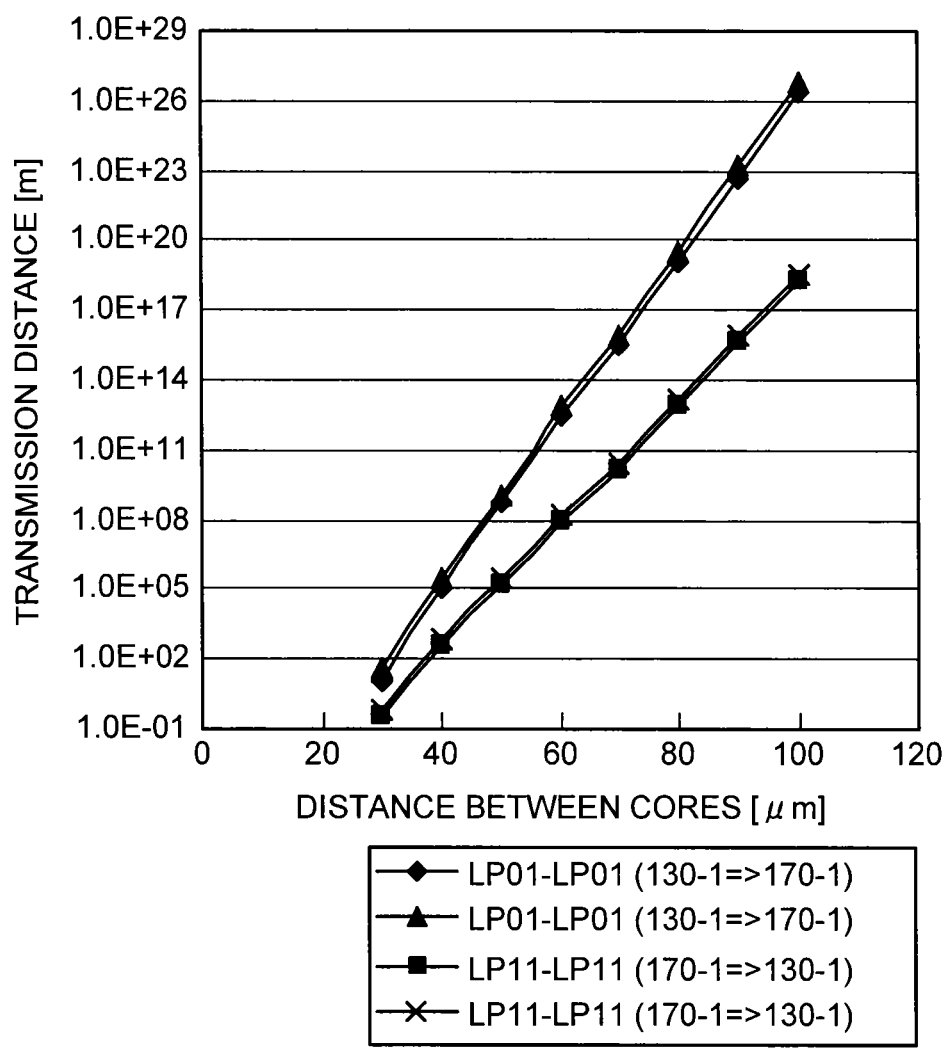
FIG. 28 is a drawing showing relationship between the inter-core distance and the transmission distance shown in FIG. 27.

Similarly, FIG. 27 is a drawing showing inter-core distance between core portions of different kinds in case of propagating 2 modes, and transmission distance at which cross-talk of light between propagation modes is −30 dB. FIG. 28 is a drawing showing relationship between the inter-core distance and the transmission distance shown in FIG. 27. In FIGS. 27 and 28, the profile parameters shown in No. 130-1 and 170-1 of FIG. 7 were used for profile parameters of the adjacent core portions.

Figure 30:
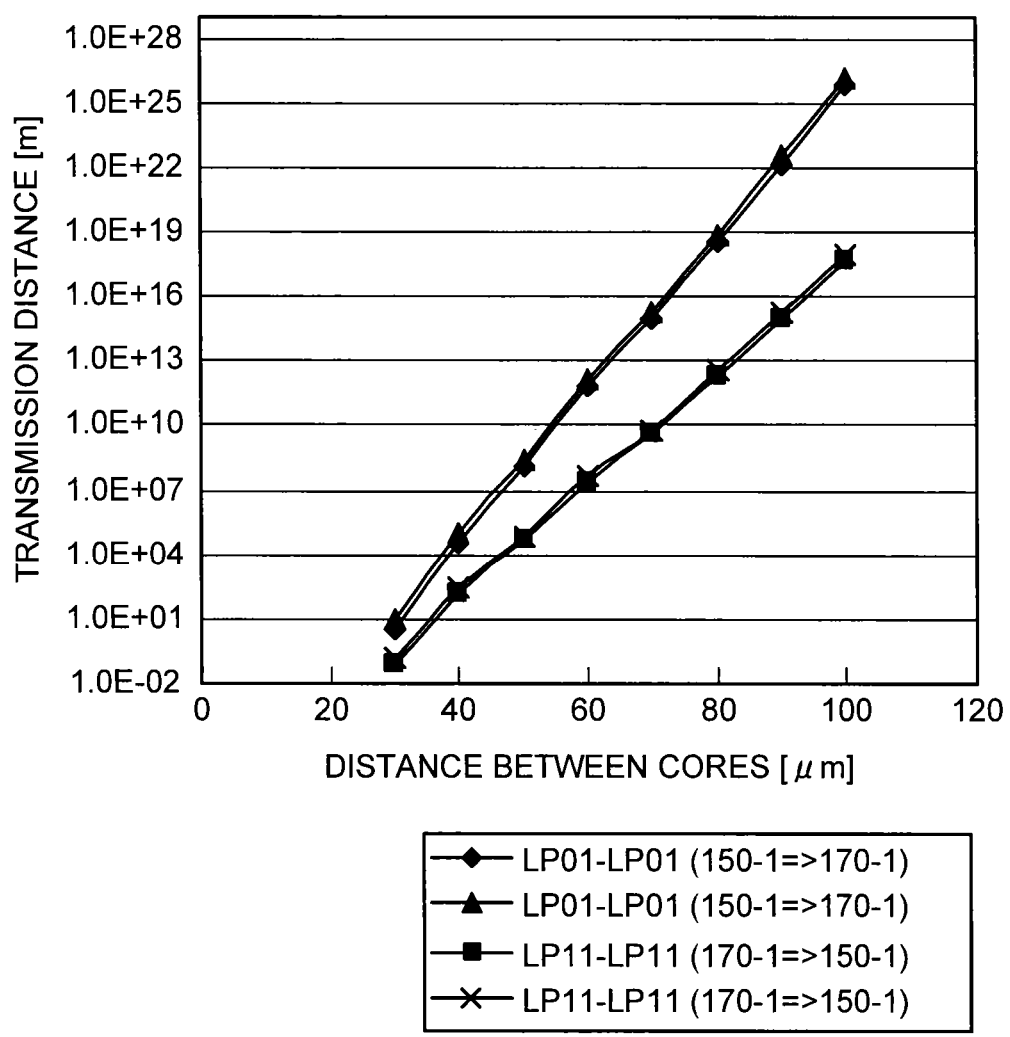
FIG. 30 is a drawing showing relationship between the inter-core distance and the transmission distance shown in FIG. 29.

Furthermore, FIG. 29 is a drawing showing inter-core distance between core portions of different kinds in case of propagating 2 modes, and transmission distance at which cross-talk of light between propagation modes is −30 dB. FIG. 30 is a drawing showing relationship between the inter-core distance and the transmission distance shown in FIG. 29. In FIGS. 29 and 30, the profile parameters shown in No. 150-1 and 170-1 of FIG. 7 were used for profile parameters of the adjacent core portions.

It was confirmed that, as shown in FIGS. 25 to 30, by differentiating the effective core areas of adjacent core portions of different kinds by equal to or greater than 10 μm$^2$, the inter-core distance for making the cross-talk between LP11 modes at 100 km of transmission distance be −30 dB can be further shorter as approximately equal to or shorter than 50 μm. As described above, by differentiating the effective core areas of the adjacent core portions of different kinds by equal to or greater than 10 μm$^2$, the inter-core distance and the outer diameter of the multi-core optical fiber 100 can be further decreased.

It should be noted that, when disposing, for example, 3 kinds of core portions of different kinds, 7 core portions may be classified to the core portion 10 and a group of the core portions 20, 40, and 60, and a group of the core portions 30, 50, and 70, and profile parameters of respective core portions may be set so that the core portions in each group are of a same kind and the core portions between the respective groups are of different kinds. By doing this, since the closest adjacent core portions to each other are of different kinds, the inter-core distance can be decreased, and as a result of that, 7 core portions can be disposed in high density.

Next, the result of calculating cross-talk of light between core portions of a same kind in case of propagating 3 modes in the multi-core optical fiber 100 will be explained.

Figure 32:
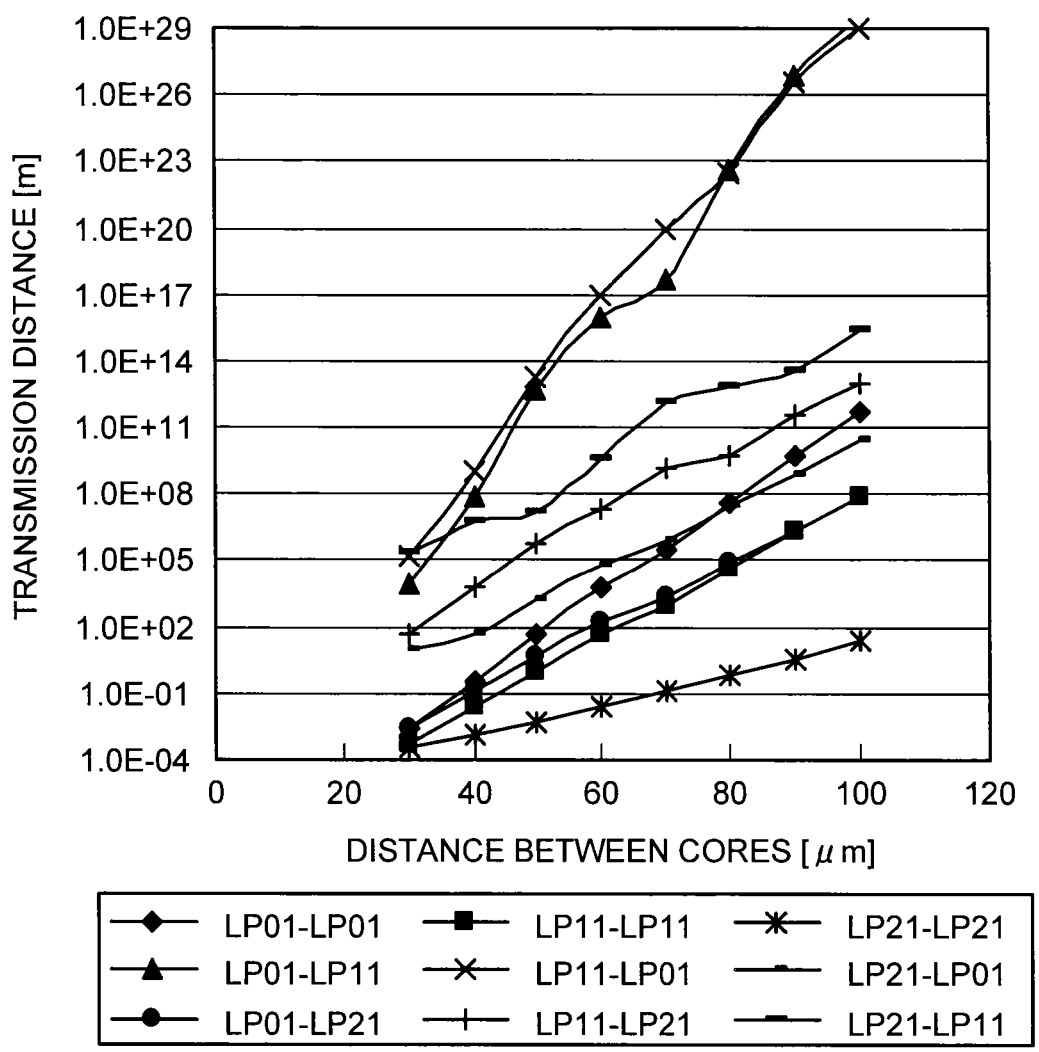
FIG. 32 is a drawing showing relationship between the inter-core distance and the transmission distance shown in FIG. 31.

FIG. 31 is a drawing showing inter-core distance between core portions of a same kind in case of propagating 3 modes, and transmission distance at which cross-talk of light between propagation modes is −30 dB. FIG. 32 is a drawing showing relationship between the inter-core distance and the transmission distance shown in FIG. 31. It should be noted that the profile parameters shown in No. 130-1 of FIG. 9 were used for profile parameters of the core portion.

Figure 34:
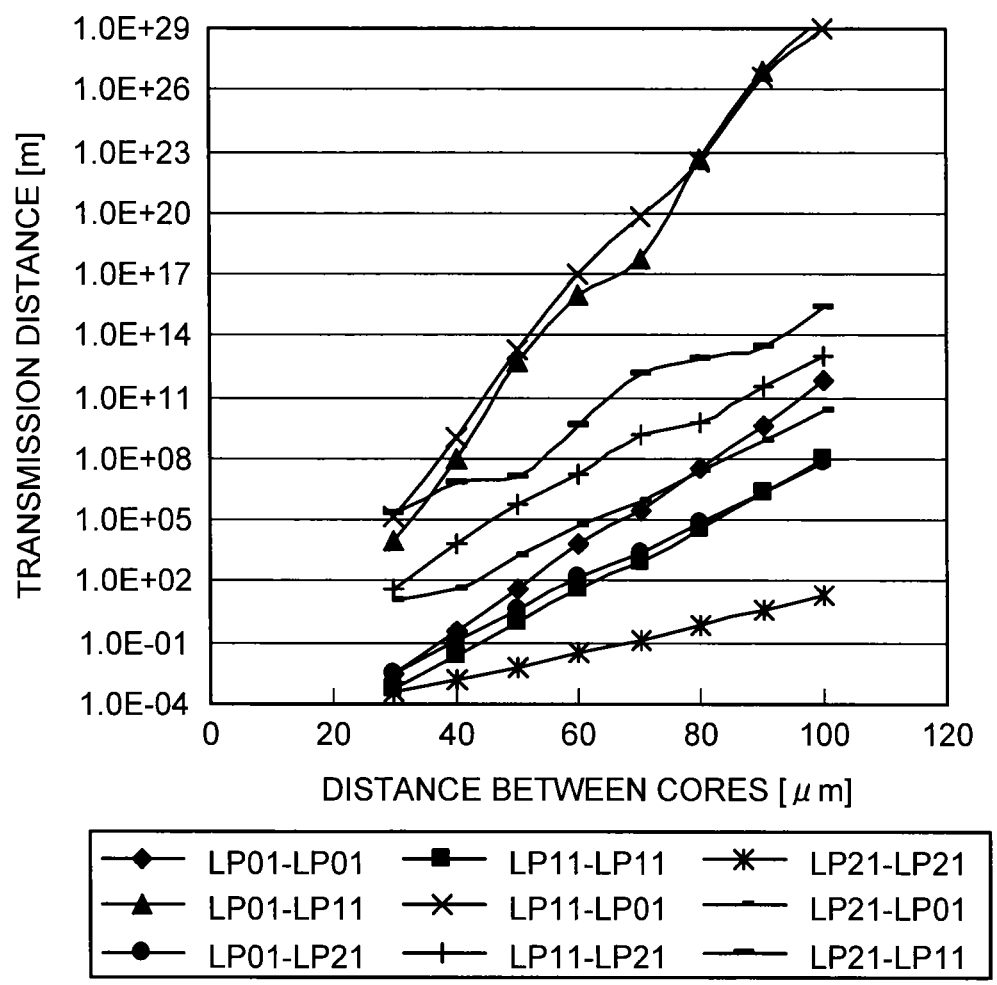
FIG. 34 is a drawing showing relationship between the inter-core distance and the transmission distance shown in FIG. 33.

FIG. 33 is a drawing showing inter-core distance between core portions of a same kind in case of propagating 3 modes, and transmission distance at which cross-talk of light between propagation modes is −30 dB. FIG. 34 is a drawing showing relationship between the inter-core distance and the transmission distance shown in FIG. 33. It should be noted that the profile parameters shown in No. 150-1 of FIG. 9 was used for profile parameters of the core portion.

Figure 36:
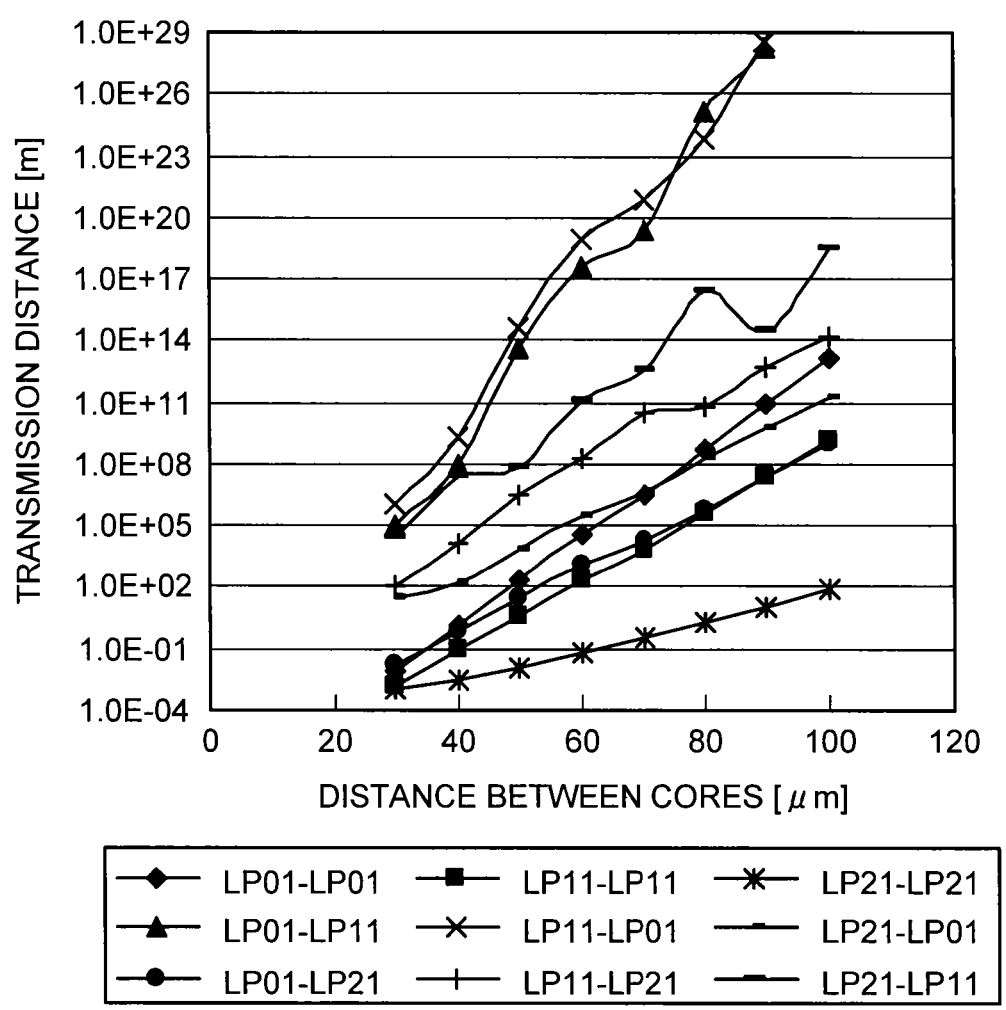
FIG. 36 is a drawing showing relationship between the inter-core distance and the transmission distance shown in FIG. 35.

FIG. 35 is a drawing showing inter-core distance between core portions of a same kind in case of propagating 3 modes, and transmission distance at which cross-talk of light between propagation modes is −30 dB. FIG. 36 is a drawing showing relationship between the inter-core distance and the transmission distance shown in FIG. 35. It should be noted that the profile parameters shown in No. 150-2 of FIG. 9 were used for profile parameters of the core portion.

As shown in FIGS. 31 to 36, in case of 3 modes, cross-talk between LP21 modes was great. In addition, it was confirmed that, even if the inter-core distance was increased to 100 μm, in case of obtaining −30 dB of cross-talk between LP21 modes, a short transmission distance of only approximately 100 m was obtained. In this case, since the outer diameter of the multi-core optical fiber 100 must be equal to or greater than 300 μm, there is a problem in reliability or operability of the optical fiber.

Then, similarly to the case of 2 modes, the core portions included in the multi-core optical fiber 100 were made be core portions of different kinds, the inter-core distance and the transmission distance at which cross-talk of light between propagation modes is −30 dB were calculated for a case of 3 modes.

Figure 38:
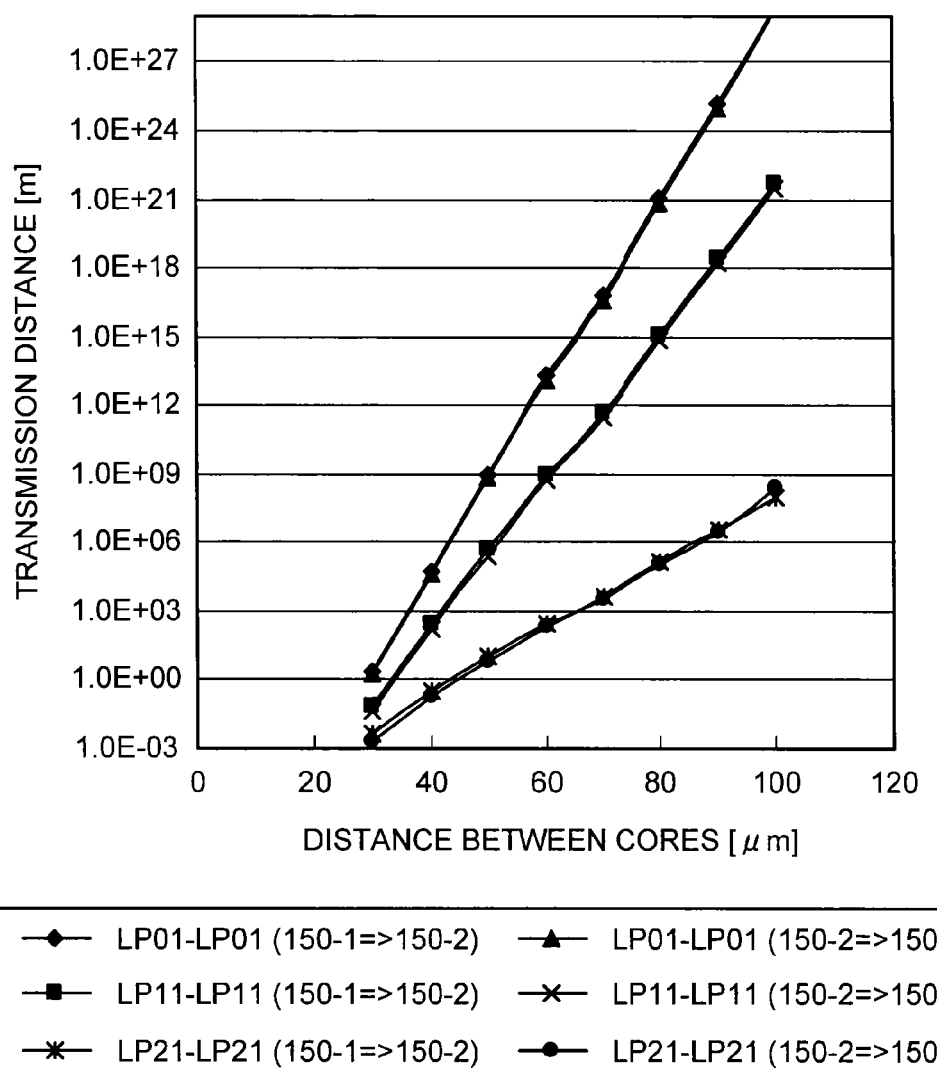
FIG. 38 is a drawing showing relationship between the inter-core distance and the transmission distance shown in FIG. 37.

FIG. 37 is a drawing showing inter-core distance between core portions of different kinds in case of propagating 3 modes, and transmission distance at which cross-talk of light between propagation modes is −30 dB. FIG. 38 is a drawing showing relationship between the inter-core distance and the transmission distance shown in FIG. 37. In FIGS. 37 and 38, the profile parameters shown in No. 150-1 and 150-2 of FIG. 9 were used for profile parameters of adjacent core portions respectively.

Similarly, FIG. 39 is a drawing showing inter-core distance between core portions of different kinds in case of propagating 3 modes, and transmission distance at which cross-talk of light between propagation modes is −30 dB. FIG. 40 is a drawing showing relationship between the inter-core distance and the transmission distance shown in FIG. 39. In FIGS. 39 and 40, the profile parameters shown in No. 130-1 and 150-2 of FIG. 9 were used for profile parameters of the adjacent core portions respectively. That is, in FIGS. 39 and 40, core portions of different kinds, of which effective core areas differ by equal to or greater than 10 μm² with each other, were used.

As shown in FIGS. 37 to 40, in case of adopting the core portions of different kinds as the adjacent core portions, cross-talk between LP21 modes was the maximum. In addition, it was confirmed that, in case of FIGS. 37 and 38, in order to obtain −30 dB of cross-talk between LP21 modes at 100 km of transmission distance, the inter-core distance may be approximately 80 μm which is equal to or shorter than 90 μm. Furthermore, it was confirmed that, in case of FIGS. 39 and 40, inter-core distance may be approximately 75 μm. This result indicates that, in comparison with inter-core distance in case of the core portions of a same kind shown in FIGS. 31 to 36, the inter-core distance can be decreased to practical value of approximately 75 μm to 80 μm by adopting the core portions of different kinds. In addition, practically, it is very preferable that the outer diameter of the multi-core optical fiber 100 can be shorter than 300 μm.

As described above, the inter-core distance can be decreased to a great extent by making adjacent core portions be core portions of different kinds.

It should be noted that, in case of making the adjacent core portions be core portions of different kinds, it is preferable to set profile parameters of each core portion so that difference of effective refractive indices of propagation modes of which cross-talk of light between adjacent core portions of different kinds is equal to or greater than 0.00005, and more preferably, equal to or greater than 0.00015. The propagation mode of which cross-talk of light is the maximum is, for example, a combination of LP11 modes in case of the above-described 2 modes. In case of 3 modes, it is, for example, a combination of LP21 modes.

Figure 41:
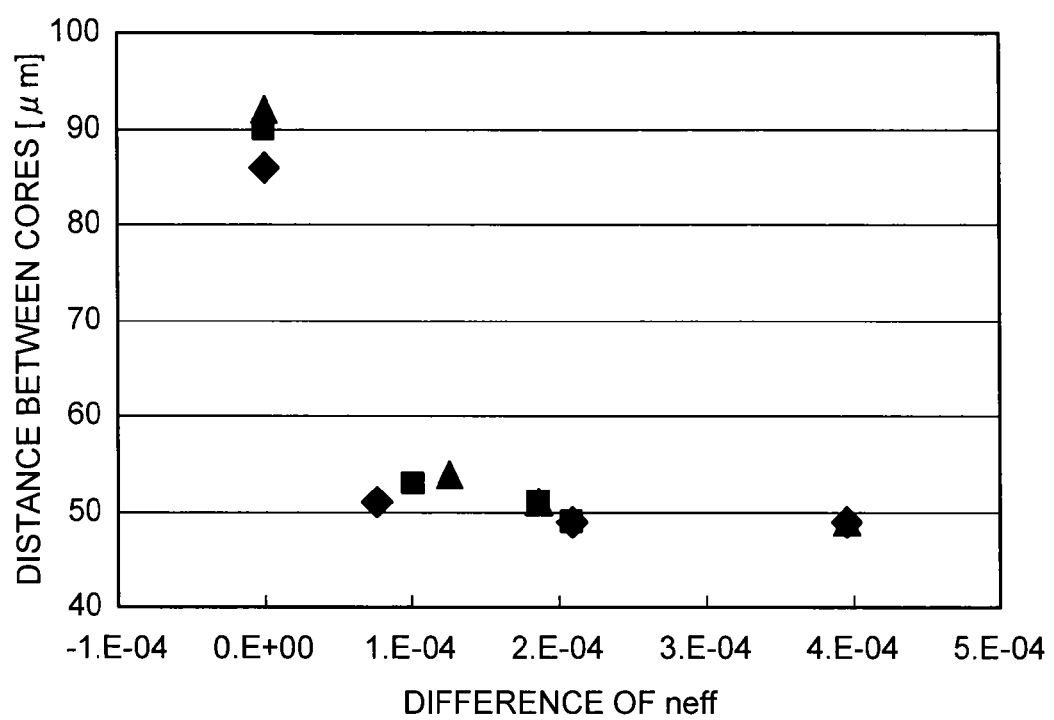
FIG. 41 is a drawing showing relationship between difference of effective refractive indices $n_{eff}$ between adjacent core portions and inter-core distance in case that cross-talk of light between propagation modes is −30 dB at transmission distance of 100 km.

FIG. 41 is a drawing showing, in case of propagating in 2 modes, relationship between difference of effective refractive indices $n_{eff}$ between adjacent core portions and inter-core distance in case that cross-talk of light between propagation modes is −30 dB at transmission distance of 100 km. It should be noted that FIG. 41 is based on data shown in FIGS. 13 to 30.

As shown in FIG. 41, it is possible to decrease necessary inter-core distance to a great extent by making the difference of effective refractive indices $n_{eff}$ be equal to or greater than 0.00005, and is possible to decrease the inter-core distance further by making the difference of effective refractive index $n_{eff}$ be equal to or greater than 0.00015. It should be noted that the case of 3-mode propagation was examined similarly. As a result, also in the case of 3-modes propagation, it was confirmed to be able to decrease necessary inter-core distance to a great extent by setting each profile parameter of core portions of different kinds so that effective refractive indices of LP21 modes which are a propagation mode of which cross-talk of light is the greatest has difference by equal to or greater than 0.00005, and more preferably, equal to or greater than 0.00015.

Next, a 7-core-type multi-core optical fiber was produced for propagating 2 modes of LP01 mode and LP11 mode. At first, an optical fiber preform was produced in which Δ1 is 0.332%, Δ2 is −0.084%, and Ra is 1.92 in the structure of the multi-core optical fiber of the embodiment 1. In the case of these Δ1, Δ2, and Ra, the diameter 2a of the center core portion, for making effective core area $A_{eff}$ of LP01 mode is 170 μm², is 17.0 μm. Then, when conducting simulation calculation where 2a is set at 17.0 μm, characteristics shown in FIG. 42 were obtained at wavelength of 1550 nm.

Before producing the multi-core optical fiber, a single-core optical fiber having a core portion in the vicinity of the center axis of the optical fiber was produced by using a part of the above-produced optical fiber preform. The diameter of cladding of the produced single-core optical fiber was 125 μm, and the length was 1.5 km. FIG. 43 is a drawing showing optical characteristics of LP01 mode and LP11 mode at wavelength of 1550 nm of the produced single-core optical fiber. The optical characteristics shown in FIG. 43 were similar to the characteristics of FIG. 42 obtained by simulation calculation. The produced multi-core optical fiber was wound around a bobbin of which the bending radius is R=140 mm with 60 gf (gram weight) of tension, and optical characteristics were evaluated.

Figures 44, 45:
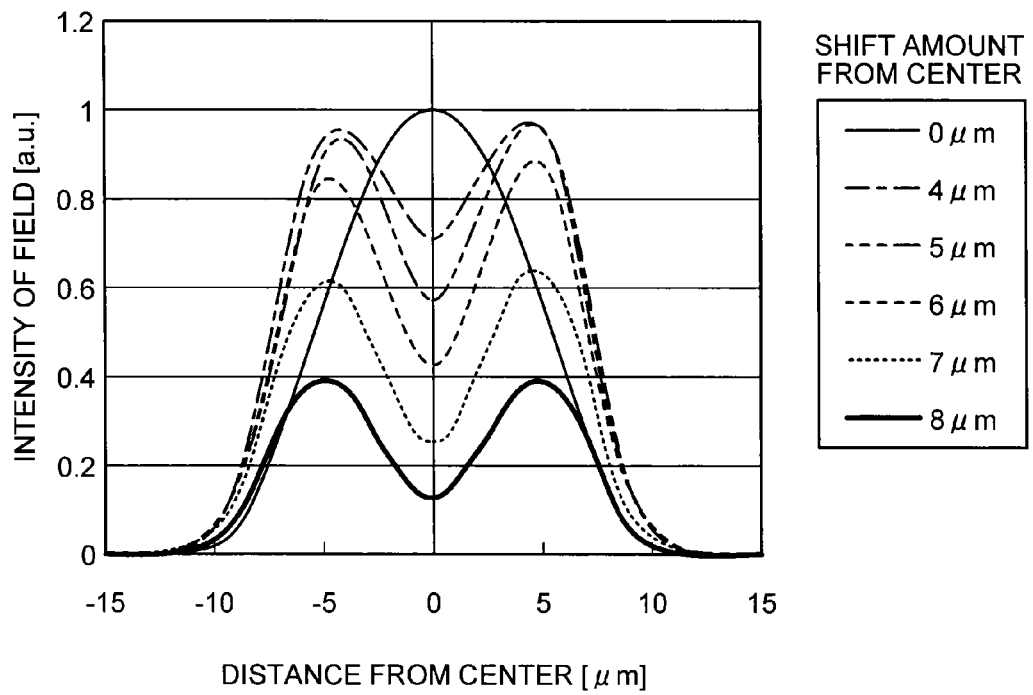
FIG. 44 is a drawing showing change in excitation field when changing alignment position (shift amount)
FIG. 45 is a drawing showing relationship between intra-core cross-talk and shift amount of light of LP01 mode and light of LP11 mode.

Excitation of LP01 mode was conducted by making light at wavelength of 1550 nm incident by a highly non-linear optical fiber ($A_{eff}$=13 μm²) of which a center is aligned with the center of a core portion. Excitation of LP11 mode was conducted by shifting the center of the same highly non-linear optical fiber from the center of the core portion and making light incident. The change in excitation field when alignment position (shift amount) was changed is shown in FIG. 44. The horizontal axis shows the position from the center of the core portion. The reason for using 6 μm shift for exciting LP11 mode as shown in FIG. 44 is the result of considering balance between mode separation and coupling efficiency (received optical power). That is, if the shift amount is 6 μm, separation of 2 modes is sufficient, and coupling efficiency to LP11 mode or received optical power when measuring is sufficient.

FIG. 45 is a drawing showing relationship between cross-talk XT (inter-core cross-talk) of light of LP01 mode and light of LP11 mode in one core portion and shift amount. It should be noted that intra-core cross-talk is cross-talk in a same core between center power of the core in state that optical field is made incident into the center, and power of light transmitted from the center of the core to the center of the shifted position. In the following, values are used for intra-core cross-talk in case where shift amount is 6 μm. Therefore, the intra-core cross-talk between light of LP01 mode and light of LP11 mode of the produced single-core optical fiber was −11.32 dB.

Figure 46:
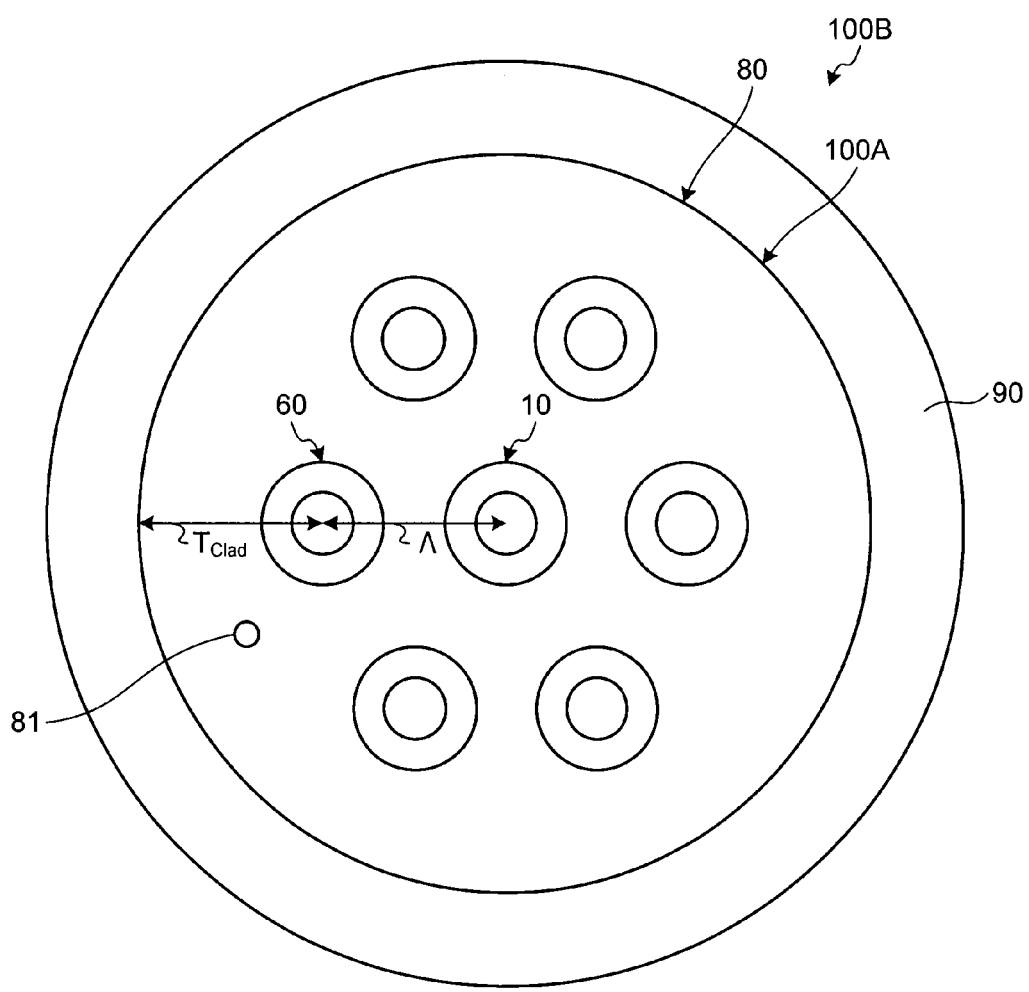
FIG. 46 is a cross section schematically showing a multi-core optical fiber used for design.

Next, design of a multi-core optical fiber was conducted by using the parameters shown in FIG. 42, based on mode-coupling theory taking bending into account. FIG. 46 is a cross section schematically showing a multi-core optical fiber used for design. The multi-core optical fiber 100B is obtained by forming resin coating 90 on a multi-core optical fiber 100A in which a marker 81 for specifying core portions is formed in the cladding portion 80 of the multi-core optical fiber 100 shown in FIG. 1. Cladding thickness (Tclad) was set at 59.5 μm which is substantially equivalent to that of a conventional optical fiber, and target cladding diameter was set at 245 μm and coating diameter was set at 380 μm.

Figure 47:
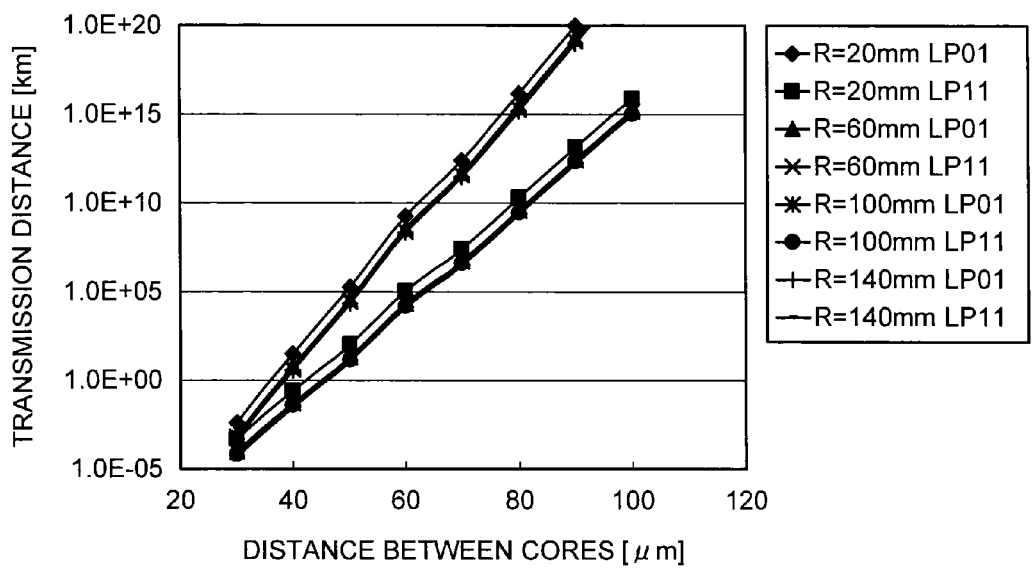
FIG. 47 is a drawing showing relationship between inter-core distance Λ and transmission distance L.
Figure 48:
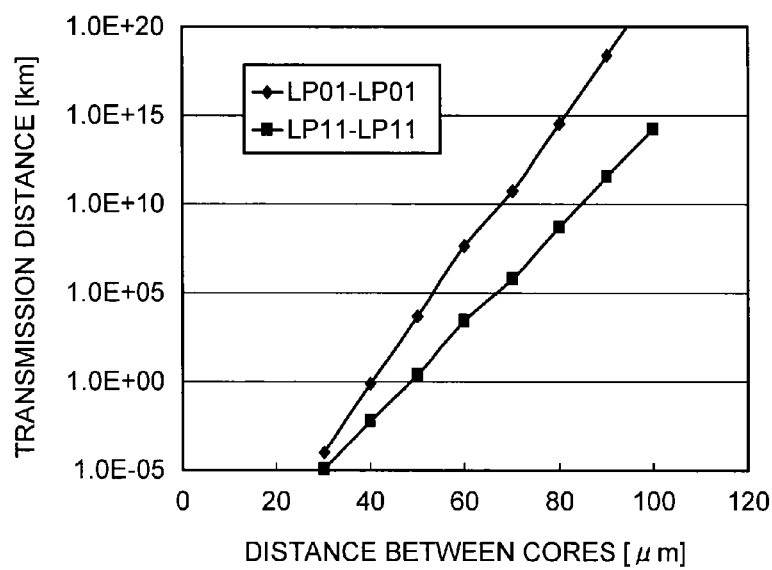
FIG. 48 is a drawing showing relationship between inter-core distance Λ and transmission distance L.

At first, when calculation was conducted without taking bending into account by power-coupling theory, it was found that interference between LP01 mode and LP11 mode (LP01-LP11 interference) is smaller than LP01-LP01 interference or LP11-LP11 interference to a great extent. So it was decided to examine only cross-talk by the LP01-LP01 interference and the LP11-LP11 interference in detail. The result of examining relationship between the inter-core distance Λ (see FIG. 46) and transmission distance L (length of a multi-core optical fiber of which cross-talk between adjacent 2 cores is −30 dB) by changing bending radius from 20 mm to 140 mm is shown in FIGS. 47 and 49. In FIG. 49, R is the bending radius. It was found from FIG. 47 that necessary inter-core distance for making transmission distance be 100,000 km (1.0E+5 km) is determined by LP11-LP11 interference and it is approximately 63 μm. In addition, it was found that necessary inter-core distance for 10,000 km (1.0E+4 km) of transmission distance is approximately 60 μm. In addition, the result of simulation for relationship between inter-core distance Λ and transmission distance L of the worst value of cross-talk (value of cross-talk in case where the center core portion is affected by interference from all of other six core portions therearound) is shown in FIGS. 48 and 50. It should be noted that, in FIG. 48, bending radius is 140 mm. In case of FIGS. 48 and 50, if the inter-core distance is set at 63 μm, it is possible to make the transmission distance be 50,000 km. In addition, if the inter-core distance is set at 60 μm, it is possible to make the transmission distance be 2,500 km. In addition, since good cross-talk was obtained even when the bending radius was equal to or smaller than 180 mm, it is considered that the cross-talk is of good value without problem even if this multi-core optical fiber is made to a state of an optical cable for practical use and bending is applied at that time.

Figure 51:
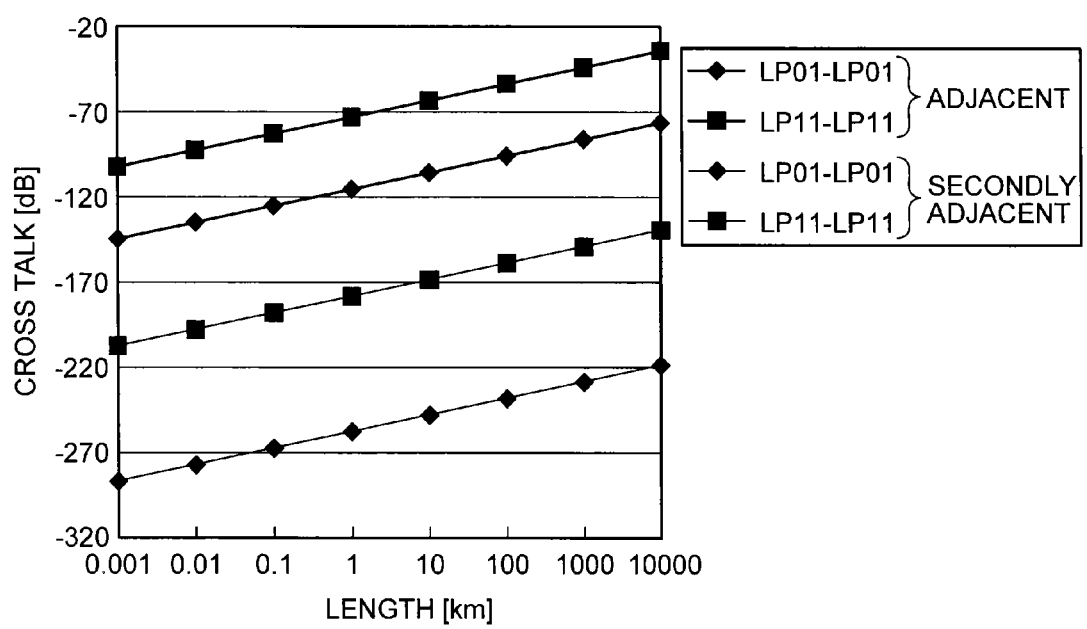
FIG. 51 is a drawing showing relationship between the length of an optical fiber and cross-talk.

It should be noted that FIG. 51 is a drawing showing relationship between the length of the optical fiber and cross-talk. FIG. 51 shows values (theoretical values) of cross-talk for LP01-LP01 interference and LP11-LP11 interference between adjacent core portions (for example, the core portion 10 and the core portion 60 in FIGS. 1 and 46) and values (theoretical values) of cross-talk for LP01-LP01 interference and LP11-LP11 interference between core portions adjacent at the second closest distance (secondly adjacent) (for example, the core portion 40 and the core portion 60, and the core portion 40 and the core portion 20 etc. in FIG. 1). For example, in case where the length of the optical fiber is 10,000 km, secondly adjacent cross-talk is equal to or smaller than −120 dB, which is sufficiently ignorably small amount. In addition, adjacent cross-talk is approximately −70 dB when the length is 1 km and approximately −50 dB when the length is 100 km.

Figure 52:
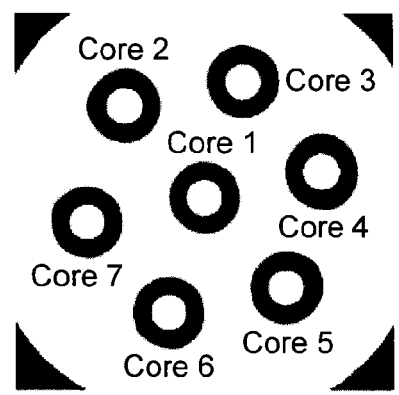
FIG. 52 is a drawing showing cross section of a produced multi-core optical fiber.

A multi-core optical fiber in configuration shown in FIG. 46 was produced with reference to the above-described simulation result. FIG. 52 is a drawing showing cross section of the produced multi-core optical fiber. The inter-core distance of the produced multi-core optical fiber was approximately 60.5 μm to 62.5 μm. In addition, the fiber diameter (cladding diameter) of 1.0 km of the multi-core optical fiber was 240 to 245 μm in lengthwise. The produced multi-core optical fiber was wound around a bobbin having an R=140 mm with 30 gf of tension which is a converted value with respect to 125 μm of fiber diameter, and optical characteristics were evaluated.

Figure 53:
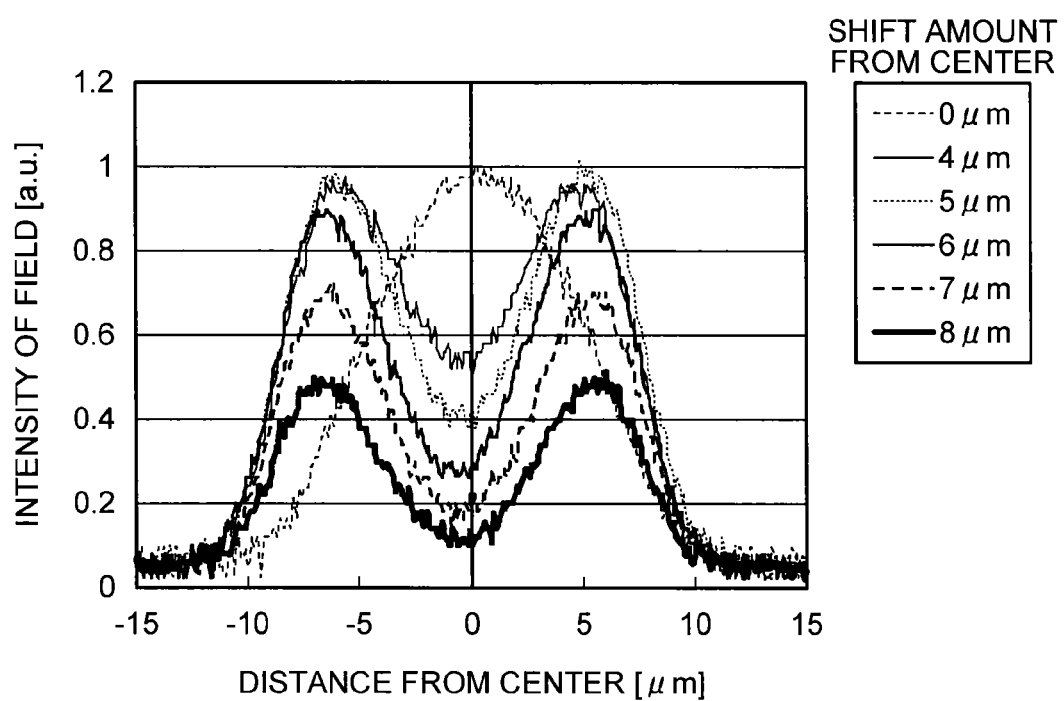
FIG. 53 is a drawing showing change in excitation field when changing alignment position (shift amount)

Similarly to the case of FIG. 44, excitation of LP01 mode was conducted by making light at wavelength of 1550 nm of which a center is aligned with the center of each core portion incident by a highly non-linear optical fiber ($A_{\mathit{eff}}$=13 μm$^2$). Excitation of LP11 mode was conducted by shifting the center of the highly non-linear optical fiber from the center of each core and making light incident. The change in excitation field when alignment position (shift amount) was changed is shown in FIG. 53. The horizontal axis shows the position from the center of the core portion.

Figures 54, 55:
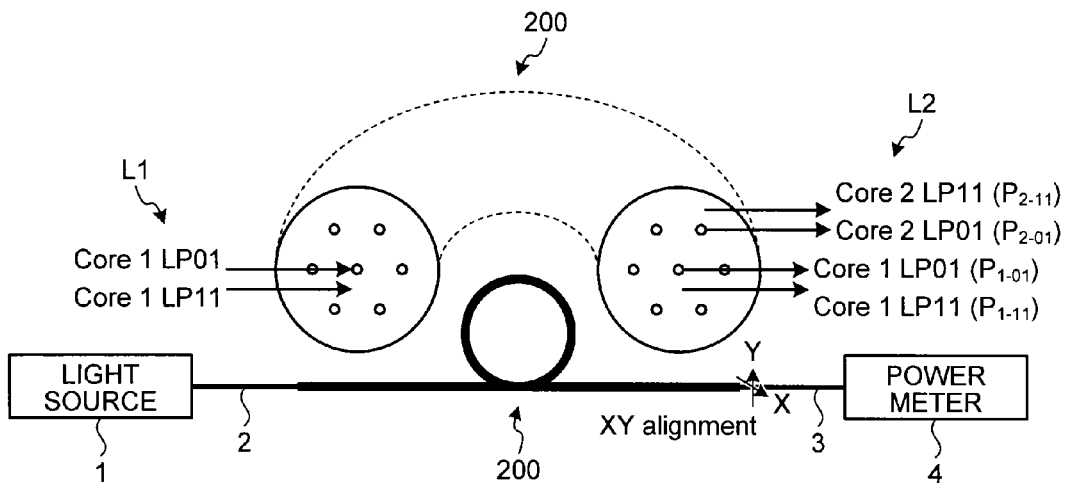
FIG. 54 is a drawing showing the result of evaluating characteristics of Core 1 to Core 7.
FIG. 55 is a drawing showing a measurement system for cross-talk.

FIG. 54 is a drawing showing the result of evaluating characteristics of Core 1 to Core 7 (see FIG. 52). $A_{\mathit{eff}}$ was approximately 170 to 190 μm$^2$ (LP01 mode) and approximately 270-281 μm$^2$ (LP11 mode), and shows similar tendency with the simulation shown in FIG. 42. Bending loss was equal to or smaller than 0.4 dB/m at LP01 mode and was equal to or smaller than 2.0 dB/m at LP11 mode, which were sufficiently small values. Transmission loss at wavelength of 1550 nm was approximately 1.2 dB/km (LP01 mode), approximately 1.0 dB/km (LP11 mode) [Core1], approximately 1.7 dB/km (LP01 mode), and 1.3 dB/km (LP11 mode) [Core2]. In addition, when chromatic dispersion of only the center core portion (Core 1) was measured, it was 23.03 ps/nm/km at LP01 mode and was 24.96 ps/nm/km at LP11 mode.

Subsequently, intra-core cross-talk (XT) characteristics in case of R=140 was measured by using a measurement system shown in FIG. 55. In FIG. 55, reference sign 200 indicates a multi-core optical fiber to be measured, reference sign 1 indicates a light source at wavelength of 1550 nm, reference signs 2 and 3 indicate highly non-linear optical fibers, and reference sign 4 indicates a power meter. The cross-talk of LP01-LP01 interference was measured by making light from the light source 1 (Core 1 LP01 of light shown with reference sign L1 in the drawing) incident to the center of the Core 1 and taking the ratio of power ($P_{1\text{-}01}$) of light outputted from the center of the Core 1 (Core 1 LP01 of light shown with the reference sign L2) relative to power ($P_{2\text{-}01}$) of light outputted from the center of the Core 2 (Core 2 LP01). The cross-talk of LP11-LP11 interference was measured by taking ratio of power (P1-11, P2-11) of light (Core 1 LP11, Core 2 LP11) outputted from positions shifted by 6 μm from the centers of the Core 1 and the Core 2 when making light (Core 1 LP11) incident to the Core 1 while setting the shift amount of the highly non-linear optical fiber 2 at 6 μm. In addition, the cross-talk of LP01-LP11 interference was also measured by making light incident to the center of the Core 1 and taking the ratio of power of light outputted from the center of the Core 1 relative to power of light outputted from the position, shifted by 6 μm, of the Core 2.

It should be noted that the light from the light source 1 was made incident by spatial injection.

The result of measuring cross-talk, after propagating 1.0 km, when the length of the multi-core optical fiber 200 is 1.0 km is shown in FIG. 56. As clearly shown in FIG. 56, the obtained value of cross-talk of LP11-LP11 interference is approximately −57 dB, which is sufficiently small. In addition, for the cross-talk of LP01-LP01 interference and cross-talk of LP01-LP11 interference, values close to measurement limit of the optical power meter 4 were obtained, and it is considered that actual cross-talk is a further small value. As described above, it was confirmed that cross-talk of the multi-core optical fiber 200 is a value which is sufficiently small at any propagation mode.

Furthermore, inter-core cross-talk characteristics and intra-core cross-talk characteristics, in case where winding tension is 30 gf or 60 gf which are converted values with respect to 125 μm of fiber diameter and its bending diameter is R=140 mm, were measured by using the measurement system shown in FIG. 55. Similarly to the case of FIG. 56, cross-talk after propagating 1.0 km in case where the length of the multi-core optical fiber 200 is 1.0 km was measured.

However, the light from the light source 1 was subjected to not spatial injection but direct injection. As described above, it is possible to obtain more stable measurement result not by spatial injection but direct injection. Therefore, in measurement hereinafter adopts direct injection.

FIG. 57 is a drawing showing the result of measuring cross-talk. In FIG. 57, inter-core cross-talk of interference of LP01 of the Core 1 and LP01 mode of Core 2 in case where winding tension is, for example, 30 gf is −63.3 dB. In addition, for example, "Within Core 1" means intra-core cross-talk of LP01-LP11 interference of the Core 1, and its value is −9.3 dB.

As shown in FIG. 57, inter-core cross-talk was small, i.e., equal to or smaller than −50 dB in any case. In addition, intra-core cross-talk of the Core 1 in case where winding tension was 30 gf was −9.3 dB and intra-core cross-talk of the Core 1 and the Core 2 in case where winding tension was 60 gf were −2.0 dB and −4.4 dB respectively.

Figure 58:
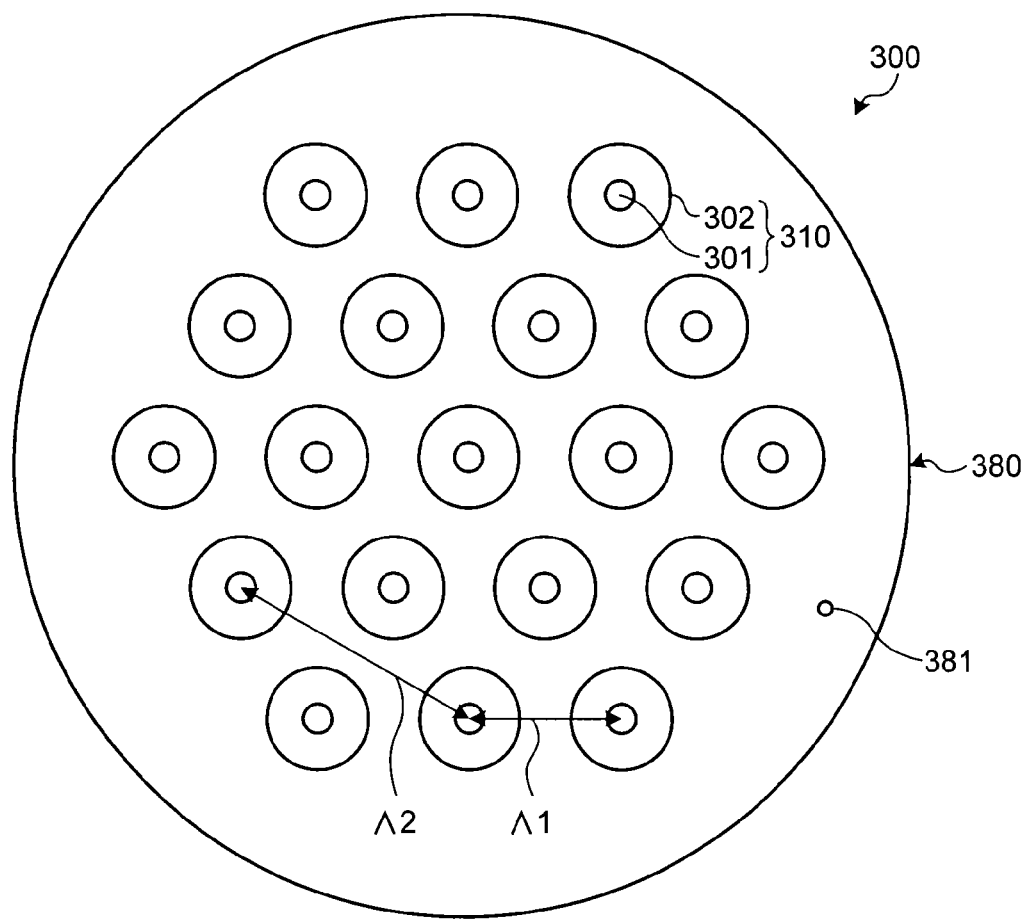
FIG. 58 is a cross section schematically showing an optical fiber according to an embodiment 2.

FIG. 58 is a cross section schematically showing a multi-core optical fiber according to an embodiment 2. As shown in FIG. 58, a multi-core optical fiber 300 includes 19 core portions 310 and a cladding portion 380 positioned at outer periphery of each core portion 310, and is a 19-core-type of multi-core optical fiber.

The 19 core portions 310 are arranged in triangular lattice form, and one of them is positioned in the vicinity of the center axis of the multi-core optical fiber 300, and the other core portions are disposed to form dual concentric hexagons with respect to the center axis. In addition, the core portion 310 includes a center core portion 301 and an outer periphery core portion 302 formed at an outer periphery of the center core portion 301. Materials of the center core portion 301, the outer periphery core portion 302, and the cladding portion 380 are similar to materials of elements constituting the multi-core optical fiber 100 according to the embodiment 1. In addition, a marker 381 for specifying the core portions 310 is formed at the cladding portion 380. In addition, Λ1 is distance between adjacent core portions 310 and Λ2 is distance between secondly adjacent core portions 310.

Similarly to the multi-core optical fiber 100, in this multi-core optical fiber 300, the refractive index of the outer periphery core portion 302 is lower than the refractive index of the cladding portion 380, and as shown in FIGS. 2 and 3, a so-called W-shaped refractive index profile are obtained. The refractive index profile of the core portion 310 can be set similarly to the refractive index profile of the core portion 10 of the multi-core optical fiber 100, and is set so that light is propagated only at predetermined number of, i.e., equal to or greater than 2 of propagation modes and the effective core area at wavelength of 1550 nm at each propagation mode is equal to or greater than 120 μm².

For example, if relative refractive index difference Δ1 of the center core portion 301 relative to the cladding portion 380 is 0.2% to 0.5%, relative refractive index difference Δ2 of the outer periphery core portion 302 relative to the cladding portion 380 is equal to or greater than −0.5% and is smaller than 0%, the diameter 2a of the center core portion is 14 μm to 19 μm, and Ra which is ratio of outer diameter 2b of the outer periphery core portion relative to diameter 2a of the center core portion is greater than 1 and equal to or smaller than 4, characteristics that can realize 2- or 3-mode propagation and that are good from a view point of $A_{eff}$, bending loss and leakage loss are obtained similarly to the embodiment 1. Furthermore, it is preferable that the outer diameter 2b of the outer periphery core portion is 30 μm to 70 μm.

Next, a 19-core-type multi-core optical fiber for propagating 2 modes of LP01 mode and LP11 mode was produced similarly to the case of 7-core-type multi-core optical fiber. At first, an optical fiber preform, of which Δ1 is 0.332%, Δ2 is −0.084%, and Ra is 1.92 in the structure of the multi-core optical fiber configured for the embodiment 2, was produced. In case of these Δ1, Δ2, and Ra, the diameter 2a of the center core portion by which the 170 μm² of the effective core area $A_{eff}$ at LP01 mode is obtained is 17.0 μm. So simulation calculation was conducted by setting 2a at 17.0 μm, thereby characteristics similar to the characteristics shown in FIG. 42 were obtained at wavelength of 1550 nm.

Next, design for a multi-core optical fiber was conducted by using the parameters shown in FIG. 42 and based on mode-coupling theory which takes bending into account. As targets, the cladding diameter was set at 440 μm and the coating diameter was set at 530 μm. In addition, the inter-core distance was designed to be 60 μm.

Figure 59:
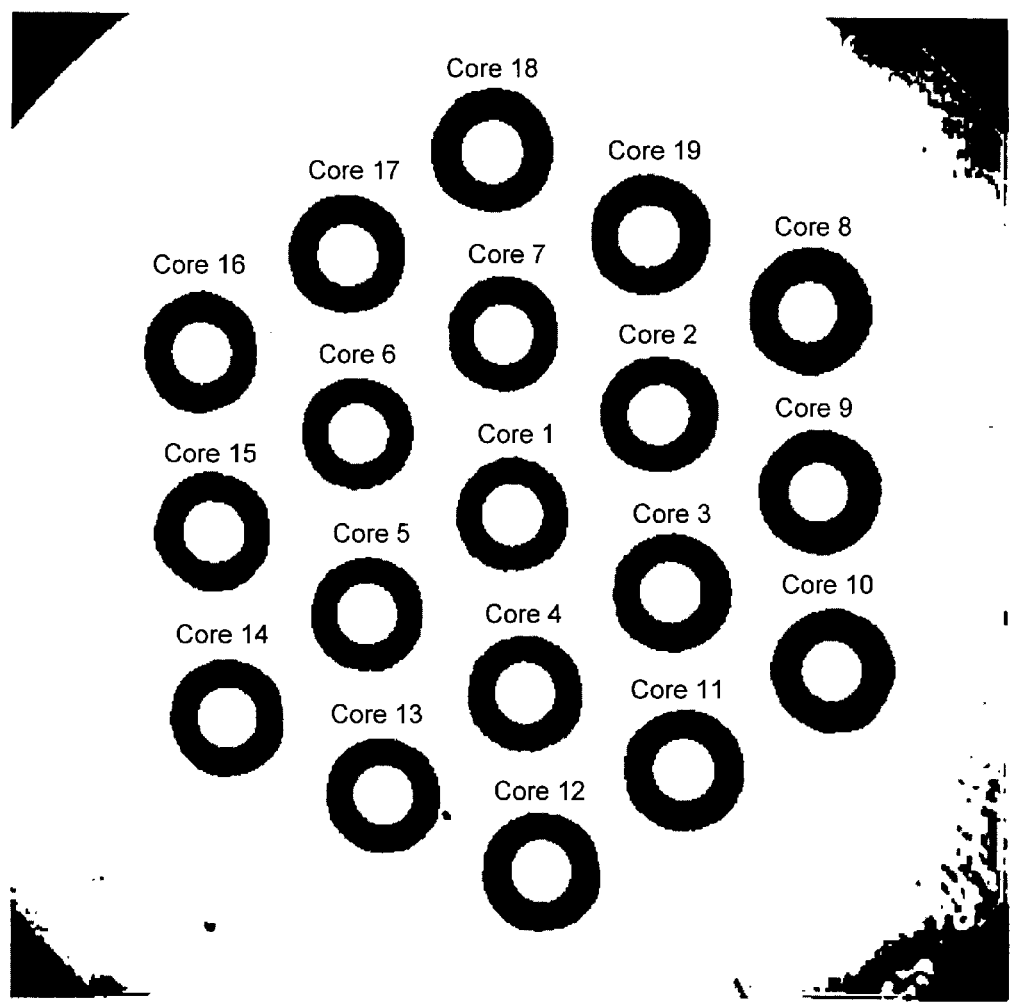
FIG. 59 is a drawing showing cross section of a produced multi-core optical fiber.

FIG. 59 is a drawing showing cross section of the produced multi-core optical fiber. The length of the produced multi-core optical fiber was 120 m. In addition, when measuring at 36 points in the longitudinal direction, the average of the inter-core distance was approximately 60.7 μm and standard deviation was approximately 1.67 μm. In addition, the longitudinal fiber diameter (cladding diameter) in the longitudinal direction was approximately 430 to 445 μm. The produced multi-core optical fiber was wound around a bobbin of R=140 mm with 10 gf of tension and optical characteristics at wavelength of 1550 nm were evaluated.

FIG. 60 is a drawing showing the result of evaluating characteristics of Cores 1, 2, 8, 9, and 19 (see FIG. 59). It should be noted that bending loss shown in FIG. 60 is macro-bending loss when bending at 30 mm of bending diameter. As shown in FIG. 60, both the bending loss and the $A_{eff}$ were values greater than the values for the 7-core-type shown in FIG. 54 and were values to the extent of no problem for practical use. In addition, transmission loss in case where the multi-core optical fiber was put in linear shape was 1 to 2 dB/km for each core portion shown in FIG. 60.

Next, inter-core cross-talks of respective Core 1 -Core 2, Core 2-Core 8, and Core 1-Core 19, and intra-core cross-talks of the Core 1, Core 2, and the Core 8 were measured.

FIG. 61 is a drawing showing the result of measuring cross-talk.

In FIG. 61, for example, the inter-core cross-talk of interference between LP01 mode of the Core 1 and LP01 mode of the Core 2 is −65.1 dB. The inter-core cross-talk of interference between LP01 mode of the Core 2 and LP11 mode of the Core 8 is −59.0 dB. In addition, for example, "Intra Core XT" indicates intra-core cross-talk, and for example, intra-core cross-talk of LP01-LP11 interference of the Core 1 is −4.5 dB. Inter-core cross-talks shown in FIG. 61 and converted to values in case where length is approximately 10 km by using theoretical formula of FIG. 51 were equal to or smaller than −30 dB. Therefore, it is considered that an optical signal can be transmitted at least by 10 km of distance with equal to or smaller than −30 dB of cross-talk by using this multi-core optical fiber.

Figure 62:
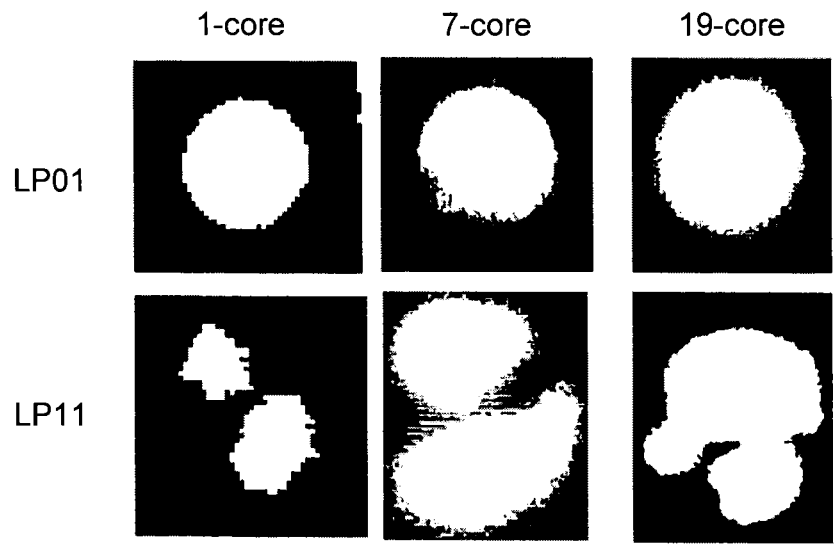
FIG. 62 is a drawing showing field distributions of light of LP01 modes and LP11 modes of a single-core optical fiber, a 7-core-type multi-core optical fiber, and a 19-core-type multi-core optical fiber.

FIG. 62 is a drawing showing field distributions of light of LP01 mode and LP11 mode in the above-produced single-core optical fiber, 7-core-type multi-core optical fiber, and 19-core-type multi-core optical fiber. These field distributions indicate field distributions of light after propagating 2m in each of the produced optical fibers.

It should be noted that, in each of the above-described multi-core optical fibers, 2 polarization modes are degenerated in LP01 mode of each core portion, four polarization modes are degenerated in LP11 mode and LP21 mode respectively. The above-described calculation is conducted by selecting one polarization mode from 2 or four degenerated modes. However, optical characteristics of the degenerated polarization modes are substantially the same. Therefore, since the above-described calculation results can be applied to other degenerated polarization modes, an optical fiber suitable for a transmission method making use of not only mode multiplexing but also polarization mode-multiplexing can be realized by making use of these calculation results.

In addition, in the above-described embodiments, propagation modes are LP01 mode and LP11 mode in case of 2 modes, and LP01 mode, LP11 mode, and LP21 mode in case of 3 modes. However, the present invention is not limited to this, and may be a multi-core optical fiber which can propagate light only by the desirable number of propagation modes.

In addition, although respective refractive index profiles in the core portion is W-shaped form in the above-described embodiments, refractive index profile of the multi-core optical fiber according to the present invention is not limited to this, and any refractive index profile such as single-peaked profile, step-shaped profile, segment-core-type profile, trench-type profile, W+side-core-type profile, and ring-shaped profile, etc. can be used. Hereinafter a multi-core optical fiber according to the embodiment 3 will be explained in which the core portion of the multi-core optical fiber of the embodiment 1 is made trench-shaped form of refractive index profile.

Figure 63:
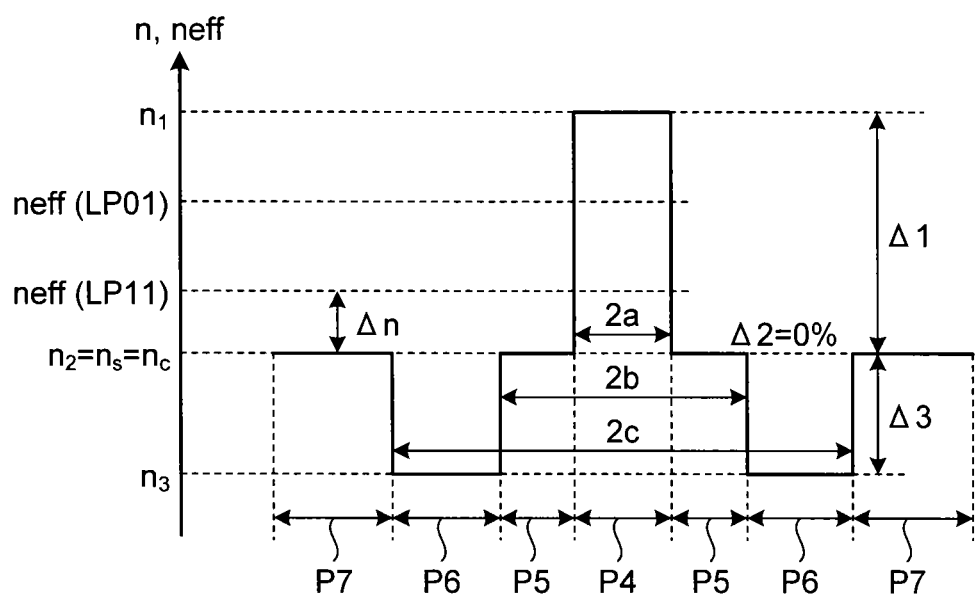
FIG. 63 is a drawing showing trench-type of refractive index profile of a multi-core optical fiber according to an embodiment 3.
Figure 70:
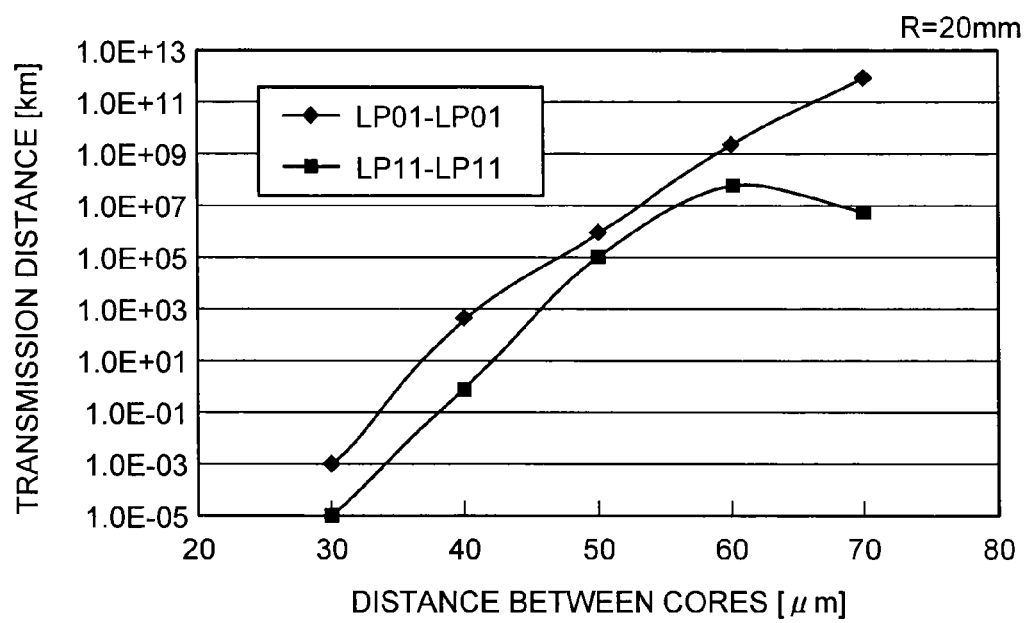
FIG. 70 is a drawing showing relationship between inter-core distance and transmission distance at which cross-talk between 2 adjacent cores is −30 dB when bending radius R is 20 mm.
Figure 71:
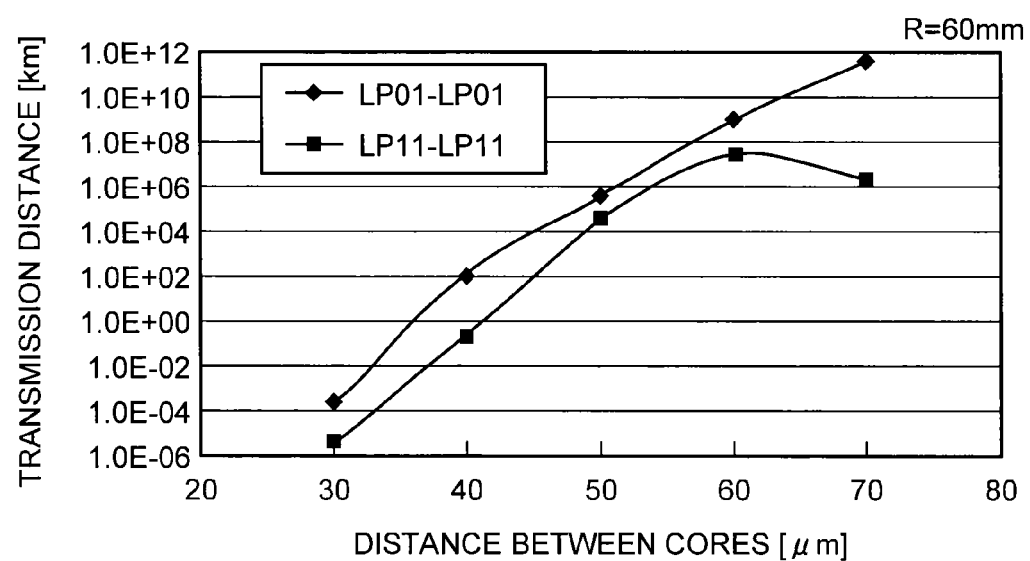
FIG. 71 is a drawing showing relationship between inter-core distance and transmission distance at which cross-talk between 2 adjacent cores is −30 dB when bending radius R is 60 mm.
Figure 72:
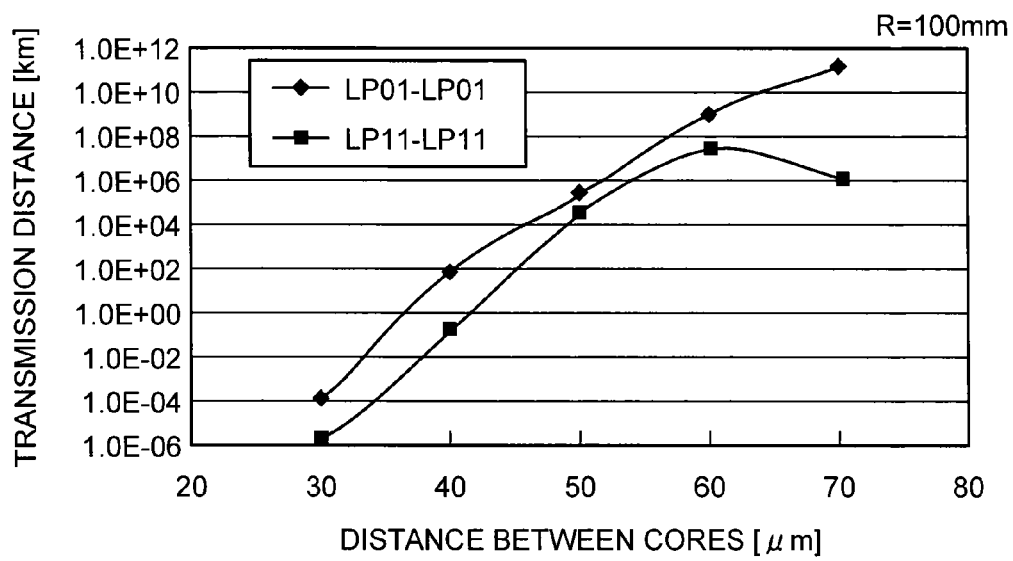
FIG. 72 is a drawing showing relationship between inter-core distance and transmission distance at which cross-talk between 2 adjacent cores is −30 dB when bending radius R is 100 mm.
Figure 73:
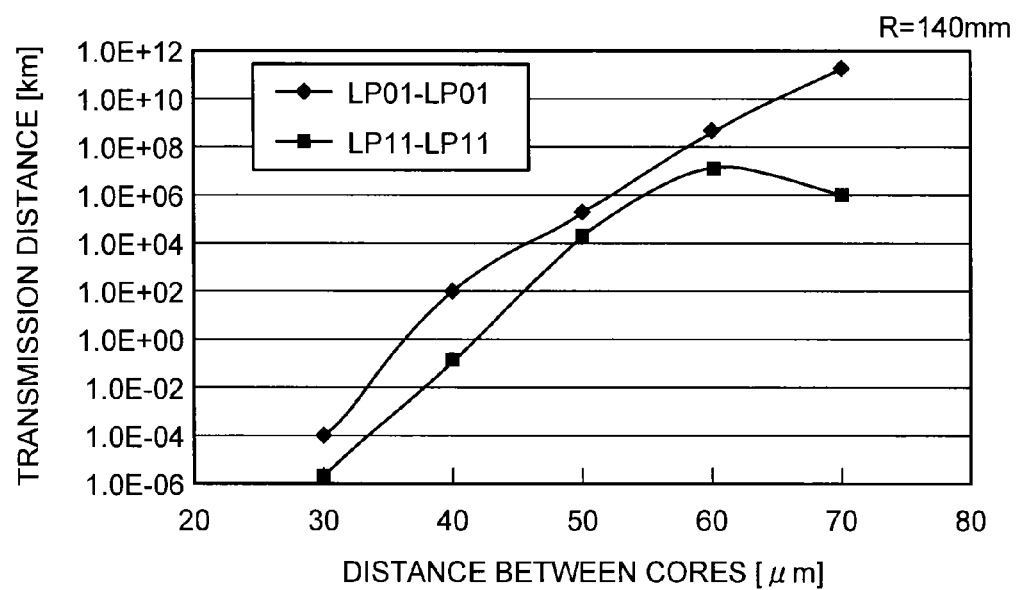
FIG. 73 is a drawing showing relationship between inter-core distance and transmission distance at which cross-talk between 2 adjacent cores is −30 dB when bending radius R is 140 mm.
Figure 74:
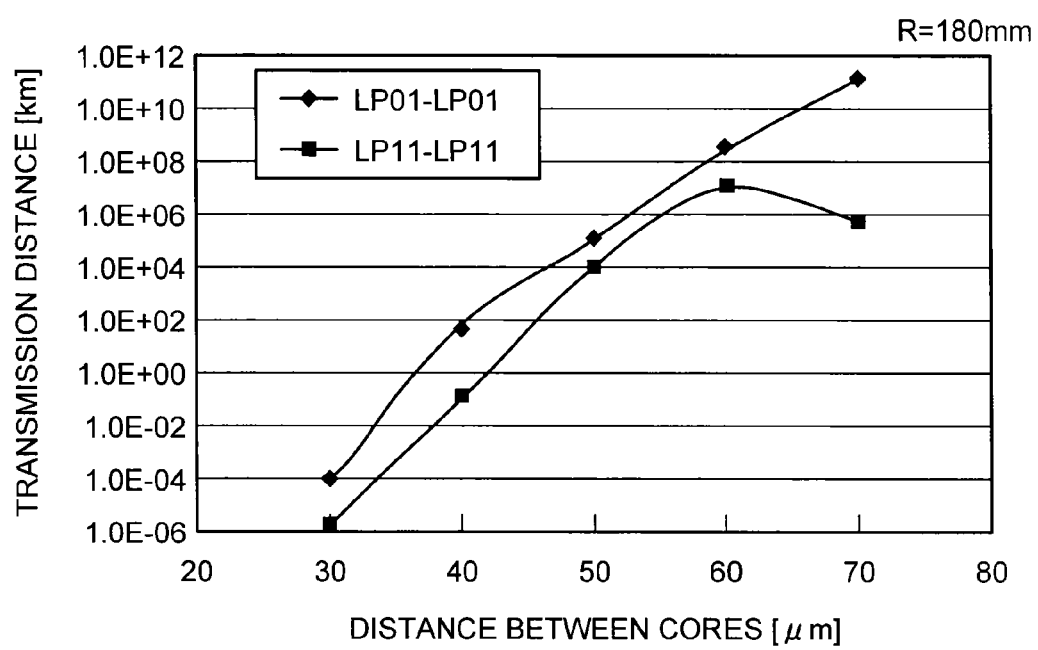
FIG. 74 is a drawing showing relationship between inter-core distance and transmission distance at which cross-talk between 2 adjacent cores is −30 dB when bending radius R is 180 mm.

FIG. 63 is a drawing showing trench-type of refractive index profile of a multi-core optical fiber according to an embodiment 3. A core portion is formed by a center core portion, an inner periphery core layer formed at an outer periphery of the center core portion, and an outer periphery core layer formed at an outer periphery of the inner periphery core layer. An area P4 shows refractive index profile of the center core portion. An area P5 shows refractive index profile of the inner periphery core layer. An area P6 shows refractive index profile of the outer periphery core layer. An area P7 shows refractive index profile of the cladding portion.

Herein the relative refractive index difference of the center core portion relative to the cladding portion is $\Delta 1$, the relative refractive index difference of the inner periphery core layer relative to the cladding portion is $\Delta 2$, and the relative refractive index difference of the outer periphery core layer relative to the cladding portion is $\Delta 3$. The relative refractive index differences $\Delta 1$, $\Delta 2$, and $\Delta 3$ are defined by the following formulae (4), (5), and (6):

$$\Delta 1 = \{(n_1 - n_c)/n_c\} \times 100 [\%] \quad (4)$$

$$\Delta 2 = \{(n_2 - n_c)/n_c\} \times 100 [\%] \quad (5)$$

$$\Delta 3 = \{(n_3 - n_c)/n_c\} \times 100 [\%] \quad (6)$$

where $n_1$ indicates the maximum refractive index of the center core portion, $n_2$ indicates refractive index of the inner periphery core layer, $n_3$ indicates refractive index of the outer periphery core layer, and $n_c$ indicates refractive index of the cladding portion. As above-described, since it is approximately $n_2 = n_c$, $\Delta 2$ is approximately 0%. It should be noted that approximately 0% means −0.05% to 0.05% which does not affect optical characteristics such as $A_{eff}$ etc. to a great extent. For example, $n_c$ is equal to refractive index $n_5$ of silica glass (1.44439 at wavelength of 1550 nm).

In addition, as shown in FIG. 63, the diameter of the center core portion is indicated by 2a, the outer diameter of the inner periphery core layer is indicated by 2b, and the outer diameter of the outer periphery core layer is indicated by 2c. In addition, Ra2 indicates the ratio b/a of the outer diameter 2b of the inner periphery core layer relative to the diameter 2a of the center core portion. Ra3 indicates the ratio c/a of the outer diameter 2c of the outer periphery core layer relative to the diameter 2a of the center core portion. The diameter 2a of the center core portion is diameter at the position where relative refractive index difference $\Delta 1$ is 0% at a boarder of the center core portion and the inner periphery core layer. In addition, the outer diameter 2b of the inner periphery core layer is diameter at the position where relative refractive index difference is 0% at a boarder of the inner periphery core layer and the outer periphery core layer. In addition, the outer diameter 2c of the outer periphery core layer is diameter at the position where the value of relative refractive index difference is ½ of the relative refractive index difference $\Delta 3$ at a boarder of the outer periphery core layer and the cladding portion.

Herein effective refractive index of LP01 mode which is fundamental propagation mode of the multi-core optical fiber according to the embodiment 3 is $n_{eff}$(LP01) and effective refractive index of LP11 mode which is first higher-order propagation mode is $n_{eff}$(LP11). The optical fiber is configured so that, $\Delta n$ which is the difference between $n_{eff}$(LP11) and refractive index $n_c$ of the cladding portion is equal to or greater than 0.0005.

As described above, in the multi-core optical fiber according to the embodiment 3, effective refractive index $n_{eff}$(LP11) of LP11 mode which is first higher-order propagation mode is made greater than refractive index $n_c$ of the cladding portion 12 by equal to or greater than 0.0005. By doing this, in the multi-core optical fiber, as characteristics at wavelength of 1550 nm, the effective core area of LP01 mode is large as equal to or greater than 120 μm² and effective core area of LP11 mode is large as equal to or greater than 170 μm², and bending losses of both LP01 mode and LP11 mode decreases.

It should be noted that, in order to make $n_{eff}$(LP11) be greater than $n_c$ by equal to or greater than 0.0005, for example, $\Delta 1$ may be 0.25%, $\Delta 3$ may be −0.3%, and 2a, 2b, and 2c may be 15.5 μm, 31.0 μm, and 46.5 μm respectively (that is, Ra2 may be 2 and Ra3 may be 3). By setting structural parameters of the multi-core optical fiber according to the embodiment 3 in this way, $n_{eff}$(LP11) is 1.446833, which is greater than $n_c$ (1.44439) by equal to or greater than 0.0005. In this state, as characteristics at wavelength of 1550 nm, effective core area of LP01 mode is 170.49 μm², bending loss is $1.74 \times 10^{-3}$ dB/m, effective core area of LP11 mode is 289.3 μm², and bending loss is $4.74 \times 10^{-1}$ dB/m, desirable characteristics can be obtained.

In addition, in case of setting structural parameters of the multi-core optical fiber according to the present embodiment 3 in the above-described values, effective refractive index $n_{eff}$(LP21) at wavelength of 1550 nm of LP21 which is second higher-order propagation mode is 1.443498 which is smaller than refractive index of silica glass (1.44439). As a result, in the multi-core optical fiber, at wavelength of 1550 nm, LP21 mode becomes leaky mode, and only 2 modes of LP01 mode and LP11 mode having less interference become propagation modes.

As described above, in the multi-core optical fiber according to the present embodiment 3, regarding LP01 mode and LP11 mode to be used, effective core area is great, bending loss is small, and interference between the respective propagation modes is very little.

Next, preferable design for the multi-core optical fiber according to the present embodiment 3 will be explained more specifically with reference to calculation result using simulation by finite element method.

FIG. 64 is a drawing showing structural parameters and optical characteristics in case where the effective core area of LP01 mode is set in the vicinity of 130 μm². FIG. 65 is a drawing showing structural parameters and optical characteristics in case where the effective core area of LP01 mode is set in the vicinity of 150 μm². FIGS. 66 to 68 are drawings showing structural parameters and optical characteristics in case where the effective core area of LP01 mode is set in the vicinity of 170 μm². In each drawing, optical characteristics are values at wavelength of 1550 nm.

As shown in FIGS. 64 to 68, if relative refractive index difference Δ1 is equal to or greater than 0.20%, relative refractive index difference Δ3 is equal to or greater than −0.5% and smaller than 0%, the diameter 2a of the center core portion is equal to or greater than 12.0 μm and equal to or smaller than 18.0 μm, ratio Ra2 is greater than 1 and equal to or smaller than 4, and ratio Ra3 is equal to or greater than 2 and equal to or smaller than 5, an optical fiber, in which effective core area of LP01 mode is equal to or greater than 120 μm², effective core area of LP11 mode is equal to or greater than 170 μm², and bending loss is small at each propagation mode, can be realized. It should be noted that, regarding bending loss, a combination of structural parameters can be selected so that bending loss of LP11 mode is equal to or smaller than 100 dB/m.

In addition, it is preferable to further increase $n_{eff}$ of LP11 mode, preferably greater than $n_c$ by equal to or greater than 0.0010 (that is, $n_{eff}$ (LP11)=1.44539 or greater), and more preferably greater than $n_c$ by equal to or greater than 0.0016 (that is, $n_{eff}$ (LP11)=1.44599 or greater). Such $n_{eff}$ can be realized by, for example, setting Δ1 by equal to or greater than 0.25%, more preferably by equal to or greater than 0.3%.

On the other hand, $n_{eff}$ of LP21 mode can be smaller than refractive index of silica glass (1.44439 at 1550 nm) by making Δ1 be smaller than 0.35%. By making Δ1 be smaller than 0.35%, optical transmission by 2 modes of LP01 mode and LP11 mode is possible. In contrast, although Δ1 is 0.35% in No. 170-31 to No 170-35 of FIG. 31, $n_{eff}$ of LP21 mode is 1.444713 to 1.444726, which is greater than 1.44439.

Next, a case where structural parameters are set as shown in No. 170-3 of FIG. 66 will be explained in which Δ1=0.25%, Ra2=2, Ra3=3, Δ3=−0.3%, 2a=15.5 μm, 2b=31.0 μm, and 2c=46.5 μm.

FIGS. 69 to 74 are drawings showing relationship between inter-core distance and transmission distance at which cross-talk between 2 adjacent cores is −30 dB in case of changing bending radius R within a range of 20 mm to 180 mm. It should be noted that, since LP01-LP11 interference was found to be very small, cross-talk characteristics between LP01-LP01interference and LP11-LP11 interference are examined in detail. As shown in FIGS. 69 to 74, at any bending radius, LP11-LP11 interference was a factor limiting transmission distance. In addition, it was found that, in order to obtain 100,000 km of transmission distance at which cross-talk becomes −30 dB, inter-core distance must be 50 μm to 52 μm, and in order to obtain 10,000 km of the transmission distance, inter-core distance must be 48 μm to 50 μm.

It should be noted that, although the inter-core distance is of a case of adopting the structural parameters shown in No. 170-3 of FIG. 66, for a case adopting other structural parameters, transmission distance at which cross-talk becomes −30 dB can be made 100,000 km, 10,000 km, or other desirable distances by setting inter-core distance appropriately.

In addition, the trench-type profile of the embodiment 3 can be applied to the 19-core-type of multi-core optical fiber of the embodiment 2.

Figure 75:
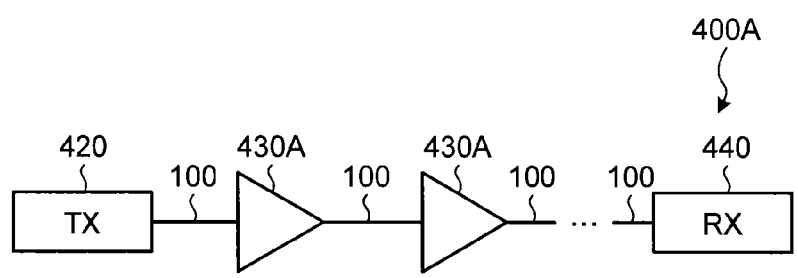
FIG. 75 is a schematic view of an optical transmission system according to an embodiment 4.

FIG. 75 is a schematic view of an optical transmission system according to an embodiment 4. As shown in FIG. 75, an optical transmission system 400A has a configuration in which the plurality of multi-core optical fibers 100 as optical transmission paths according to the embodiment 1 and a plurality of multi-core optical amplifiers 430A are connected alternately between an optical transmitting device 420 and an optical receiving device 440.

The optical transmitting device 420 includes a plurality of optical transmitters (TXs) having light sources such as semiconductor lasers and outputs signal lights for LP01 mode transmission and signal lights for LP11 mode transmission. Each signal light is mode-multiplexed and inputted into each core portion of the multi-core optical fiber 100. The multi-core optical fiber 100 transmits the inputted mode-multiplexed signal lights.

The multi-core optical amplifier 430A optically amplifies the signal lights transmitted by the multi-core optical fiber 100 and compensates for its transmission loss. For the multi-core optical amplifier 430A, an optical fiber amplifier such as, for example, an erbium-doped optical fiber amplifier or a Raman amplifier, in which an amplification optical fiber is configured by a multi-core optical fiber can be used. Each core portion of the amplification multi-core optical fiber is configured so that mode-multiplexed signal light can be amplified. Alternatively, the multi-core optical amplifier 430A may be configured in which the mode-multiplexed signal lights transmitted through each core portion of the multi-core optical fiber 100 are multiplexed to one optical fiber by an optical fiber bundle etc. and it is amplified by an optical fiber amplifier using an amplification optical fiber having one core portion. In addition, the multi-core optical amplifier 430A may be configured by a semiconductor optical amplifier.

Since, in this optical transmission system 400A, the multi-core optical fibers 100 are cascade-connected by the multi-core optical amplifiers 430A as optical repeaters, it is preferable for realizing more long-haul optical transmission.

Figure 76:
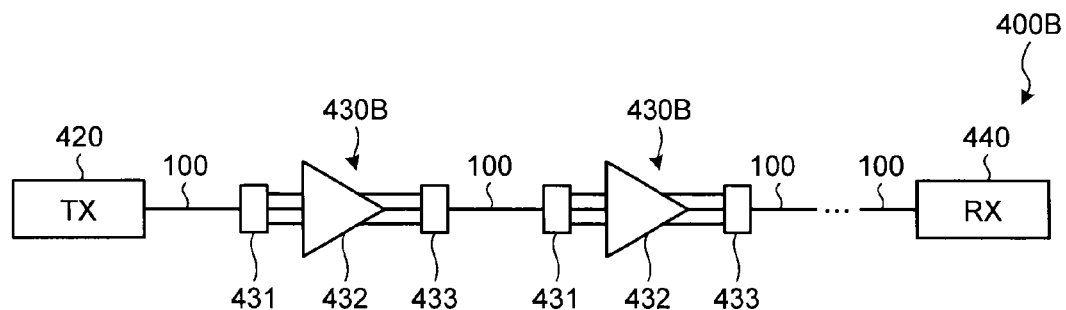
FIG. 76 is a schematic view of an optical transmission system according to an embodiment 5.

FIG. 76 is a schematic view of an optical transmission system according to an embodiment 5. As shown in FIG. 76, an optical transmission system 400B is an optical transmission system in which the multi-core optical amplifiers 430A in the optical transmission system 400A shown in FIG. 76 are replaced with multi-core optical amplifiers 430B.

The multi-core optical amplifier 430B includes an optical connector 431, an optical amplification unit 432, and an optical connector 433. The optical amplification unit 432 includes 3 optical fiber amplifiers such as, for example, rare-earth-doped optical fiber amplifiers or Raman amplifiers in which amplification optical fibers are configured by multi-core optical fibers. The amplification multi-core optical fiber of each optical fiber amplifier is configured so that mode-multiplexed WDM (Wavelength Division Multiplexing) signal light at S band (1.46 μm to 1.53 μm), C band (1.53 μm to 1.565 μm), and L band (1.565 μm to 1.625 μm) can be amplified respectively. The optical connector 431 is configured so that signal lights transmitted through the multi-core optical fiber 100 are inputted to the optical fiber amplifier for each band in the optical amplification unit 432 per S-band, C-band, and L-band. The optical connector 433 is configured so that WDM signal light of each band amplified by each optical fiber amplifier in the optical amplification unit 432 is inputted to the core portion, corresponding to each WDM signal light, of the multi-core optical fiber 100.

In the optical transmission system 400B, wide-bandwidth WDM signal light is transmitted by spatial-multiplexing and mode-multiplexing by using the multi-core optical fiber 100 capable of propagating 2 modes. Since the optical transmission system 400B can realize wavelength-multiplexing, spatial-multiplexing, and mode-multiplexing transmission in wide-bandwidth, an optical transmission system with extremely great transmission capacity can be realized. In addition, since the WDM signal light is divided to 3 bands and the divided WDM signal light is amplified by the optical amplifier suitable for amplifying each band in the optical transmission system 400B, an optical transmission system with better transmission quality can be realized.

It should be noted that, although the optical transmission system of the above-described embodiments include an optical amplifier, in case where the transmission distance is short, an optical amplifier is not always necessary.

In addition, since there is a case where bending radius or winding tension of a multi-core optical fiber affects inter- or intra-core-cross-talk as above described, the bending radius or the winding tension may be adjusted to fine-tune cross-talk.

In addition, although, in the above-described embodiments, the cladding portion is made from pure silica glass, the center core portion may be made from pure silica glass, and the outer periphery core portion and the cladding portion may be made from silica glass including dopant lowering refractive index, for example. In addition, although, in the above-described embodiments, the multi-core optical fiber is made from silica-based glass material, constituent material for the multi-core optical fiber according to the present invention is not limited to this, and optical material capable of constituting an optical fiber such as other glass material or plastic material can be used appropriately.

In addition, for wavelength of light propagating in the multi-core optical fiber according to the present invention, wavelength band including 1550 nm or wavelength band of, for example, 1300 nm to 1600 nm used as signal light for optical fiber communication can be used.

In addition, the present invention is not limited by the above-described embodiment, and the above-described elements combined appropriately are included in the present invention. In addition, further effects or modification examples can be derived by an ordinary skilled person in the art easily. Therefore, further wide aspects of the present invention are not limited by the above-described embodiment and can be modified variously.

As described above, the multi-core optical fiber and the optical transmission system according to the present invention are suitable for use in optical communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-core optical fiber comprising:
   a plurality of core portions; and
   a cladding portion positioned at outer peripheries of the plurality of core portions, the cladding portion having a refractive index lower than a maximum refractive index of each of the core portions, wherein
   each of the core portions propagates light only with predetermined number, which is equal to or greater than 2, of propagation modes,
   an effective core area at wavelength of 1550 nm of each of the propagation modes is equal to or greater than 120 $\mu m^2$,
   the core portion comprises of a center core portion having the maximum refractive index, and an outer periphery core portion formed at an outer periphery of the center core portion and having refractive index which is lower than the refractive index of the cladding portion, and
   a relative refractive index difference $\Delta 1$ of the center core portion relative to the cladding portion is 0.2% to 0.5%, a relative refractive index difference $\Delta 2$ of the outer periphery core portion relative to the cladding portion is equal to or greater than $-0.5\%$ and lower than 0%, a diameter of the center core portion is 14 $\mu m$ to 19 $\mu m$, and a ratio of an outer diameter of the outer periphery core portion relative to the diameter of the center core portion is greater than 1 and equal to or lower than 4.

2. The multi-core optical fiber according to claim 1, wherein
   the predetermined number is 2, and
   the propagation modes are LP01 mode and LP11 mode.

3. The multi-core optical fiber according to claim 1, wherein
   the predetermined number is 3, and
   the propagation modes are LP01 mode, LP11 mode, and LP21 mode.

4. The multi-core optical fiber according to claim 1, wherein
   an effective core area of a first higher-order propagation mode at wavelength of 1550 nm is equal to or greater than 170 $\mu m^2$.

5. The multi-core optical fiber according to claim 1, wherein
   a cross-talk of light at wavelength of 1550 nm between the respective core portions and between the respective propagation modes is equal to or lower than $-30.0$ dB per 100 km of a propagation distance.

6. The multi-core optical fiber according to claim 1, wherein
   a cross-talk of light at wavelength of 1550 nm between the respective core portions and between the respective propagation modes is equal to or lower than $-30.0$ dB per 1000 km of a propagation distance.

7. The multi-core optical fiber according to claim 1, wherein
   an effective refractive index of one of the propagation modes, of which a cross-talk of light at wavelength of 1550 nm between the adjacent core portions is maximum, has a difference which is equal to or greater than 0.00005.

8. The multi-core optical fiber according to claim 7, wherein
   the difference of the effective refractive index has a difference which is equal to or greater than 0.00015.

9. The multi-core optical fiber according to claim 1, wherein
   a separation distance between each of the core portions and adjacent one of the core portions is equal to or shorter than 100 $\mu m$.

10. The multi-core optical fiber according to claim 1, wherein the plurality of core portions include core portions of which refractive index profiles differ from each other.

11. The multi-core optical fiber according to claim 10, wherein
    the plurality of core portions are constituted by 3 kinds of core portions of which refractive index profiles differ from each other.

12. The multi-core optical fiber according to claim 10, wherein
a separation distance between each of the core portions and adjacent one of the core portions is equal to or shorter than 90 μm.

13. The multi-core optical fiber of claim 10, wherein
a separation distance between each of the core portions and adjacent one of the core portions is equal to or shorter than 60 μm.

14. The multi-core optical fiber according to claim 1, wherein
the core portion comprises an inner periphery core layer formed at the outer periphery of the center core portion and having a refractive index which is approximately equal to the refractive index of the cladding portion, and the outer periphery core portion is formed at an outer periphery of the inner periphery core layer.

15. A multi-core optical fiber comprising:
a plurality of core portions; and
a cladding portion positioned at outer peripheries of the plurality of core portions, the cladding portion having a refractive index lower than a maximum refractive index of each of the core portions, wherein
each of the core portions propagates light only with predetermined number, which is equal to or greater than 2, of propagation modes,
an effective core area at wavelength of 1550 nm of each of the propagation modes is equal to or greater than 120 μm²,
the core portion comprises a center core portion having the maximum refractive index, an inner periphery core layer formed at an outer periphery of the center core portion and having a refractive index which is approximately equal to the refractive index of the cladding portion, and an outer periphery core portion formed at an outer periphery of the inner periphery core layer and having a refractive index which is lower than the refractive index of the cladding portion, and
a relative refractive index difference $\Delta 1$ of the center core portion relative to the cladding portion is equal to or greater than 0.20% and lower than 0.35%, a relative refractive index difference $\Delta 3$ of the outer periphery core portion relative to the cladding portion is equal to or greater than −0.5% and lower than 0%, a diameter of the center core portion is equal to or greater than 12.0 μm and equal to or smaller than 18.0 μm, and a ratio of an outer diameter of the inner periphery core layer relative to the diameter of the center core portion is equal to or greater than 2 and equal to or lower than 5.

16. A multi-core optical fiber comprising:
a plurality of core portions; and
a cladding portion positioned at outer peripheries of the plurality of core portions, the cladding portion having a refractive index lower than a maximum refractive index of each of the core portions, wherein
each of the core portions propagates light only with predetermined number, which is equal to or greater than 2, of propagation modes,
an effective core area at wavelength of 1550 nm of each of the propagation modes is equal to or greater than 120 μm²,
the number of the core portions is 7, and
the 7 core portions are constituted by a center one of the core portions and other core portions disposed at apices of an approximate regular hexagon of which the center one of the core portions is disposed at center.

17. A multi-core optical fiber comprising:
a plurality of core portions; and
a cladding portion positioned at outer peripheries of the plurality of core portions, the cladding portion having a refractive index lower than a maximum refractive index of each of the core portions, wherein
each of the core portions propagates light only with predetermined number, which is equal to or greater than 2, of propagation modes, and
an effective core area at wavelength of 1550 nm of each of the propagation modes is equal to or greater than 120 μm², and
the number of the core portions is 19.

18. An optical transmission system comprising a multi-core optical fiber as an optical transmission line, the multi-core optical fiber comprising:
a plurality of core portions; and
a cladding portion positioned at outer peripheries of the plurality of core portions, the cladding portion having a refractive index lower than a maximum refractive index of each of the core portions, wherein
each of the core portions propagates light only with predetermined number, which is equal to or greater than 2, of propagation modes,
an effective core area at wavelength of 1550 nm of each of the propagation modes is equal to or greater than 120 μm²,
the core portion comprises of a center core portion having the maximum refractive index, and an outer periphery core portion formed at an outer periphery of the center core portion and having refractive index which is lower than the refractive index of the cladding portion, and
a relative refractive index difference $\Delta 1$ of the center core portion relative to the cladding portion is 0.2% to 0.5%, a relative refractive index difference $\Delta 2$ of the outer periphery core portion relative to the cladding portion is equal to or greater than −0.5% and lower than 0%, a diameter of the center core portion is 14 μm to 19 μm, and a ratio of an outer diameter of the outer periphery core portion relative to the diameter of the center core portion is greater than 1 and equal to or lower than 4.

* * * * *